(12) United States Patent
Jung et al.

(10) Patent No.: US 10,007,390 B2
(45) Date of Patent: Jun. 26, 2018

(54) USER TERMINAL DEVICE AND DISPLAY METHOD THEREOF

(71) Applicant: SAMSUNG ELECTRONICS CO., LTD., Suwon-si (KR)

(72) Inventors: Jong-woo Jung, Hwaseong-si (KR); In-sik Myung, Incheon (KR); Taik-heon Rhee, Seoul (KR); Dong-bin Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 562 days.

(21) Appl. No.: 14/245,269

(22) Filed: Apr. 4, 2014

(65) Prior Publication Data
US 2014/0325435 A1 Oct. 30, 2014

(30) Foreign Application Priority Data

Apr. 26, 2013 (KR) .................. 10-2013-0046987
Sep. 9, 2013 (KR) .................. 10-2013-0107765

(51) Int. Cl.
  *G06F 3/00* (2006.01)
  *G06F 3/0481* (2013.01)
  *G06F 3/0484* (2013.01)

(52) U.S. Cl.
  CPC ........ *G06F 3/0481* (2013.01); *G06F 3/04845* (2013.01)

(58) Field of Classification Search
  CPC ...................................... G06F 3/0481–3/0489
  See application file for complete search history.

(56) References Cited

U.S. PATENT DOCUMENTS 6,476,834 B1 * 11/2002 Doval ................... G06F 9/4443
                                                        715/826
6,600,502 B1 *  7/2003 Brewster, Jr. ....... G06F 3/04815
                                                        707/E17.142

(Continued)

FOREIGN PATENT DOCUMENTS

CN         102819400 A   12/2012
EP           2428882 A2   3/2012
KR   10-2010-0073288 A   7/2010

OTHER PUBLICATIONS

Communication dated Aug. 19, 2014, issued by the International Searching Authority in counterpart International Application No. PCT/KR2014/003612.

(Continued)

*Primary Examiner* — Steven B Theriault
(74) *Attorney, Agent, or Firm* — Sughrue Mion, PLLC

(57) ABSTRACT

A user terminal device is disclosed. The user terminal device includes a display, an inputter configured to receive a user drawing manipulation, a storage configured to store an image generated by the user drawing manipulation and information of a control operation matched with at least one part of the image, and a controller configured to display a home screen composed of a plurality of display layers sequentially overlaid on the display, and display the image on at least one display layer from among the plurality of display layers. The controller may be further configured to, in response to one part of the image being selected, perform the control operation matched with the selected part. Accordingly, a user's own home screen can be displayed.

36 Claims, 47 Drawing Sheets

(56) References Cited

U.S. PATENT DOCUMENTS

| | | | |
|---|---|---|---|
| 6,792,158 B1* | 9/2004 | Brumley | H04N 1/6011 345/156 |
| 7,573,487 B1* | 8/2009 | Petersen | G06F 3/04817 345/592 |
| 7,600,192 B1* | 10/2009 | Hashimoto | G06F 3/0482 715/716 |
| 7,602,968 B2* | 10/2009 | Kokemohr | G06F 3/04845 345/629 |
| 7,853,193 B2* | 12/2010 | Marggraff | G06F 3/03545 345/179 |
| 8,289,287 B2* | 10/2012 | Yu | G06F 3/0488 345/173 |
| 8,351,995 B2 | 1/2013 | Dobroth et al. | |
| 8,468,465 B2* | 6/2013 | Warner | G06F 3/04847 707/609 |
| 8,520,028 B1* | 8/2013 | Freyhult | G06F 3/0481 345/173 |
| 8,627,235 B2* | 1/2014 | Chang | G06F 3/04883 345/173 |
| 8,775,957 B2* | 7/2014 | Kim | G06F 1/1626 345/619 |
| 9,201,585 B1* | 12/2015 | Karakotsios | G06F 3/0488 |
| 9,444,922 B2* | 9/2016 | Hwang | H04M 1/27455 |
| 2002/0006234 A1* | 1/2002 | Horiuchi | G06T 11/60 382/295 |
| 2003/0014615 A1* | 1/2003 | Lynggaard | G06F 3/03545 712/220 |
| 2003/0093419 A1* | 5/2003 | Bangalore | G01C 21/3664 |
| 2006/0033754 A1* | 2/2006 | Evans | G06T 11/60 345/629 |
| 2006/0098112 A1* | 5/2006 | Kelly | H04N 5/23222 348/333.12 |
| 2007/0180400 A1* | 8/2007 | Zotov | G06F 3/04883 715/788 |
| 2007/0275736 A1* | 11/2007 | Baek | H04M 1/72572 455/457 |
| 2008/0059801 A1* | 3/2008 | Cohen | G06F 21/57 713/176 |
| 2008/0098031 A1* | 4/2008 | Ducharme | G06F 3/0481 |
| 2009/0047940 A1* | 2/2009 | Lim | H04M 1/72544 455/418 |
| 2009/0204928 A1* | 8/2009 | Kallio | G06F 3/0481 715/799 |
| 2010/0011304 A1* | 1/2010 | van Os | G06F 3/04817 715/762 |
| 2010/0088597 A1* | 4/2010 | Shin | G06F 9/44505 715/704 |
| 2010/0100841 A1* | 4/2010 | Shin | G06F 3/04817 715/784 |
| 2010/0107077 A1* | 4/2010 | Hanawa | G06Q 10/06393 715/716 |
| 2010/0164877 A1 | 7/2010 | Yu et al. | |
| 2010/0262591 A1* | 10/2010 | Lee | G06F 3/04883 707/706 |
| 2011/0007086 A1* | 1/2011 | Kim | G06T 11/001 345/581 |
| 2011/0037777 A1* | 2/2011 | Lindahl | G06F 1/1626 345/619 |
| 2011/0078184 A1* | 3/2011 | Song | G06Q 10/107 707/770 |
| 2011/0115807 A1* | 5/2011 | Kim | G09G 5/00 345/589 |
| 2011/0119610 A1* | 5/2011 | Hackborn | G06F 3/0481 715/768 |
| 2011/0171934 A1* | 7/2011 | Lim | H04L 12/5815 455/412.1 |
| 2011/0185297 A1* | 7/2011 | Reid | G06F 3/04845 715/765 |
| 2011/0256848 A1* | 10/2011 | Bok, II | G06F 3/04883 455/411 |
| 2012/0062549 A1* | 3/2012 | Woo | G06F 3/04815 345/419 |
| 2012/0088478 A1 | 4/2012 | Kim et al. | |
| 2012/0159364 A1* | 6/2012 | Hyun | G06F 3/0481 715/766 |
| 2012/0185768 A1* | 7/2012 | Dowd | G06F 3/0488 715/702 |
| 2012/0210273 A1* | 8/2012 | Seong | G06F 3/0488 715/790 |
| 2012/0302167 A1* | 11/2012 | Yun | G06F 3/04883 455/41.2 |
| 2012/0309433 A1 | 12/2012 | Jeong et al. | |
| 2013/0135235 A1* | 5/2013 | Noutomi | G06F 3/041 345/173 |
| 2013/0135236 A1* | 5/2013 | Yano | G06F 3/0488 345/173 |
| 2013/0159934 A1* | 6/2013 | Kang | G06F 3/0482 715/838 |
| 2013/0212500 A1* | 8/2013 | Wang | G06F 3/0484 715/763 |
| 2013/0283144 A1* | 10/2013 | Roh | G06F 17/241 715/230 |
| 2013/0335450 A1* | 12/2013 | Han | G09G 5/377 345/634 |
| 2014/0040764 A1* | 2/2014 | Stoop | G06F 3/0484 715/748 |
| 2014/0041056 A1* | 2/2014 | Stoop | G06F 21/6263 726/28 |
| 2014/0053109 A1 | 2/2014 | Xu et al. | |
| 2014/0123003 A1* | 5/2014 | Song | G06F 1/1626 715/701 |
| 2014/0189507 A1* | 7/2014 | Valente | G06F 3/04845 715/705 |
| 2014/0362118 A1* | 12/2014 | Brydon | G06F 3/1415 345/660 |
| 2015/0154205 A1* | 6/2015 | Grano | G06F 17/30064 705/14.16 |

OTHER PUBLICATIONS

Communication (Written Opinion) dated Aug. 19, 2014, issued by the International Searching Authority in counterpart International Application No. PCT/KR2014/003612.

Communication dated Oct. 26, 2016, issued by the European Patent Office in counterpart European application No. 14788597.4.

Communication dated Nov. 23, 2017, from the State Intellectual Property Office of People's Republic of China in counterpart Application No. 201480023801.8.

Communication dated Feb. 5, 2018, from the European Patent Office in counterpart European Application No. 14788597.4.

* cited by examiner

USER TERMINAL DEVICE AND DISPLAY METHOD THEREOF

CROSS-REFERENCE TO RELATED APPLICATION(S)

This application claims priority from Korean Patent Application No. 10-2013-0046987 filed on Apr. 26, 2013 and Korean Patent Application No. 10-2013-0107765 filed on Sep. 9, 2013, in the Korean Intellectual Property Office, the disclosures of which are incorporated herein by reference in their entirety.

BACKGROUND

1. Field

Apparatuses and methods consistent with exemplary embodiments relate to a user terminal device and a control method thereof, more particularly to a user terminal device which may display a home screen including an object drawn by a user and a display method thereof.

2. Description of the Related Art

Due to development of electronic technology, a variety of electronic devices have been developed and distributed. Particularly, portable user terminal devices such as cell phones, personal digital assistants (PDAs), tablet personal computers (PCs), and laptop PCs have been increasingly used.

These portable user terminal devices can provide a user with various services by using various applications. For example, a user can execute a desired application by selecting an icon displayed on a home screen or an application icon screen.

A home screen refers to a screen which is initially displayed on a user terminal device after the user terminal device is turned on and reaches a usable state.

In the related art, user terminal devices have displayed a home screen with a standardized structure which is designed by the manufacturer of the user terminal devices. Therefore, a user can only select and use a predetermined icon or widget within a standardized layout of a home screen basically provided by a user terminal device.

Therefore, it is difficult for a user to construct a home screen in a style the user wants.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide a user terminal device with which a user can easily construct and display a home screen capturing the user's personality and a display method thereof.

According to an aspect of an exemplary embodiment, there is provided a user terminal device including a display, an inputter configured to receive a user drawing manipulation, a storage configured to store an image generated by the user drawing manipulation and information of a control operation matched with at least one part of the image, and a controller configured to display a home screen composed of a plurality of display layers sequentially overlaid on the display, and display the image on at least one display layer from among the plurality of display layers. The controller is further configured to, in response to one part of the image being selected, perform the control operation matched with the selected part.

The controller may be further configured to, in response to the image being a background image, divide the background image into a plurality of image parts, match a plurality of control operations with each of the plurality of image parts, and store matching information in the storage, and in response to one image part being selected from among the plurality of image parts of the background image, perform a control operation matched with a selected image part from among the plurality of control operations.

Herein, the controller may be further configured to display the background image on a bottom display layer from among the plurality of display layers.

In addition, the controller may be further configured to, in response to the image being widget, display the widget on an area of a top display layer from among the plurality of display layers so as to cover remaining display layers among the plurality of display layers.

The controller may be further configured to, in response to the widget being divided into a plurality of image parts and a plurality of control operations which are individually matched with the plurality of image parts being selected, match the plurality of control operations with each of the plurality of image parts and store corresponding matching information in the storage.

The controller may be further configured to, in response to the image being icon, display the icon on at least one display layer from among the plurality of display layers which overlays a display layer from among the plurality of display layers where a background image is displayed, and provide the home screen where the background image is combined with the icon.

The controller may be further configured to, in response to the image being drawn by the user drawing manipulation, display a recommended control operation information corresponding to a feature of the image, and in response to one control operation being selected from among the recommended control information, match the selected control operation with the image.

Meanwhile, the controller may be further configured to, in response to a control operation to be matched with the image being selected before the image is drawn by the user drawing manipulation, display a reference image corresponding to the selected control operation, and in response to a user manipulation being performed to modify the reference image, match the modified reference image and the selected control operation and store corresponding matching information in the storage.

The controller may be further configured to, in response to a control operation to be matched with the image being selected before the image is drawn by the user drawing manipulation, display a reference object corresponding to the selected control operation as a watermark.

The controller may be further configured to, in response to a screen edition menu being selected, display a screen including a first area in which the image can be drawn by the user drawing manipulation and a second area in which a control operation to be matched with the image can be selected.

The device may further include a communicator configured to communicate with an external server, wherein the controller may be further configured to, in response to a sharing command being input, upload, to the external server, home screen data including the image.

The controller may be further configured to, in response to new home screen data drawn by another user being downloaded from the external server, convert the home screen based on the new home screen data.

The home screen may be composed of one page unit screen, wherein the controller may be further configured to enlarge or reduce a size of the home screen according to a corresponding one of a zoom-in manipulation and a zoom-out manipulation.

The controller may be further configured to, in response to a scroll manipulation to scroll the home screen being detected, display the home screen by scrolling the home screen.

The image, in response to the home screen being displayed on the display, may be capable of being directly drawn on a surface of the display by the user drawing manipulation.

According to an aspect of another exemplary, there is provided a device including an inputter configured to receive a pen input, a storage, and a controller configured to store information of an image and a control operation, in response to the image being drawn by the pen input and the control operation to be matched with at least one part of the image being selected. The controller is further configured to provide the image to at least one page of a home screen, and in response to one part of the image being selected, perform the control operation matched with the selected part.

According to an aspect of another exemplary embodiment, there is provided a method for displaying a home screen on a user terminal device including generating an image by a user drawing manipulation; setting a control operation to be matched to at least one part of the image; displaying the home screen including the image; and performing, in response to one part of the image being selected, the control operation matched to the selected part, wherein the home screen may be composed of a plurality of sequentially overlaid display layers, and wherein the image may be displayed on at least one display layer from among the plurality of sequentially overlaid display layers.

In addition, the displaying a home screen may include, in response to the image being a background image, displaying the background image on a bottom display layer from among the plurality of sequentially overlaid display layers.

The setting the control operation may include, in response to the image being divided into a plurality of image parts and a plurality of control operations to be individually matched with the plurality of image parts being selected, matching the plurality of control operations with each of the plurality of image parts.

The displaying the home screen may include, in response to the image being a widget, displaying the widget on an area of a top layer from among the plurality of sequentially overlaid display layers.

The setting a control operation may include, in response to the widget being divided into a plurality of image parts and a plurality of control operations which are to be individually matched with the plurality of image parts being selected, matching the plurality of control operations with each of the plurality of image parts.

The displaying the home screen may include, in response to the image being an icon, displaying the icon at least one display layer above a display layer, from among the plurality of sequentially overlaid display layers, where a background image is displayed, and providing the home screen where the background image is combined with the icon.

The setting the control operation may include, in response to the image being drawn by the user drawing manipulation, displaying recommended control operation information corresponding to a feature of the image; and in response to a control operation being selected from among the recommended control operation information, matching the selected control operation with the image.

The generating the image may include, in response to a control operation to be matched with the image being selected before the image is drawn by the user drawing manipulation, displaying a reference image corresponding to the selected control operation; and in response to a user manipulation being performed to modify the reference image, generating the modified reference image as the image.

The method may further include, in response to a control operation to be matched with the image being selected before the image is drawn by the user drawing manipulation, displaying a reference object corresponding to the selected control operation as a watermark.

The method may further include, in response to a screen edition menu being selected, displaying a screen including a first area in which the image can be drawn by the user drawing manipulation and a second area in which a control operation to be matched with the image can be selected.

The method may further include, in response to a sharing command being input, uploading, to the external server, home screen data including the image.

The method may further include, in response to new home screen data, corresponding to a new home screen drawn by another user, being downloaded from an external server, changing the home screen based on the new home screen data.

The method, wherein the home screen may be composed of one page unit screen, and wherein the displaying may further include enlarging or reducing a size of the home screen according to a corresponding one of zoom-in manipulation and a zoom-out manipulation.

The method may further include, in response to a scroll manipulation to scroll the home screen being detected, displaying the home screen by scrolling the home screen.

The method, wherein the image, in response to the home screen being displayed on a display, may be capable of being directly drawn on a surface of the display by the user drawing manipulation.

According to an aspect of another exemplary embodiment, there is provided a method for displaying a user terminal device including generating a drawing image by a pen input; matching a control operation to at least one part of the drawing image; providing the drawing image on at least one page of the home screen; and performing, in response to the at least one part of the drawing image being selected, the control operation matched to the selected part.

According to an aspect of another exemplary embodiment, there is provided a user terminal device, including a controller configured to generate, in response to receiving a first user input, an image corresponding to the first user input, match, in response to receiving a second user input, a control operation with the image, and perform, in response to receiving a third user input, the control operation, wherein the first user input corresponds to a user drawing manipulation which is input on a surface of a display to draw the image, and the third user input corresponds to a user selection which is input on the surface of the display to select the image.

The controller may be further configured to divide, in response to receiving a fourth user input, the image into a first image part and a second image part, match, in response to receiving a fifth user input, a first control operation with the first image part and a second control operation with the second image part, and perform, in response to receiving a user selection which is input on the surface of the display to select one of the first image part and the second image part, one of the first control operation and the second control operation which corresponds to the selected image part.

The user terminal device may further include the display. The display may be configured to display the image. Further, the display may be a touch screen.

According to the above-described various exemplary embodiments, a user can directly draw an object on a home screen and match a control operation which the user wants. Therefore, a user can conveniently use a user terminal device in reflection of the user's own characteristics. Consequently, esthetic sense and satisfaction of a user can be improved significantly.

BRIEF DESCRIPTION OF THE DRAWINGS

The above and/or other aspects will become more apparent by describing certain exemplary embodiments with reference to the accompanying drawings, in which.

DESCRIPTION OF EXEMPLARY EMBODIMENTS

Figure 1:
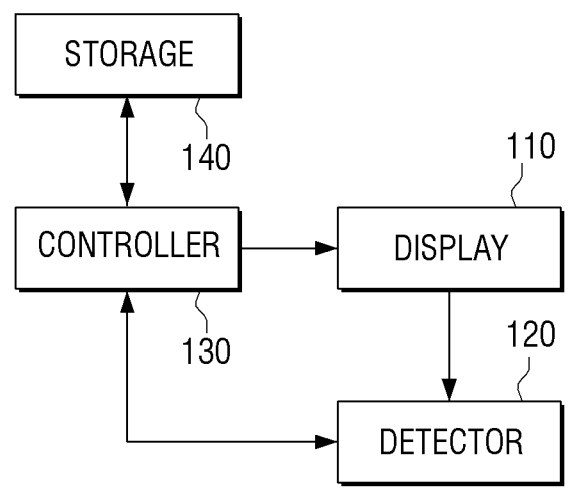
FIG. 1 is a block diagram illustrating a configuration of a user terminal apparatus according to an exemplary embodiment.

Certain exemplary embodiments will now be described in greater detail with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating the configurations of a user terminal apparatus according to an exemplary embodiment. According to FIG. 1, a user terminal device 100 includes a display 110, a detector 120, a controller 130, and a storage 140.

The user terminal device 100 refers to various types of electronic devices that can be used by a user. For example, the user terminal device 100 can be embodied as various devices such as a mobile phone, a tablet PC, a laptop PC, a PDA, an MP3 player, a digital photo frame, a TV, a PC, a kiosk, and the like. FIG. 1 illustrates only certain elements involved in the operations according to various exemplary embodiments, and illustration of other detailed elements is omitted for clarity.

The display 110 may display various kinds of screens including a home screen, an icon screen, a list screen, an application execution screen, a web browser screen, and a content playback screen, etc.

The home screen refers to a screen which is initially displayed, after the user terminal device 100 turns on and the system is ready. Furthermore, functions to commence another application or provide a widget can be defined as the home screen or a launcher. The home screen can also be named a main screen, a basic screen, an initial screen, and so on, but is referred to a home screen in this specification. The home screen is composed of at least one object and a background screen. Herein, the object refers to an icon, a widget, an image, a text, etc.

According to the present exemplary embodiment, the display 110 can display a home screen composed by a user. That is, a user can generate a home screen with a style desired by the user by directly drawing the object or the background screen composing the home screen. The home screen can be composed of a plurality of sequentially piled-up display layers. A background screen of the home screen may be displayed on the lowest display layer among a plurality of display layers, and various objects can be displayed on at least one of the upper display layers. In addition, one display layer among the plurality of display layers can be used as an interaction layer to detect a user touch. As a result, the object and the background screen displayed in each display layer can be combined with each other and be recognized as one home screen. A method for displaying the home screen by using the plurality of display layers will be explained in greater detail below.

The detector 120 can detect a user manipulation on the display 110. The detector 120 can be embodied as various types of touch sensors including sensors which employ capacitive sensing, impact sensing, and piezoelectric sensing, etc. For instance, the capacitive sensing, by using a coated dielectric on the display 110, is a method to calculate a touch coordinate by sensing electricity delivered to the body of a user when a part of the body of the user (e.g., a finger) is touched on a surface of the display 110. The impact sensing, when a user touches a screen including two electrode substrates embedded in the display 110, is a method to calculate a touch coordinate by sensing that a upper and a lower substrates on the touched area touch to each other by an impact of touch and current resultantly flows. As such, the detector 120 can be embodied in various methods and detect user manipulation.

In addition to detecting the user's body (e.g., the user's finger), the detector 120 can also detect user manipulation by using an input means such as a pen. When the input means is a pen including a coil inside, the detector 120 may include a magnetic field sensing sensor which can detect a magnetic field that changes by a coil inside a pen. Accordingly, proximity manipulation, i.e., hovering, can be detected in addition to touch manipulation.

When user manipulation is detected, the detector 120 communicates the sensing result to the controller 130. For example, when one point on a screen is touched by a user by using a finger or a pen, the detector 120 communicates the x, y coordinate values of the touched point to the controller 130. When a user moves the touched point while touching the point, the detector 120 communicates the changed touch coordinate value to the controller 130 on a real time basis.

As described above, the detector 120 can sense a user manipulation even the case where the detector is approached instead of being directly touched. In this specification, making a finger or a pen approach nearby a screen without directly touching the screen is called hovering manipulation. In addition, user manipulation may include: gazing manipulation meaning that a user gazes an object within a screen, motion manipulation controlling various operations by using a motion of a user, and voice manipulation, etc.

As described above, the detector 120 is the element to detects various manipulations of a user, and thus can also be referred to an inputter. That is, the detector 120 can be embodied as an inputter to receive user drawing manipulation.

The controller 130 controls operations of the user terminal device 100 according to the sensing results provided by the detector 120. Specifically, when a user drawing on a screen of the display 110 is detected, the controller 130 may generate an object having a size and a figure according to the user drawing at a location where the user drawing is performed, and display the object on at least one of the plurality of display layers. Herein, the object refers to an image drawn by a user. The image drawn by a user can be used as various objects such as an icon, a background image, and a widget, etc.

Meanwhile, a user can perform touch or hovering manipulation on a part of an area or on the object within the home screen. According to such user manipulation, when it is determined that an area or the object is selected, the controller 130 performs a control operation which is matched with the selected object. The control operation refers to operations performing various functions such as displaying an execution screen by executing an application, playing back multimedia contents such as a photo or a video, etc.

The controller 130 can perform control operations by using a program or data stored in the storage 140. Various programs and data required for the operations of the user terminal device 100 can be stored in the storage 140. Information on the home screen data to compose the home screen, and on the control information matched with at least a part of the image displayed on the home screen can be stored in the storage 140.

When a user directly draws an image, the controller 130 can provide the image to at least one page of the home screen. Accordingly, the home screen data, including an image directly drawn by a user, can be stored in the storage 140. In addition, when a user draws an image on the home screen and then adds, erases, or changes the image, the controller updates the home screen data so that the adding, erasing, or changing of image can be reflected on the home screen. Also, the control operation matched with the object can be arbitrarily changed in accordance with the user manipulation. Based on information control operations stored in the storage 140, the controller 130 performs a control operation corresponding to the object selected by a user.

For example, in the case of the default home screen being provided a, when an icon or a widget included in the default home screen is selected, the controller 130 executes the program matched with the selected icon or widget, and displays an execution screen. Meanwhile, as described above, in the case of the home screen which is directly configured by a user being provided, when an icon or a widget included in the home screen is selected, the controller 130 can perform the control operation which a user matches to the selected icon or widget. That is, a user can not only draw the home screen directly, but can also match a part or whole of the objects or background screens drawn by the user with the control operation which are desired by the user.

The controller 130 matches the control operation selected by a user with an object corresponding to the selected control operation, i.e., an image, and stores matching information in the storage 140. Herein, one control operation can be matched with an entire image or with at least one part of the image.

When a user directly configures the home screen, the controller 130 substitutes a default home screen launcher with a newly-configured home screen launcher. Accordingly, the new home screen directly configured by a user can be displayed.

FIG. 1 illustrates that the user terminal device 100 includes the display 110, the detector 120, the controller 130, and the storage 140, but is not limited to these examples. For example, the display 110 and the detector 120 can be formed as a single inputter. That is, the user terminal device 100 can be embodied as an inputter, a storage, and a control unit. In this case, the inputter can receive an input by a user (e.g., though a hand or pen). When an image is drawn by a user input and a control operation to be matched with at least one part of the image is selected, the controller 130 can match the image and the control operation, and store the matching information in the storage 140. The stored image can be provided to at least one page of the home screen. Accordingly, when at least a part of the image on the home screen is selected, the controller 130 can perform the control operation matched with the selected part.

Figure 2:
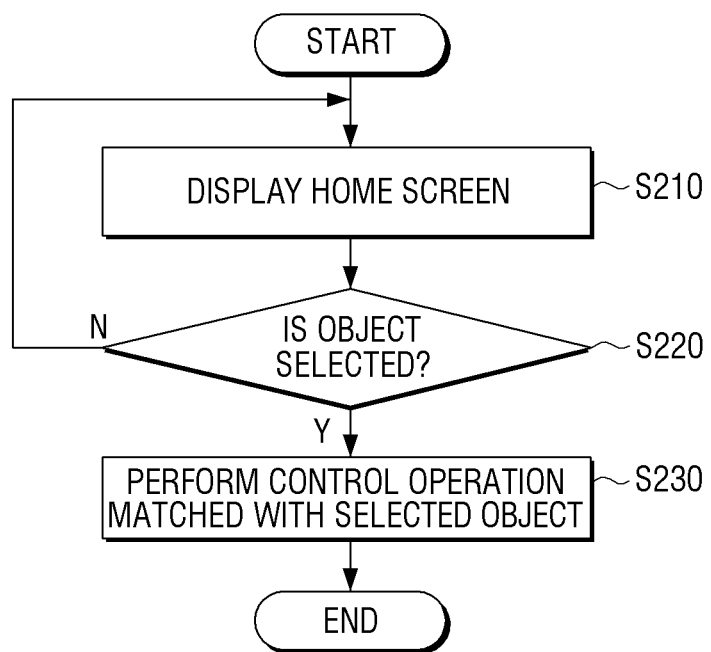
FIG. 2 is a flow chart to describe a method for displaying a user terminal device according to an exemplary embodiment.

FIG. 2 is a flow chart to describe a method for controlling a user terminal device according to an exemplary embodiment.

According to FIG. 2, the user terminal device 100 can display the home screen (S210). When a user selects at least one object (S220), the controller 130 performs a control operation matched with the selected object (S230). Herein, the home screen may be directly drawn by the user. That is, the user can directly draw an object or a background screen composing the home screen and generate the home screen. The home screen is distinct from the default home screen provided by a manufacturer or an application manufacturer, and in consideration that the home screen can be directly decorated by a user, the home screen can be referred to as a user creative screen (UCS). For purposes of explanation, the home screen hereinafter referred to is assumed to be the UCS.

Figure 3:
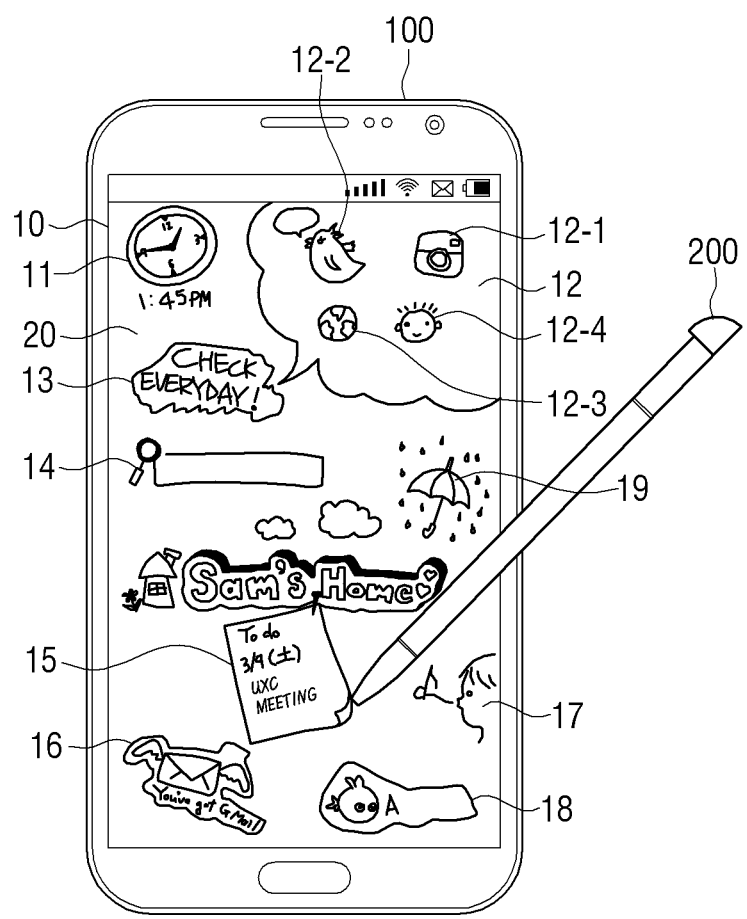
FIG. 3 is a drawing illustrating an example of the configuration of a home screen drawn by a user.

FIG. 3 is a drawing illustrating an example of a configuration of a home screen drawn by a user. According to FIG. 3, the home screen 10 of the user terminal device 100 is composed of a background screen 20 and various objects 11~19. In FIG. 3, the background screen 20 is illustrated as a white screen. However, the user can directly add various images, figures, or colors to the background screen 20. In addition, each object 11~19 is generated by the user by directly drawing, using the user's hands or an input means such as a pen 200, on the background screen 20.

Accordingly, indicative attributes such as size, form, location, and color of each object 11~19 are not standardized, and can be expressed in a diverse manner by the user's discretion. Each object can be described as if each object is individual with respect to each other, or can be described as a type of object (e.g., 12) including a plurality of objects (e.g., 12-1~12-4). The user can match an object drawn by the user with a control operation desired by the user. When the user matches control operations by objects, the controller 130 can store matching information in the storage 140 or other storing means. Thereafter, when the displayed object is selected, the controller 130 performs the control operation matched with the selected object based on matching information.

If the object 12 including the plurality of objects 12-1~12-4 is selected, the controller 130 can perform the plurality of control operations matched with each object 12-1~12-4 included inside the selected lump. In addition, it is not necessary that all the objects are matched with control operations. Therefore some objects can be utilized as a background screen 20 for visual satisfaction. In FIG. 3, all the objects are directly drawn by the user. However, default objects provided by the user terminal device 100 can also be used.

As described above, the home screen can be composed of a plurality of display layers, and an object or background screen composing the home screen can be separately displayed on each display layer.

FIGS. 4-7 are drawings to explain various exemplary embodiments which configure a home screen by using a plurality of layers.

Figure 4:
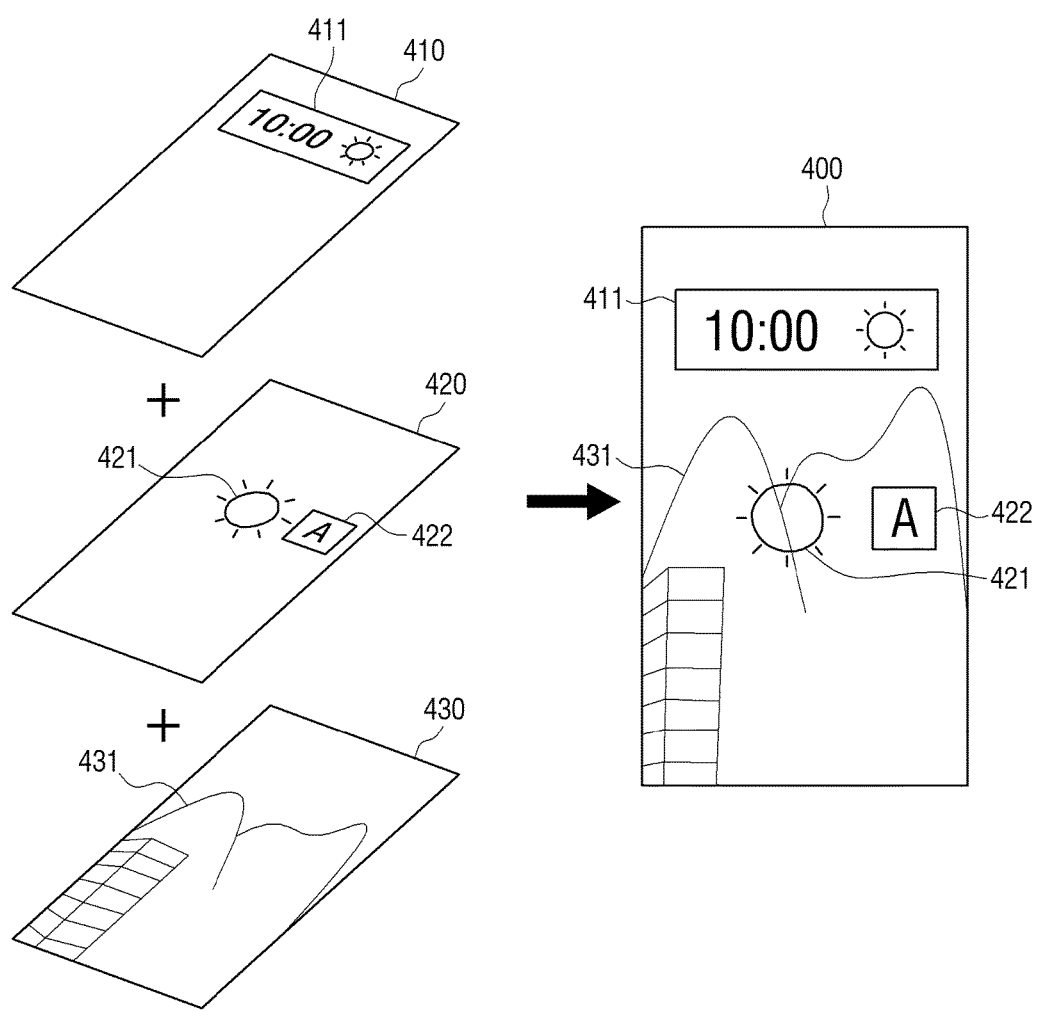
FIGS. 4-6 are drawings to explain various exemplary embodiments which configure a home screen by using a plurality of layers.

According to FIG. 4, the display 110 overlays three display layers (410, 420, 430) to composes one home screen 400. Images to be displayed on each display layer 410, 420, 430 can be stored in a graphic buffer (not illustrated) corresponding to each display layer 410, 420, 430. The display 110 overlays and displays the display layer images stored in each graphic buffer. Images displayed in each display layer 410, 420, 430 have a preset transparency. Accordingly, though overlaid, images in a lower display layer can be seen from an upwards direction, and images of each display layer 410, 420, 430 can compose one home screen 400.

FIG. 4 indicates a state in which a widget 411 is displayed on a first display layer 410, and icons 421 and 422 are displayed on a second display layer 420. A third display layer 430 is a display layer to display a background image 431.

By detecting a boundary of each object displayed on the first display layer 410 and the second display layer 420, the controller 130 confirms the location of the objects. Accordingly, when a coordinate value is detected by a touch sensor included in the detector 120, the object which is selected is determined by comparing the touch coordinate value and location of each object.

A user can directly draw each object or background image displayed on the first to third display layers 410, 420, 430. The controller 130 applies size, location, form, and width of a trace drawn by a user on a screen in a pixel line unit and performs rendering of each object and background image on a corresponding display layer. Therefore, the objects and background image can be displayed according to a user's intention.

The display 110 sequentially overlays and displays each display layer 410, 420, 430. Accordingly, a user can recognize one home screen 400 composed of the background image 431 and the objects 411, 421, 422.

A user can directly draw, not only the background image 411, but also each object 411, 421, 422 on a screen of the display 110, and move the image drawn on a separate program execution screen to the home screen. The controller 130 disperses the background image 411 or objects 411, 421, and 422 drawn by a user on each display layer 410, 420, and 430 in consideration of each attribute, and display them.

FIG. 4 only illustrates three display layers, but the number of the display layers is not limited to this, and the disposition location is not limited to the order illustrated in FIG. 4. For example, the widget 411 can be displayed on the second display layer 420, and the icons 421, 422 can be displayed on the first display layer 410. In addition, a widget or icon can be dispersed and displayed on a plurality of display layers.

According to another exemplary embodiment, a user, after drawing one background image, can classify each area of the background image, i.e., an image part, and utilize each image part as an independent object.

Figure 5:
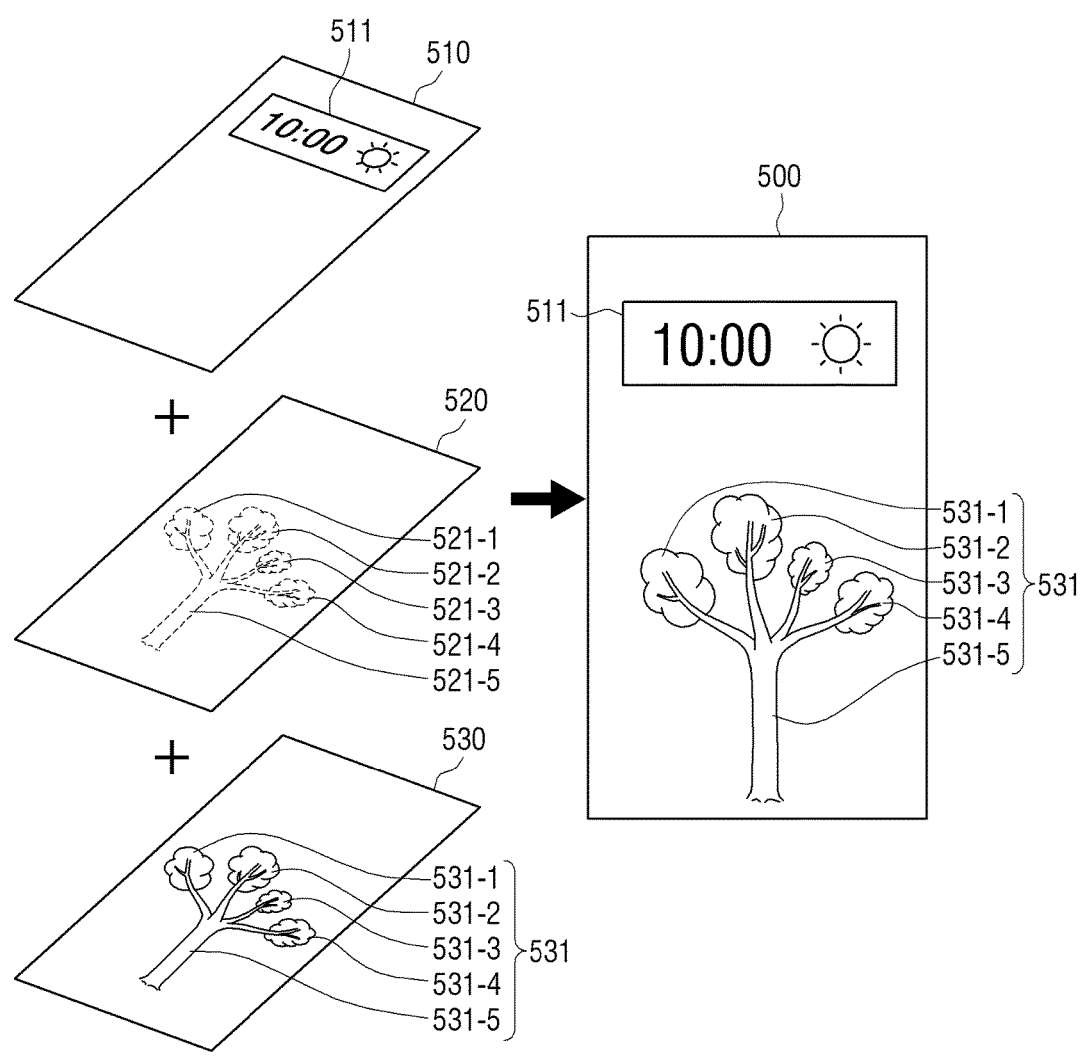

FIG. 5 is a drawing to explain a method for configuring the home screen according to another exemplary embodiment. According to FIG. 5, the display 110 overlays the first to third display layers 510, 520, 530 to compose one home screen 500.

Widget 511 or other icons (not illustrated) can be displayed on the first display layer 510, and the background image 531 can be displayed on the third display layer 530. The second display layer 520 can be embodied as a transparent layer for user interaction.

When a user draws the background image 531 on a screen of the display 110, the controller 130 displays the background image 531 on the third display layer 530. In addition, a part of the entire area of the background image 531 can be divided into a plurality of areas and each of the areas can be set as independent chunk areas 531-1~531-5.

The chunk area can be manually set by a user's selection, or the user terminal device 100 can automatically set the chunk area.

For example, in the case of manually setting the chunk area, when a user draws the background image 531, the controller 130 stores the background image 531. Then, when a user performs manipulation to classify each area by touching or dragging, by using an input means such as a finger or a pen, on the background image 531, the controller 130 can display a graphic line in accordance with the manipulation on the second display layer 520.

When the manipulation is completed, the controller 130 recognizes a plurality of areas limited by a user trace drawn in the second display layer 520 as a plurality of transparent objects 521-1~521-5, respectively. The controller 130 stores pixel coordinate values of each of the plurality of transparent objects 521-1~521-5. In addition, the controller matches control operations with each transparent object 521-1~521-5 and stores matching information together with each transparent object. Subsequently, when various user manipulations such as touch or hovering are detected, the controller 130 confirms transparent objects having pixel coordinate values corresponding to the detected points, and performs control operations corresponding to the confirmed transparent objects.

In the case of automatically classifying chunks, the controller 130 analyzes the features of user manipulation and classifies the background image 531 into a plurality of areas. The controller 130 can classify areas based on various criteria such as a unit of a closed curve, a unit of stroke, a unit of stroke counts, a unit of drawing order, etc.

A unit of a closed curve refers to recognizing parts composing a closed curve within one object as independent chunks, and a unit of a stroke refers to recognizing parts drawn by the pen 200 from when the pen touches the home screen to when the pen leaves the screen as one chunk. A unit of a stroke refers to recognizing drawn parts until strokes occur as much as a predetermined number as independent chunks, and a unit of drawing order refers to separating the parts which have been drawn first and the parts which have been drawn later based on a predetermined time unit, and recognizing these parts as independent chunks, respectively. Additionally, the controller 130 can classify areas based on other various criteria.

When the chunk classification is performed, the controller 130 assumes that there exists virtual transparent objects 521-1~521-5 corresponding to each chunk, and stores the pixel coordinate values of the objects 521-1~521-5. In addition, the controller stores information on the control operations matched with each object 521-1~521-5. Accordingly, when a user selects one area among a plurality of areas 531-1~531-5 displayed on the background image 511 on the home screen 500, the controller 130 performs control operations matched with the selected area.

Here, a chunk refers to a part composing an image, and thus can be called an image part. For example, when an image drawn by a user's drawing manipulation is the background image, the controller 130 of the user terminal device 100 can classify the background image into a plurality of image parts, that is, chunks, match the control operations with each image part, and store the matching information in the storage 140. The controller 130 can use the background image as the background screen of the home screen. In this circumstance, when one image part within the background image is selected, the controller 130 can perform the control operations matched with the selected image part.

The background image has been described in the above, but in the case when an image drawn by a user's drawing manipulation is a widget or an icon, the controller 130 can similarly classify the widget or the icon into a plurality of image parts and match the control operations by each image part.

According to an exemplary embodiment of FIG. 5, a user can draw the background image 531 of the home screen in size or shape desired by the user, and match control operations regarding the areas desired by the user, within the home screen.

For example, in the case of the background part without any mark or object within the background image 531, the control operations which a user wants can be matched. That is, a user can set and use even the background part, which a third party cannot recognize, as a transparent object.

In the exemplary embodiment of FIG. 5, the number and order of arrangement of a display layer can be changed in various ways, as described above.

Figure 6:
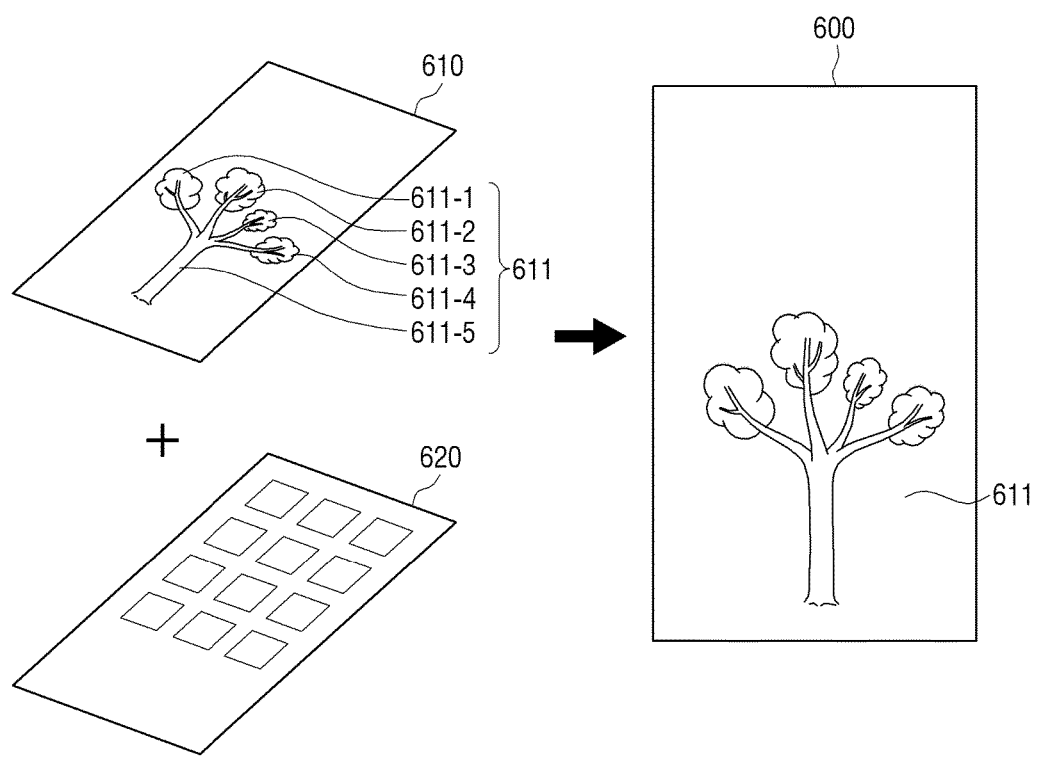

FIGS. 4 and 5 illustrate an exemplary embodiment where a user can directly draw a background of the home screen, but according to another exemplary embodiment, as illustrated in FIG. 6, a widget screen directly drawn by a user can also be overlaid on the existing home screen, and embodied as if a user him/herself changes the home screen.

FIG. 6 is a drawing to explain a method for configuring a home screen according to the exemplary embodiment. According to FIG. 6, a widget 611 is displayed on the top-level display layer 610. A user can directly draw the widget 611 in a way the user wants. When an image drawn by a user's drawing manipulation is the widget 611, the controller 130 displays the widget 611 on an area of the top-level display layer among a plurality of display layers. Accordingly, the widget 611 is overlaid on another lower display layer 620, and covers remaining display layers (not illustrated). Accordingly, a user can use the widget screen 611, as if it is the home screen 600.

In the same manner as FIG. 5, the widget screen 611 of FIG. 6 can be divided into a plurality of chunk areas 611-1~611-5, that is, image parts, and each of chunk area 611-1~611-5 can be utilized as if it is an object. When a plurality of control operations to be individually matched to each image part composing the widget 611 are selected, the controller 130 can match control operations by image parts and store them in the storage 140.

In addition, on the first display layer 610 where the widget screen 611 is displayed, another transparent layer can be further included. Since a method for dividing chunks has been explained in FIG. 5, further explanations will be omitted.

While the existing home screen is displayed on one display layer 620 among lower display layers of the first display layer 610, the controller 130 can display the widget screen 611 on the first display layer 610, so that a user can recognize the widget screen 611 as a new home screen 600.

According to user manipulation, by changing an order of the display layer 620 where the existing home screen is displayed and the display layer 610 where the widget screen is displayed, the controller 130 can provide a user with the existing home screen directly. In other words, according to the present exemplary embodiment, the user terminal device 100 can provide a plurality of home screen launchers. For one of the home screen launchers, a launcher which uses a screen directly drawn by a user can be included. Accordingly, when a user changes a launcher while a default home screen is displayed, a home screen suitable to the changed launcher can be provided. Therefore, according to an exemplary embodiment of FIG. 6, a user can provide a user creative screen by using a widget program without changing the existing home screen.

When an image drawn by a user's drawing manipulation is an icon, the controller 130 displays the icon on at least one display layer located on a upper side of a display layer where an image is displayed. Accordingly, a home screen where a background image and an icon are combined can be provided.

In addition, as described above, for various objects (including transparent objects) included in the home screen, at least one control operation can be matched to respective various objects. Further, a user can directly draw the home screen or an object within the home screen, or select control operations to be matched.

As such, the controller 130 can display the home screen composed of a plurality of display layers sequentially overlaid on the display 110. In addition, the controller can display an image directly drawn by a user on at least one display layer among the display layers. Accordingly, a part or whole of the home screen can be composed based on a user's creative idea.

Figure 7:
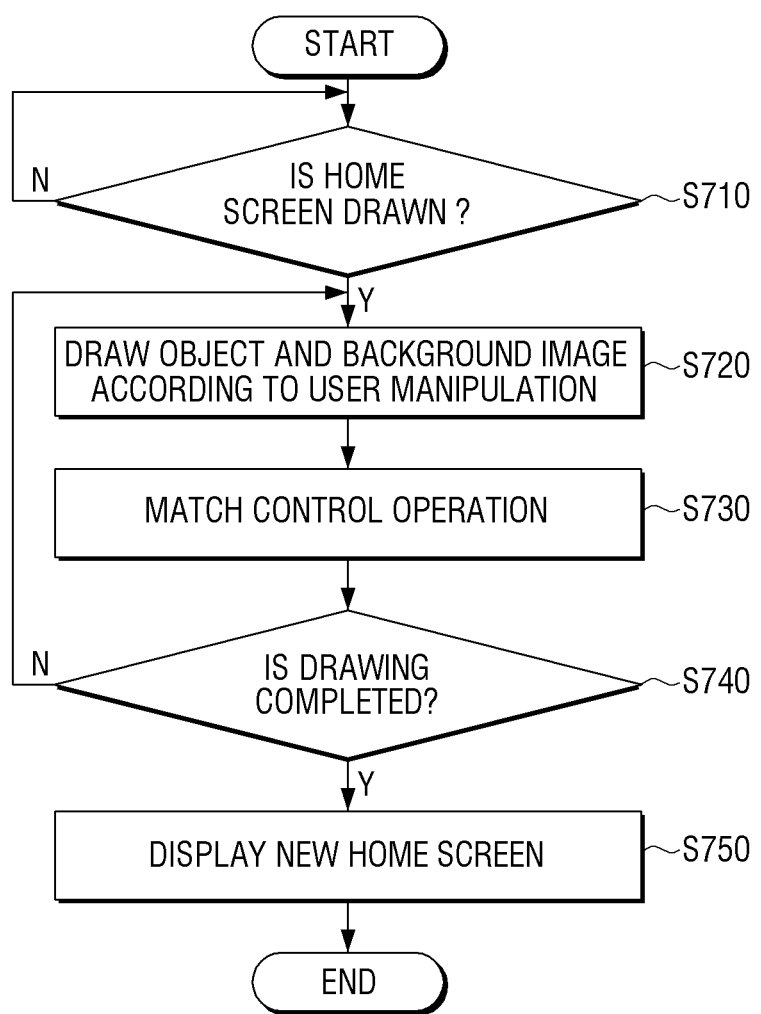
FIG. 7 is a flowchart to explain an example of a method for drawing a home screen in a user terminal device according to an exemplary embodiment.

FIG. 7 is a flowchart to explain a method for directly generating a home screen by a user in greater detail. According to FIG. 7, a user can execute a mode to draw the home screen by selecting a certain menu or a button. When it is determined that the home screen is to be drawn (S710), the user terminal device 100 draws an object and a background image on a screen according to a user manipulation (S720).

Specifically, if a user touches one point on a screen with fingers or a pen, the detector 120 communicates an x and y coordinate value of the touched point to the controller 130. When a user moves the touched point, the detector 120 provides the controller 130 with the changed touch coordinate values. Thus, according to a result of sensing provided by the detector 120, the controller 130 displays a line on the display 110.

More specifically, within the entire display area of the display 110, a line can be rendered at points corresponding to x, y coordinate values outputted by the detector 120. An object can be composed of such lines and can include various metaphysical images as well as text, symbols, marks, etc.

Consequently, a user can directly draw various figures, images, or objects by using the home screen as if it is a sketchbook. In addition, a user can match desired control operations to an object drawn by the user (S730). The controller 130 matches an object drawn by a user with a control operation selected by the user, and stores matching information in the storage 140.

When a user completes drawing (S740), the controller 130 can display a new home screen created by the user (S750). FIG. 7 illustrates that drawing is performed first and then a control operation is matched later. However, this is simply exemplary. In some exemplary embodiments, a control operation can be selected first and then drawing can be performed later. Various exemplary embodiments composing the home screen will be explained in further detail later. Furthermore, when a user directly draws the home screen by using a pen 200 (i.e., instead of fingers), more detailed drawing can be made. In addition, a user can select various tools required to draw the home screen, and draw various home screens more conveniently by using the tools.

Figure 8:
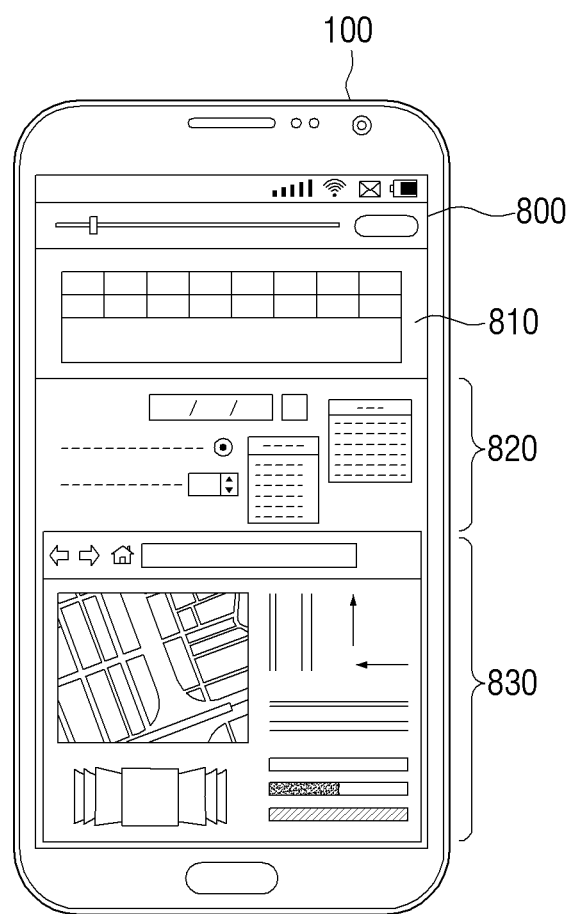
FIG. 8 is an example of an authoring tool screen to select various options used for a drawing.

FIG. 8 is an example of an authoring tool screen to select various options used for a drawing. When an authoring tool menu (not illustrated) is selected, the controller 130 can display the authoring tool screen 800, as illustrated in FIG. 8.

According to FIG. 8, the authoring tool screen 800 includes a first area 810 to select a color of an object, a second area 820 to select an attribute of an object, and a third area 830 to select a type of a line composing an object.

A user can arbitrarily select various tools within the authoring tool screen 800 and set an input attribute of an object. For example, at least one color from various colors can be selected in the first area 810, and object attributes such as a widget, an icon, a photo, text, a background image, etc. can be selected in various manners in the second area 820. In the third area 830, a line can be selected from various figures such as a solid line, a dotted line, an arrow, etc.

When a user performs drawing on a screen by using an input means, after the user has set the input attributes of an object, the controller 130 draws a line on a screen of the display 110 according to a value set through the authoring tool screen 800. For example, when a red color is selected in the first area 810, an icon is selected in the second area 820, and a solid line is selected in the third area 830, and a user is drawing on a screen by using a finger or the pen 200, etc., the controller 130 displays a red solid line according to a drawing trace on a display layer corresponding to an icon. Accordingly, a user can express more various objects.

FIG. 8 illustrates a case in which the authoring tool screen 800 is displayed in size of an entire screen, but the authoring tool screen 800 can be displayed in a partial area within the entire screen. That is, while a user drawing is being performed, the controller 130 can display a canvas area on which a user can draw and an authoring tool area together.

The controller 130 stores the home screen data to compose the created home screen in the storage 140. In addition, whenever an event to display the home screen occurs, the controller displays the home screen based on the home screen data. Such an event can be at least one event in which the user terminal device 100 is turned-on, booting is completed, and the device is in a usable state, an event where a button matched with the home screen return button is selected, an event where an unlock operation is done while the user terminal device 100 is in lock state, and an event where a toggle menu to alternatively select an application display screen and the home screen is selected.

Figure 9:
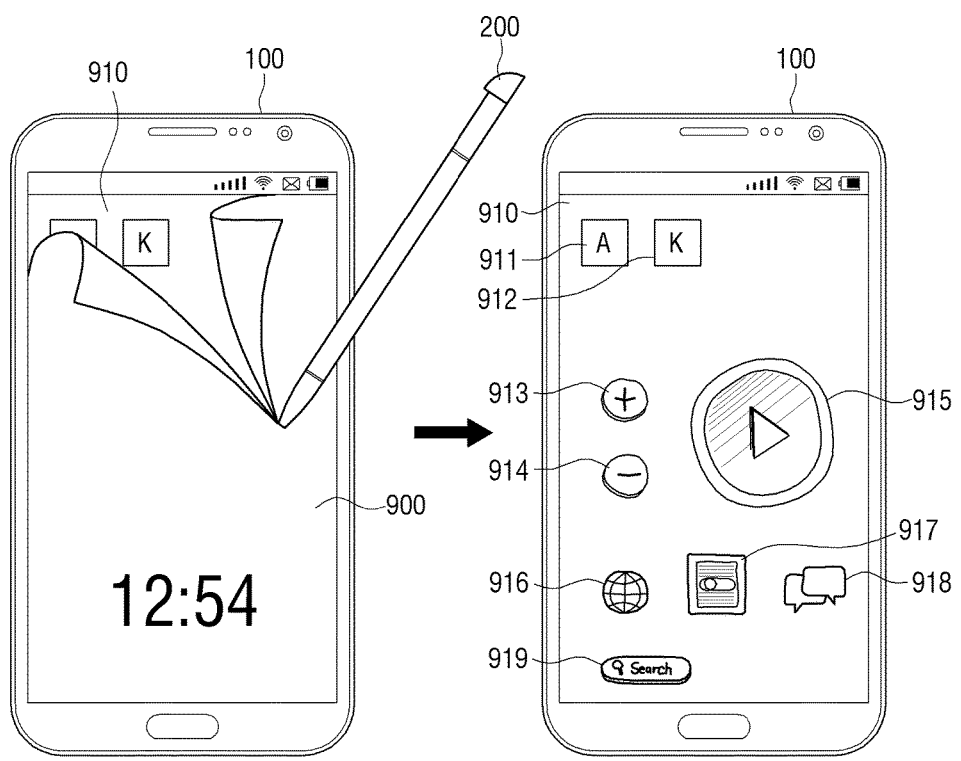
FIG. 9 is an example of a process of displaying a home screen by performing unlock operation from a lock state.

FIG. 9 is an example of a process of displaying a home screen by performing an unlock operation while the user terminal device 100 is in a lock state. According to FIG. 9, even when an unlock operation is done while the user terminal device 100 is in a lock state, the controller 130 can display the home screen 910.

If the user terminal device 100 is an apparatus which can be controlled by a pen 200 and the unlock operation is performed with the pen 200, a graphic effect tailored to the pen 200 can be displayed. That is, as illustrated in FIG. 9, while the lock screen 900 is displayed, when a user performs unlock operation which divides the lock screen 900 with the pen 200, the controller 130 provides a graphic effect in which it appears as if the lock screen 900 is torn like paper and displays the home screen 910 hidden by the lock screen 900.

The home screen 910, as described above, can be composed of a plurality of objects 911-919 directly drawn by a user and a background image. After the home screen 910 is generated, a user can change an object or a background image, add a new object, or delete an existing object, by using a finger or the pen 200. When the home screen changes, the controller 130 updates the home screen data stored in the storage 140 according to the changed content.

In addition, a user can arbitrarily select the control operations matched with each object or each area of a background image. An application, a certain image, a certain function, a bookmark, etc. can be linked to each object or each area.

Accordingly, a new concept home screen which can express a particular user's characteristics can be embodied.

In the above, the case where the home screen is composed of a user creative screen has been illustrated, but this is not only limited to the home screen. The user terminal device 100 can also display an object directly drawn by the user on various UI screens such as an icon screen, a lock screen, etc.

In addition, object drawing can be done in various forms according to a type of input means. For example, when a user draws a sharp line with the pen 200, and rubs the line with their hands or fingers, the controller 130 can display the sharp line as if the sharp line which has been already drawn is spread to its surroundings by the rubbing. Moreover, while drawing one object with the pen 200, a user can change a tool applied to the pen 200 with another hand not grasping the pen 200. In other words, while drawing lines as if drawing with a pencil by selecting a pencil attribute for the pen 200, when a user touches a screen with another hand, the line drawn with a pencil can be changed to be thicker or thinner, or can be changed to another attribute such as a brush or a pastel, instead of the pencil. In case of a change to an eraser attribute, an object at a point which is touched by the pen 200 can be erased. As described above, the controller 130 can provide various drawing functions according to different input means and input methods of a user.

A work to draw an object or a background image, and a work to select the control operation to be matched can be done in various orders and methods. Hereinbelow, various exemplary embodiments for drawing an object within the home screen and generating a user creative screen will be described in greater detail. For convenience of explanation, drawing of an object will be explained, but as described above, a user can also directly draw a background image, and the exemplary embodiments below can be applied to drawing of a background image.

<Exemplary Embodiment of Drawing First and Selecting a Control Operation Second>

Figure 10:
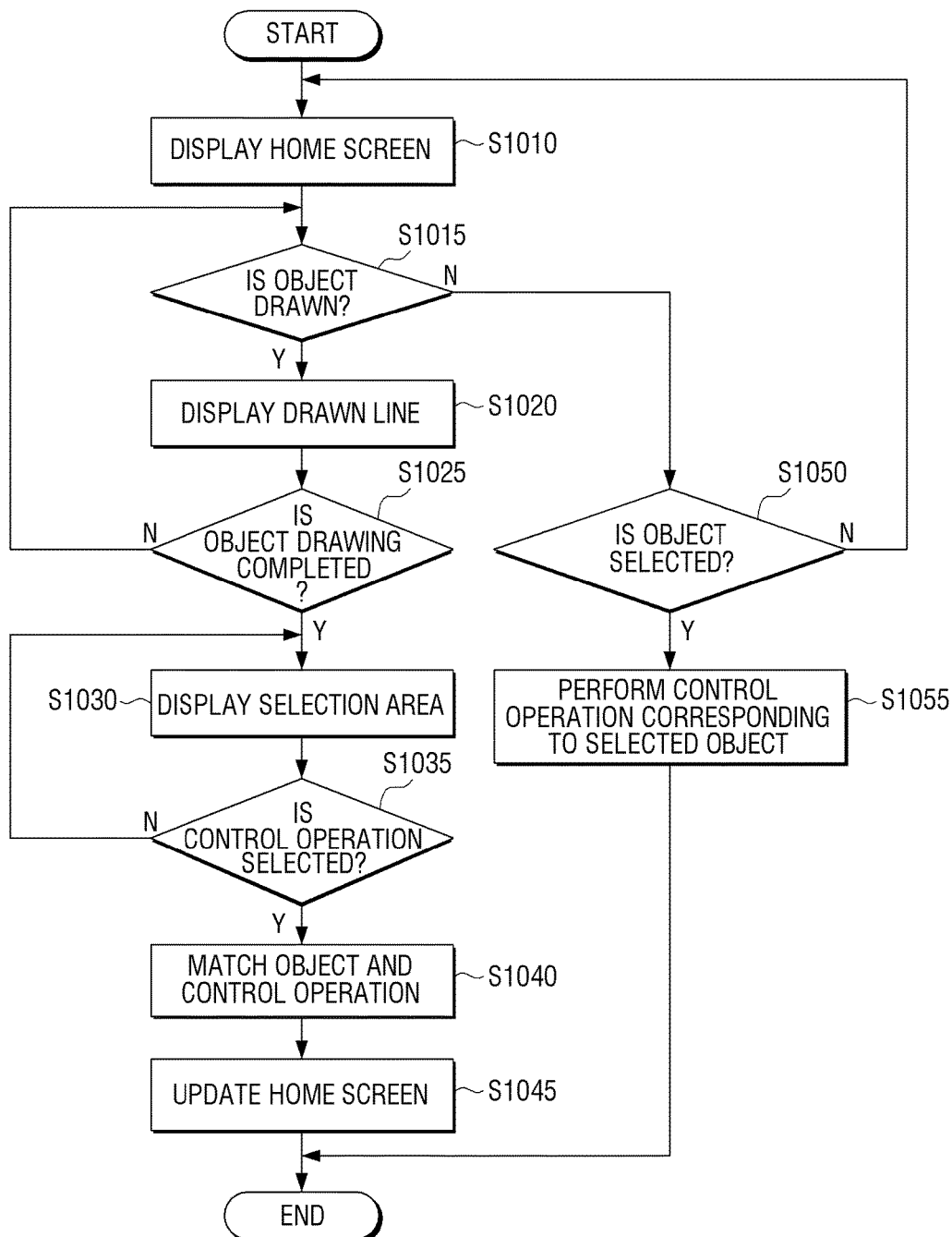
FIGS. 10-31 are drawings to explain a method of drawing a home screen according to various exemplary embodiments.

FIG. 10 is a flowchart to explain an example of a method for generating an object within a home screen. More specifically, FIG. 10 explains a method for generating an object according to an exemplary embodiment where a user draws an object and then selects the control operation to be matched with the object.

According to FIG. 10, the user terminal device 100 can display the home screen (S1010). A user can draw an object through the home screen or a separately prepared screen.

While an object is being drawn (S1015), the controller 130 displays a line drawn by a user on a screen (S1020). When it is determined that a user completes drawing an object (S1025), the controller 130 displays an area for selection to select the control operation to be matched with an object (S1030). In the area for selection, other information such as an icon or a text corresponding to each application and function stored in the user terminal device 100 can be displayed.

If a user selects at least one control operation within the area for selection (S1035), the controller 130 matches and stores the selected control operation with an object (S1040). Accordingly, the controller 130 updates the home screen data so that an object directly drawn by a user can be added to the home screen (S1045).

Meanwhile, when a user selects an arbitrary object while the home screen is displayed (S1050), the controller 130 can perform the control operation corresponding to the selected object (S1055).

Figure 11:
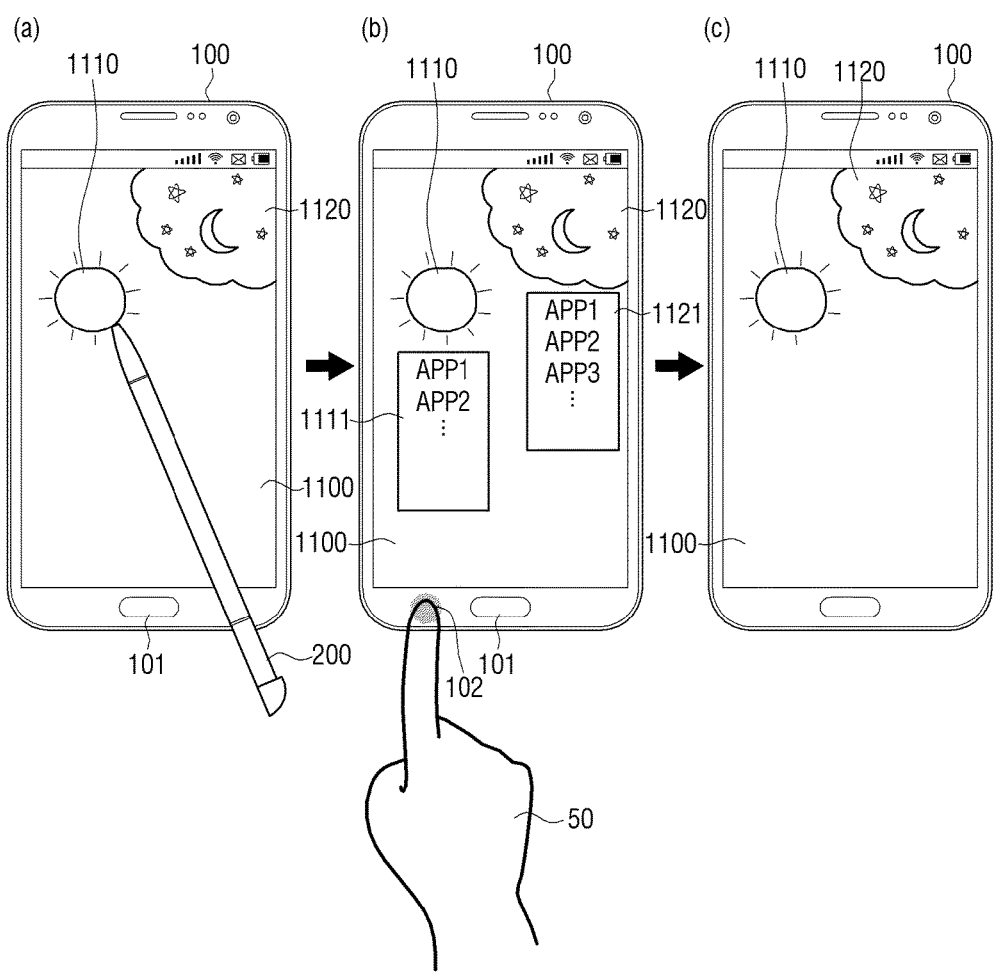

FIG. 11 is a drawing illustrating a process of generating an object according to the exemplary embodiment illustrated in FIG. 10. According to FIG. 11, a user can draw various objects 1110, 1120 with the pen 200 by using the home screen 1100 as if it is a canvas ((a) of FIG. 11).

After the objects 1110, 1120 are drawn, a user can select the control operation to be matched. When a user command is input to match the control operation, the controller 130 displays a list on the applications installed in the user terminal device 100 by objects 1110, 1120 ((b) of FIG. 11).

As illustrated in FIG. 11, in a bezel of the user terminal device 100, a home button 101 and a hidden button 102 can be located. In FIG. 11, it is illustrated that, when the hidden button 102 is selected (e.g., by the finger 50 of a user), each application list 1111, 1121 is displayed, but each application list 1111, 1121 can be displayed according to various events. For example, when a certain time (for example, 5 seconds) is elapsed after a user last touches a screen in drawing objects 1110, 1120, the controller 130 can recognize the objects 1110, 1120 drawn by a user and automatically display each application list 1111, 1121 at one side of the objects 1110, 1120.

A user can select an application to be matched to each object from each application list 1111, 1121. When the selection is completed, the controller 130 can match information of the corresponding object with information of the selected application and store the information in the storage 140 or other storing means. Accordingly, a user's own home screen 1100 can be generated ((c) of FIG. 11).

Meanwhile, in FIG. 11, a state where each application list 1111, 1121 is displayed on each object 1110, 1120 is illustrated. However, it can be also embodied that only one application list is displayed on a certain area within the home screen 1100. In this case, for each object, a user can first select an object and then select an application to be matched with the selected object from the application list and interconnect the object and an application with each other. In addition, FIG. 11 illustrates the case in which a plurality of objects 1110, 1120 are drawn and then, the selection areas 1111, 1121 are displayed. However, if only one object is drawn, one area for selection of an application which is to be matched with the object can be displayed. In addition, FIG. 11 described that the control operations are matched to entire objects 1110, 1120, but for some objects, the control operations are not be matched, and instead the object can be used as a part of a background image.

Figure 12:
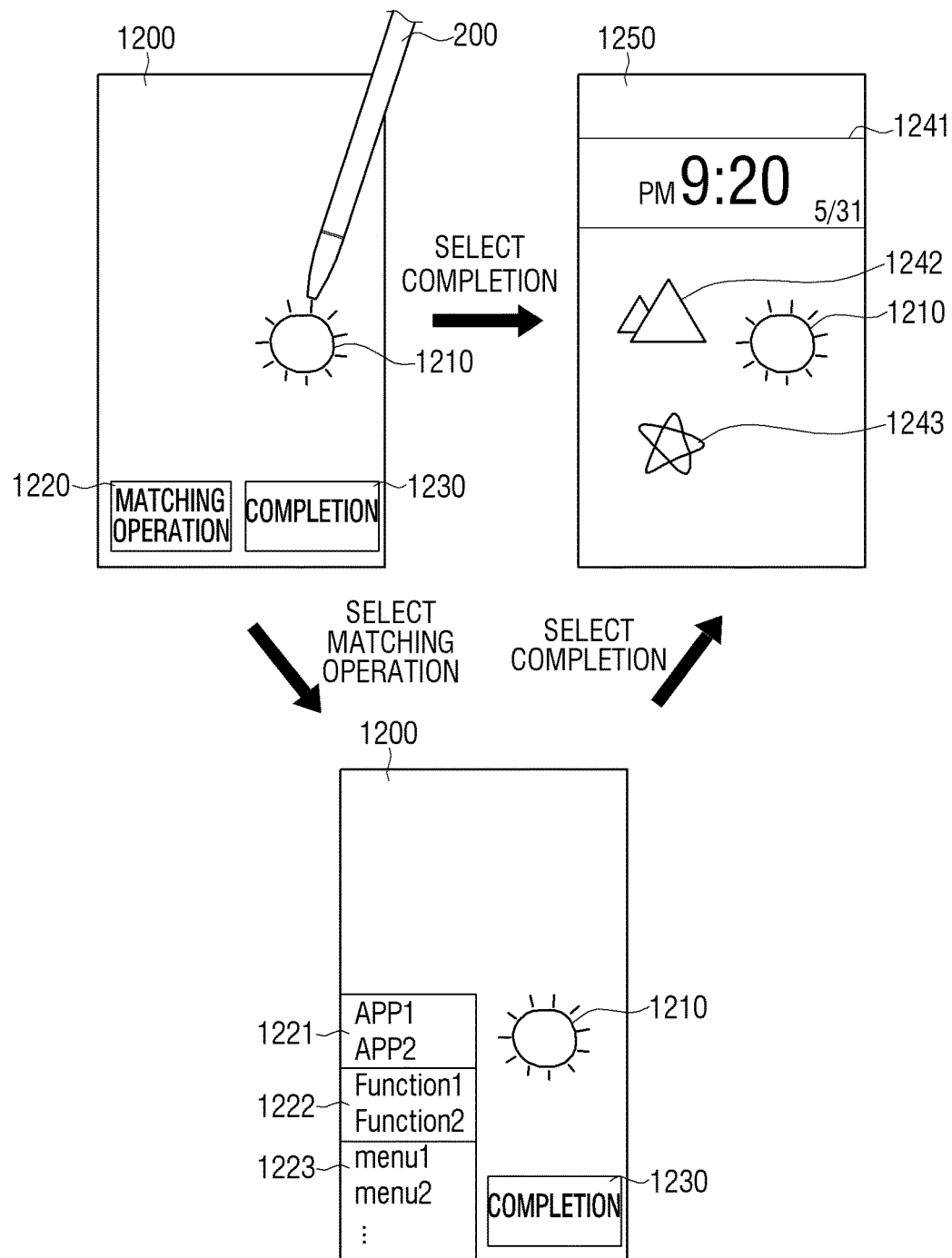

Meanwhile, FIG. 11 recites an exemplary embodiment of drawing an object by using the home screen, but as described above, an object can be drawn through a screen which is separate from the home screen. FIG. 12 indicates a process of drawing an object according to the exemplary embodiment.

According to FIG. 12, when a user selects a menu to draw an object, the controller 130 displays a canvas screen 1200 to draw an object. A user can draw an arbitrary object 1210 within the canvas screen 1200.

In the canvas screen 1200, menus 1220, 1230 selectable by a user is displayed. A user can, after drawing the object 1210 in the canvas screen 1200 freely, select the menus 1220, 1230.

For example, when the completion menu 1230 is selected after drawing is completed, the controller 130 relocates the object 1210 drawn by a user to the home screen 1250. Accordingly, in the home screen 1250, existing objects 1241, 1242, 1243 are displayed along with new object 1210. New object 1210 can be displayed on the home screen 1250 at a location where a user draws new object 1210 and in a form and size as drawn by a user. In this case, as the drawing is completed and no control operation has been matched to the drawing, the controller 130 does not match a control operation to the object 1210.

On the other hand, when a user selects the operation menu 1220 after a user completes drawing, the controller 130 displays lists 1221, 1222, 1223 having various control operations which are selectable by a user. In the lists 1221, 1222, 1223, in addition to displaying an application, various functions or menus can also be displayed. When a user selects at least one control operation from one of the lists 1221, 1222, 1223 and then selects the completion menu 1230, the controller 130 matches the selected control operation with the object 1210, and stores the matching data in the storage 140. In addition, the controller 130 displays the object 1210 drawn by a user on the home screen 1250. Afterwards, when the corresponding object 1210 is selected within the home screen 1250, the controller 130 performs control operation matched with the object 1210 based on the matching data.

In FIGS. 11 and 12, an exemplary embodiment which describes displaying a selection area after object drawing is completed is illustrated. However, the user terminal device 100 can also provide an area where a user can draw an object, and an area where a user can select the control operation together, as illustrated in FIG. 13.

Figure 13:
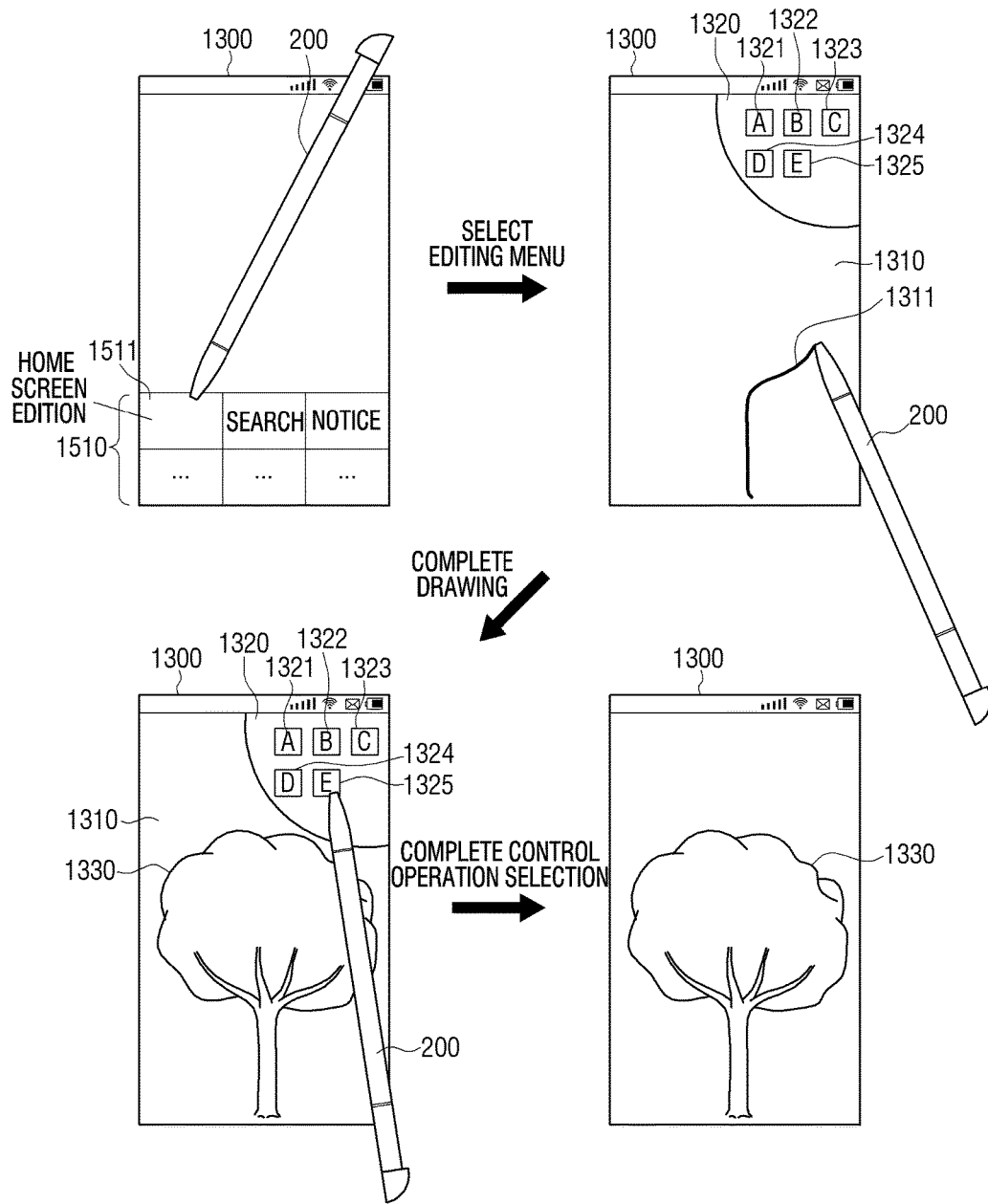

FIG. 13 is a drawing to explain the operations of the user terminal device 100 according to an exemplary embodiment. According to FIG. 13, when the home screen edition menu 1511 is selected from menu area 1510, the controller 130 can display a first area 1310 where a user can freely draw a new object and a second area 1320 to select the control operation to be matched with a new object.

In the second area 1320, reference objects 1321~1325, which are provided as a default by each control operation, can be displayed. In FIG. 11, the reference objects 1321~1325 are illustrated as an icon, but it is not necessary that the icon is displayed in the second area 1320.

A user can freely draw by using the first area 1310 as if it is a canvas. A user's drawing trace can be displayed as a line 1311. The line 1311 can be expressed as different types of lines such as a dotted line, a straight line, a curved line, etc.

When a user draws the object 1330 on the first area 1310 and then selects at least one control operation within the second area 1320, the controller 130 matches the selected control operation with the object 1330. Accordingly, the home screen 1300 is updated.

In FIG. 13, it is illustrated that when a control operation is touched within the second area 1320, the touched operation is matched to the object. However, the control operation can be matched to the object by using various methods such as drawing a closed cover including an object drawn in the first area 1310 and a reference object displayed in the second area 1320, together, interconnecting objects by touch and drag manipulation, touching the objects by two or more fingers or input means.

In addition, in FIGS. 11 and 12, it is illustrated that the home screen editing can begin only after a user selects a certain menu, but in other exemplary embodiments, a user can, without selecting a separate menu, draw an arbitrary object on the home screen, match the control operation with the object, and update the home screen.

Further, when a user takes out the pen 200 from the user terminal device 100 while the home screen is displayed, the controller 130 determines that the home screen editing can be performed, and can display the selection area first. That is, when the pen 200 is not used, it can be mounted and stored within a groove (not illustrated) inside the user terminal device 100. Inside the groove, a contact or a button which is touched when the pen 200 is mounted can be prepared. When the pen 200 is touched to or released from the contact or the button, an event signal indicating that the pen 200 is mounted to or separated from the user terminal device 100 is transmitted to the controller 130. Accordingly, the controller 130 can determine whether the pen 200 is mounted or separated, and determine operation modes accordingly.

In the above-exemplary embodiments, the control operation is selected after a user draws an object. However, according to another exemplary embodiment, a user can first select the control operation and then draw an object. Hereinbelow, an exemplary embodiment where a user selects the control operation first will be described.

<Exemplary Embodiment of Drawing an Object after Selecting the Control Operation>

Figure 14:
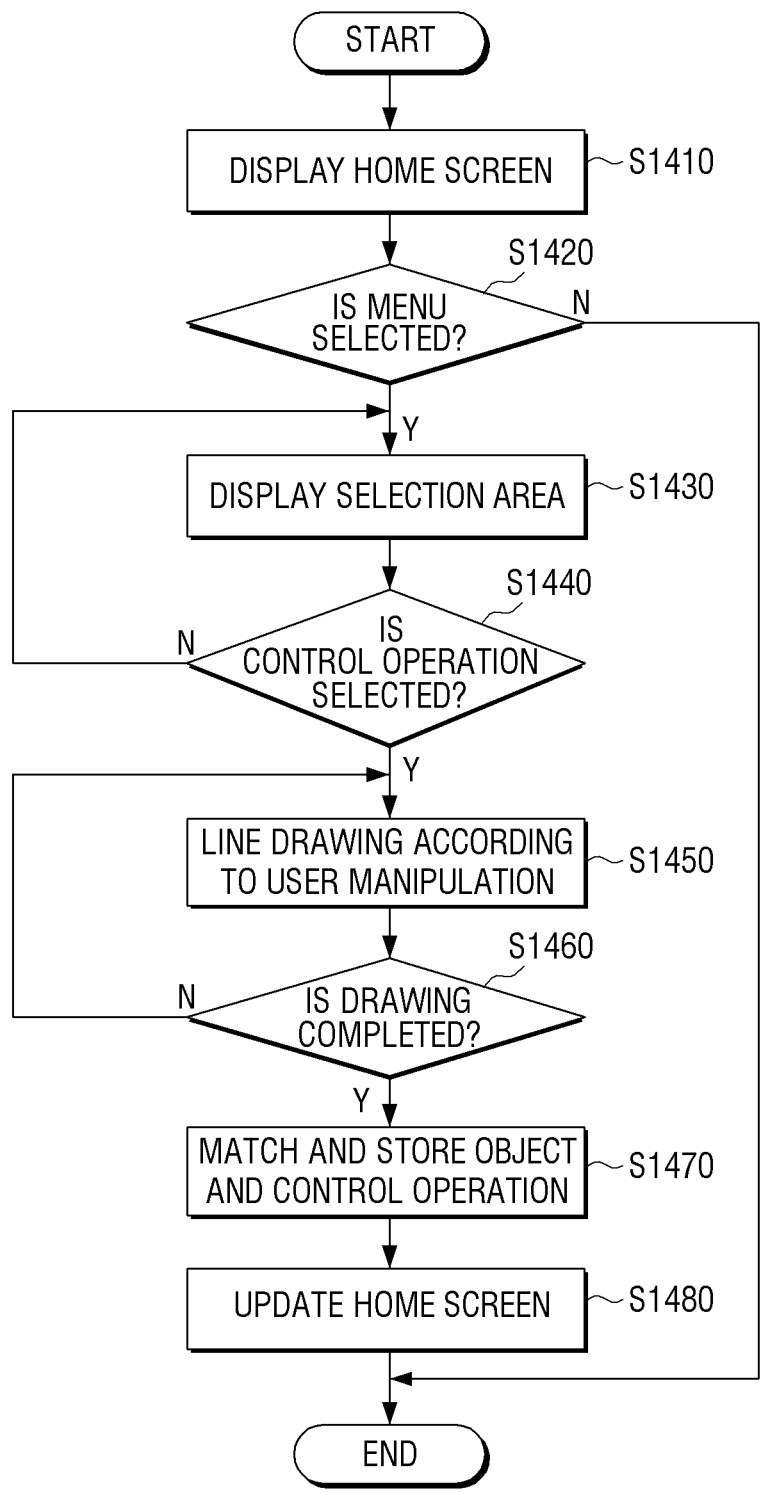

FIG. 14 is a flowchart to explain another example of a method for generating an object within a home screen.

According to FIG. 14, while the home screen is displayed (S1410) and when the home screen edition menu is selected (S1420), the user terminal device 100 can display the selection area where the control operation can be selected (S1430).

A user can select at least one control operation from the selection area (S1440). Next, a user can draw a line on the home screen (S1450). When drawing is completed (S1460), the controller 130 finalizes an object composed of lines drawn by a user, and matches and stores the control operation selected by a user with the object (S1470). Next, the controller 130 updates the home screen (S1480) so that the object drawn by a user can be additionally displayed.

Figure 15:
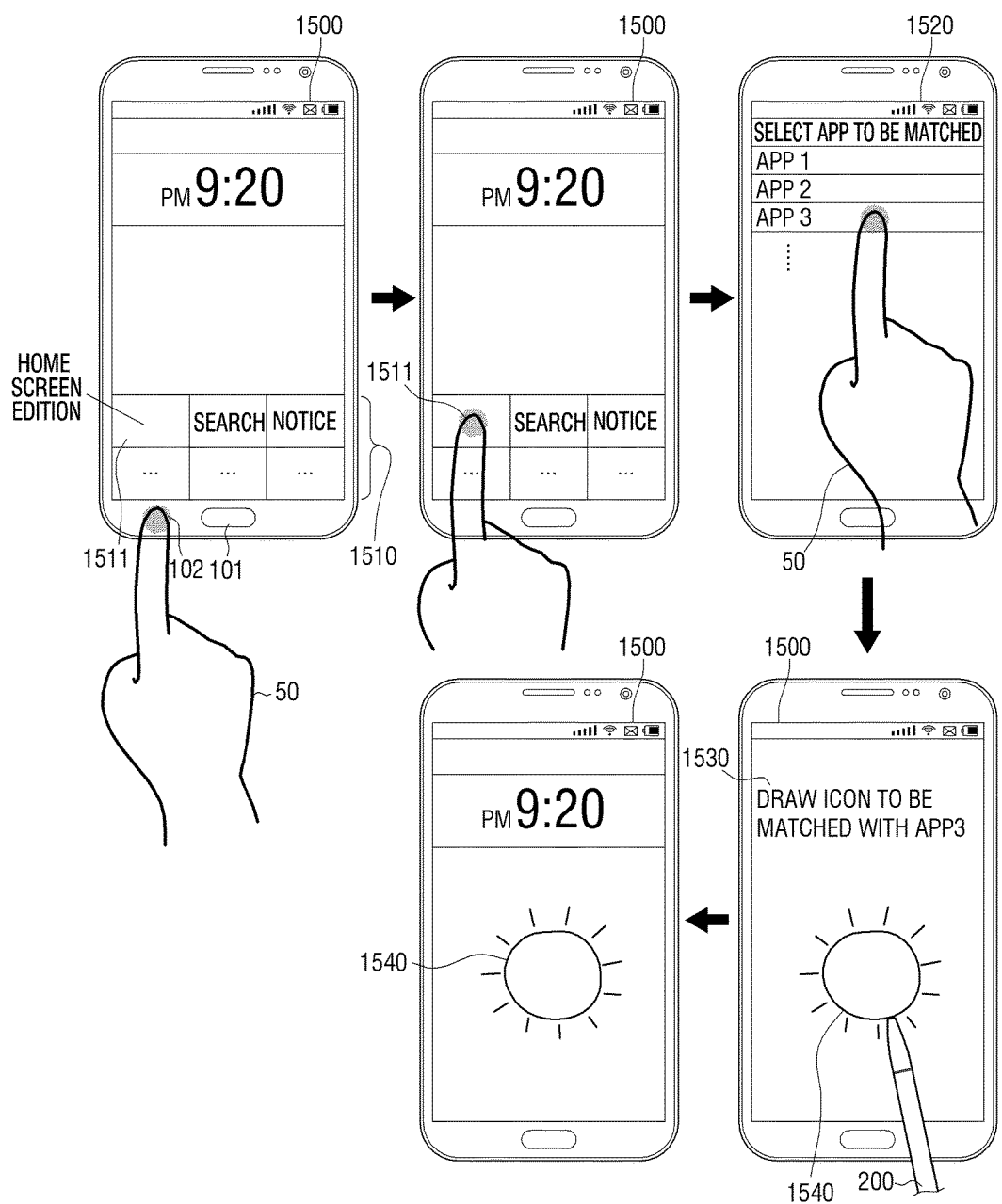

FIG. 15 is a drawing to explain a process for generating an object according to the exemplary embodiment of FIG. 14. As illustrated in FIG. 15, when a user selects the hidden button 102 while the user terminal device 100 displays the home screen 1500, the menu area 1510 is displayed on one side of the home screen 1500. In the menu area 1510, various menus including the home screen edition menu 1511 can be displayed. The home screen edition menu 1511 refers to a menu with which a user can directly add, edit, delete, or change an object on the home screen.

When the home screen edition menu 1511 is selected, the controller 130 can display the selection area 1520 to select the control operation to be matched in the home screen 1500. In FIG. 15, applications are listed within the selection area 1520, but various data files, folders, and functions can be displayed in addition to applications.

For example, the controller 130 can display information on various control operations such as a menu to change the operation mode of the user terminal device 100, a menu to selectively activate or inactivate some hardware in the user terminal device 100, or a short function menu, etc. in the selection area 1520.

Thereafter, when a user selects one control operation, the controller 130 removes the selection area 1520 and displays the home screen 1500. In this case, a message 1530 which induces a user to draw an object can be displayed on the home screen 1500. According to the message 1530, a user can draw the object 1540 freely on the home screen 1500.

In FIG. 15, it is illustrated that menu selection is done by the finger 50, and drawing an object is done by the pen 200, but this is merely to indicate that a user can select the control operations and draw an object by using the finger 50 or the pen 200, and thus is not limited thereto.

When drawing the object 1540 is done, the controller 130 displays new home screen 1500 in which new object 1540 is added to existing objects. Whether or not the object drawing is done can be determined in various ways. For example, it can based on whether a preset time has been elapsed from the completing timing of drawing by the user. For example, if 5 seconds have elapsed after the last stroke is done, it can be determined that the object drawing is done.

Alternatively, when a user who is drawing the object 1540 selects a certain button or menu, the controller 130 may determine that the object drawing is completed at that point of time. Thereafter, unless the object is deleted or edited, the object 1540 is displayed within the home screen 1500.

A user may have difficulty in drawing an object if the user has no artistic talent. Accordingly, a reference can be provided to a user so that the user can draw an object more easily. Hereinbelow, exemplary embodiments which provide a reference to make drawing easier will be explained in detail.

<Exemplary Embodiment to Provide a Drawing Reference>

Figure 16:
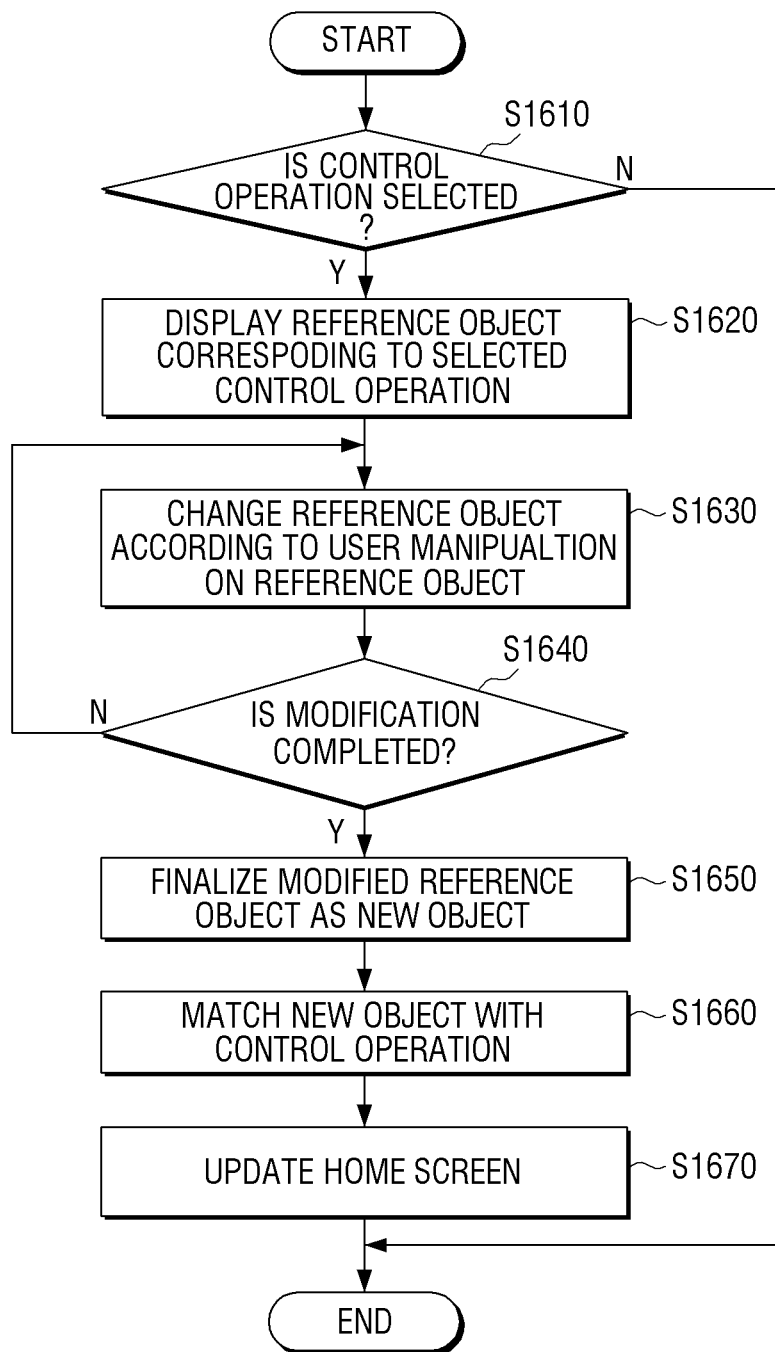

FIG. 16 is a flowchart to explain a method for generating an object by editing a reference object, according to another exemplary embodiment. According to FIG. 16, when a user selects the control operation within a selection area first (S1610), the controller 130 displays a reference object corresponding to the selected control operation on the home screen (S1620).

By using various input means such as fingers or the pen 200, a user can transform the reference object (S1630). More specifically, a border part of the reference object can be enlarged by dragging the part outside of the original border by using touch and drag method, or can be reduced by pushing the part inside of the original border. Furthermore, a user can modify the reference object by using various other methods.

When modification is completed (S1640), the controller 130 finalizes the modified reference object as a new object (S1650), and matches with a new object and the control operation a user selects (S1660). The controller 130 updates the home screen data so that the home screen including a new object can be composed (S1670).

Figure 17:
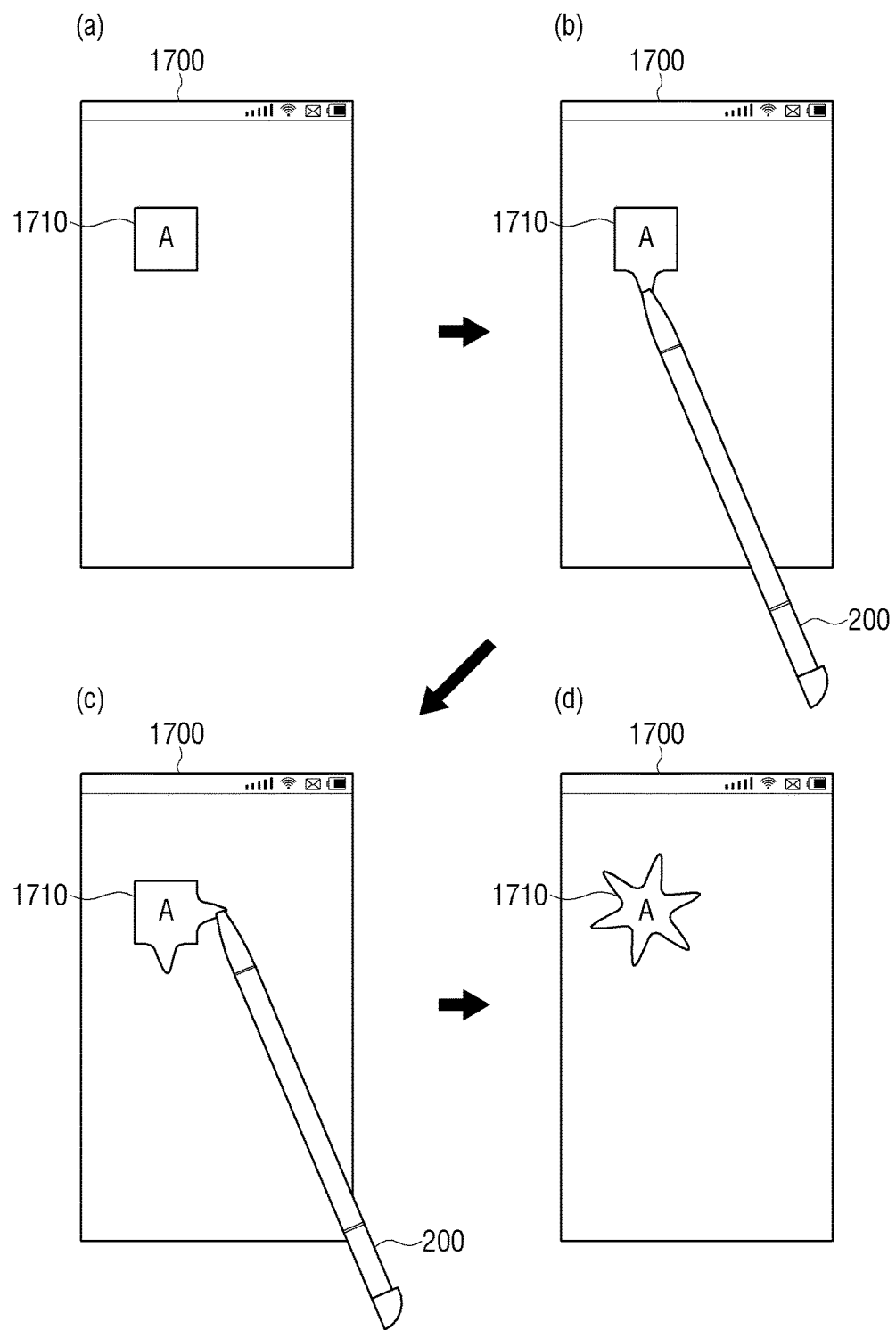

FIG. 17 is a drawing to explain a method for generating an object according to the exemplary embodiment of FIG. 16. As illustrated in FIG. 17, when a user selects the control operation first, the reference object 1710 corresponding to the selected control operation is displayed in the home screen 1700 ((a) of FIG. 17).

A user can edit the reference object 1710 by using the pen 200 ((b), (c) if FIG. 17). That is, when a border of the reference object 1710 is dragged outside of the original border by touching the border by using the pen 200, the boundary part is enlarged. As such, by enlarging the border in various directions, a user can generate a new star-figured object 1710 ((d) of FIG. 17).

In FIG. 17, only the case where the boundary of the reference object 1710 is enlarged in an outside direction is described. However, a user can also generate an entirely new object by reducing the reference object 1710 in an inside direction or changing the shape, size, color, or additional text, etc. by using the authoring tool.

In addition a reference object (e.g., 1710) can also be provided as a watermark type. More specifically, the controller 130 can display the reference object as a dotted line or transparently. A user can then draw along the lines composing the reference object. A trace drawn by a user can be displayed in a solid line or in color or thickness different from the reference object. Accordingly, a user can conveniently draw an object based on a watermark, as illustrated in FIG. 18.

Figure 18:
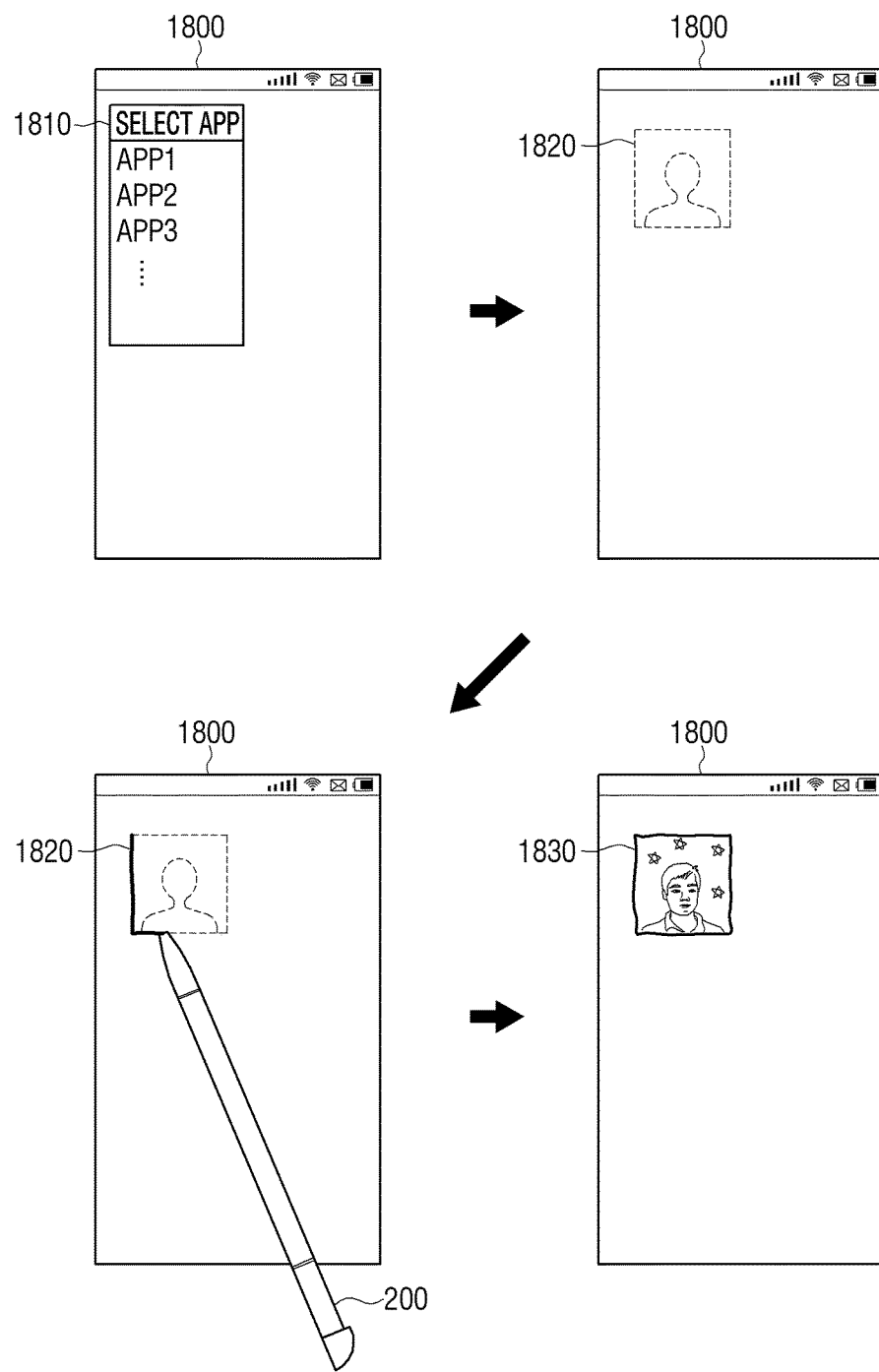

FIG. 18 is a method for generating an object by using a watermark. According to FIG. 18, the controller 130 displays the selection area 1810 on the home screen 1800. The controller 130 can display the selection area 1810 when, for example, a user selects the home screen edition menu or when a user takes out the pen 200 from a main body of the user terminal device 100, etc.

From within the selection area 1810, a user can first select the control operation which the user wishes to match with an object to be drawn. In this case, the selection area 1810 disappears, and the reference object corresponding to the selected application is displayed on the home screen 1800 as a watermark. The reference object 1820 can be displayed in a dotted line so that a user can draw along the line, or can be displayed as an indistinct background image. Thus, a user can draw along a line of the reference object 1820.

The reference object 1820 is simply provided for the benefit of a user and it is not necessary that a user draws an object exactly same as the reference object 1820. When the object 1830 is completed, the controller 130 matches an application which the user selects with the completed object 1830.

Figure 19:
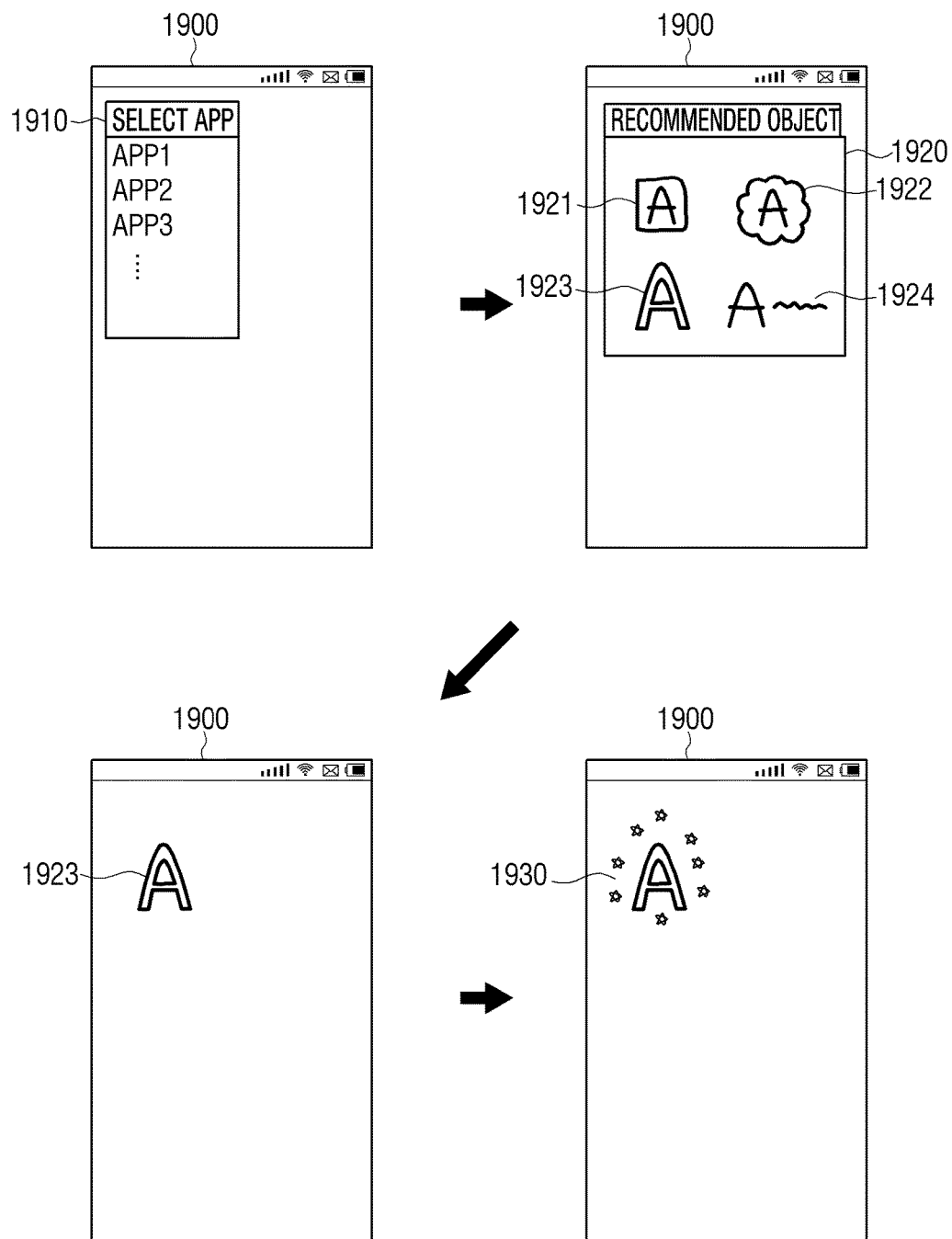

When a user selects the control operation first, the controller 130 can show various reference objects related to the selected control operation and let a user select one of them, as illustrated in FIG. 19.

FIG. 19 is a drawing to explain a method for generating an object according to an exemplary embodiment. According to FIG. 19, the controller 130 displays the selection area 1910, from which a user can select a control operation, on the home screen 1900. In this state, when a user selects a control operation, the controller 130 displays a recommended object area 1920 which includes at least one recommended object 1921~1924 related to the selected control operation. The recommended object can be an icon, text, an image, etc. related to the control operation selected by the user.

The controller 130 can receive and display the recommended object from a program corresponding to the selected control operation or from a server device which provides a program or a content, and can select and display the recommended object from the objects stored in the storage 140. According to an exemplary embodiment in which the controller 130 directly selects and displays the object, the controller 130 can determine a recommended object according to a name, features, type, etc. of the control operation which a user selects.

For example, when a game program named ABCDE is selected, the controller 130 can display an icon, text, or an image, which includes a part or whole of ABCDE, or which symbolizes the features or type of the game program, as a recommended object. Alternatively, when a certain content is selected, the controller 130 can display a preview image or title of the content as a recommended object. When a user selects one object 1923 within the recommended object area 1920, the selected object 1923 is displayed on the home screen 1900. A user can use the selected object 1923 as it is, or can use it after modifying the object.

FIG. 19 illustrates a state of adding additional objects to the object 1923 and generating a new object 1930. Modifying an object can be performed with a method described in FIG. 17 above.

As discussed above, the user terminal device 100 can be embodied so that an object is generated in an order of drawing an object first and then selecting a control operation, or on the contrary, can be embodied so that a control operation is selected first and then an object is drawn. In case where the control operation is selected first, a guide object, which can be the reference for drawing, can be provided so that drawing can be easier for a user.

Figure 20:
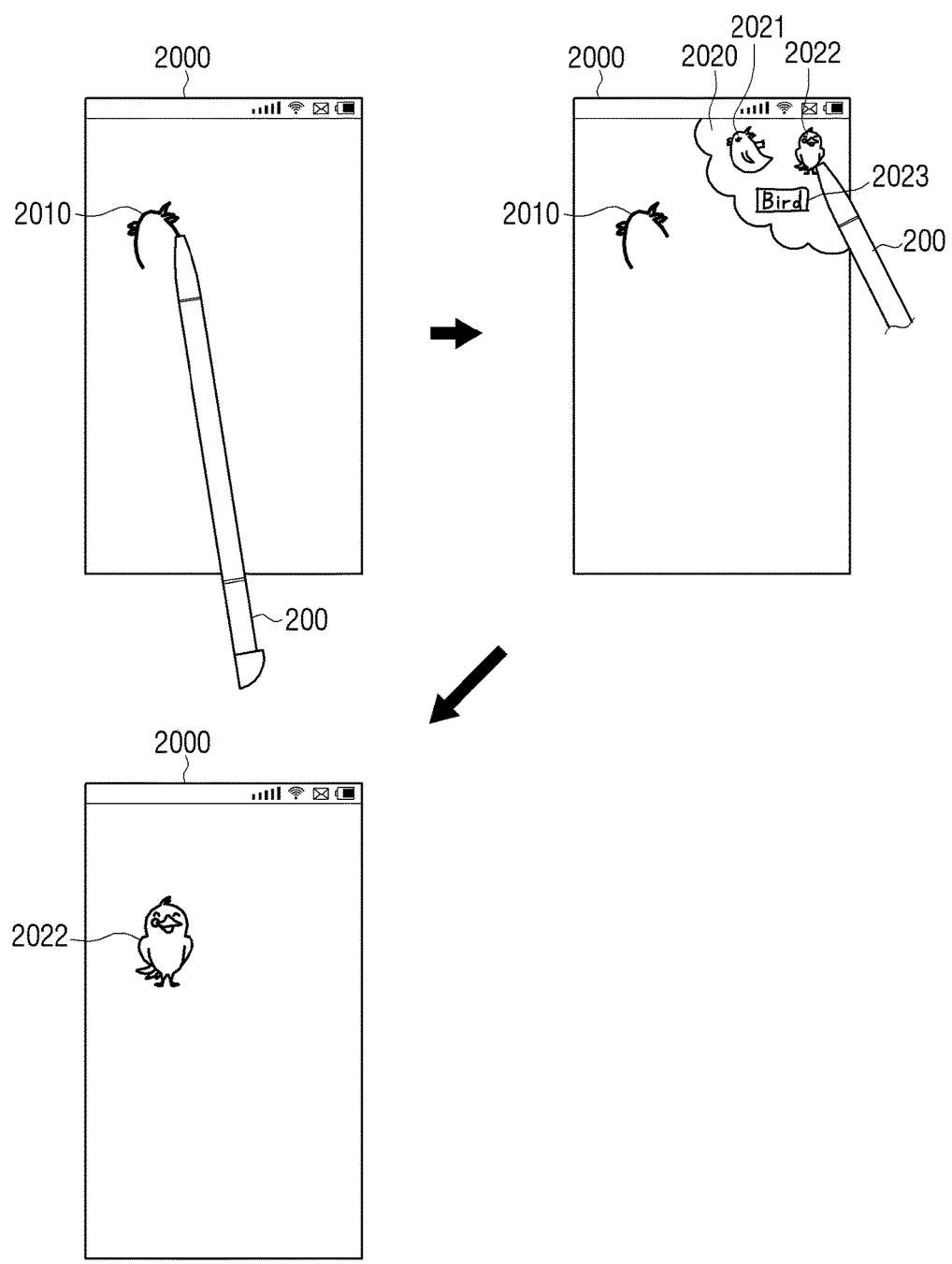

The user terminal device 100 can analyze an object which a user draws on a real-time basis and recommend the reference object which corresponds to the analyzed object, as illustrated in FIG. 20.

FIG. 20 is a drawing to explain a method for generating an object according to an exemplary embodiment. According to FIG. 20, when a user draws an object 2010 on the home screen 2000, the controller 130, by using a handwriting recognizing module, analyzes the object 2010 drawn by a user on a real-time basis, and determines the features thereof. For example, FIG. 20 illustrates the case where a user draws a bird.

The controller 130 compares information from various objects recorded in the database stored in the storage 140 with the object 2010 which the user draws. As a result of comparison, if an object similar to the object 2010 which a user draws is discovered, the object and various objects related to the object are determined as the reference object and displayed in the selection area 2020.

FIG. 20 illustrates a state where a plurality of the reference objects 2021-2023 are displayed within the selection area 2020. When a user selects one reference object 2022 within the selection area 2020, the selected reference object 2022 is displayed within the home screen 2000. A user can use the reference object 2022 as it is, or can arbitrarily change and use the object 2022.

Figure 21:
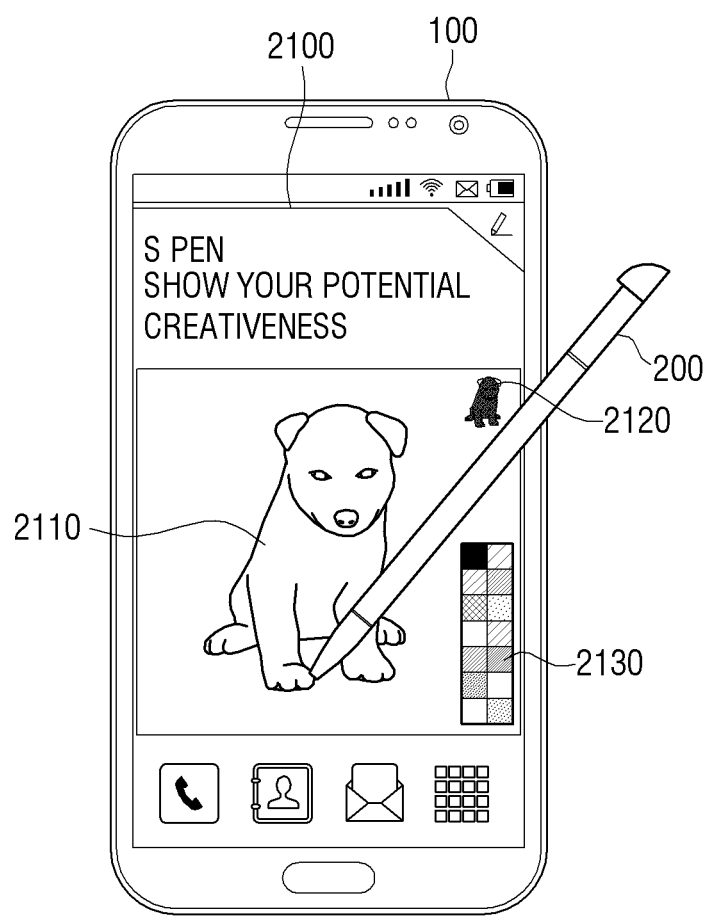

The controller 130 can provide a user with a rough sketch, and let a user fill the sketch with various colors so as to configure an object which the user wants, as illustrated in FIG. 21.

FIG. 21 is a drawing to explain a method for generating an object according to an exemplary embodiment. According to FIG. 21, the controller 130 executes a program for user drawing and displays the screen 2100. In the screen 2100, the object 2110 where a border only is drawn, the reference image 2120, and the color selection area 2130 are included. After touching a random color in the color selection area 2130 by using the pen 200, a user can color an empty area within the object 2110 by referring to the reference image 2120. The reference image 2120 is optional and can be omitted. If coloring is completed, the controller 130 can add and display the object 2110 colored by a user on the home screen. According to the present exemplary embodiment, a user or a child who cannot draw well is still able to add an object which the user or the child wants, and therefore user satisfaction can be improved significantly.

The controller 130 can change a form of the object 2110 in a preset time interval so that a user can practice coloring by using different forms of the object 2110. Accordingly, exemplary embodiments can be embodied such that not only can the esthetic sense be satisfied through the home screen, but also that a game or practice can be available by using the home screen.

In FIG. 21, the object 2110 displayed on the screen 2100 can be determined randomly or according to a user selection from among various objects such as an object which a user has drawn in the past, an object shared from another user, an object downloaded from an external server, an object provided by the user terminal device 100 as a default, etc. In addition, the screen 2100 in FIG. 21 is embodied as a widget, and can be displayed over the entire home screen or on a part of the home screen. In this case, when a user selects a widget, the controller 130 displays the screen 2100 as illustrated in FIG. 21 so that a user can use it.

In the above-discussed exemplary embodiments, the case in which generating a new object and adding the object to the home screen is described. However, a user can also change the home screen which the user has already drawn, and update the home screen at any time.

Figure 22:
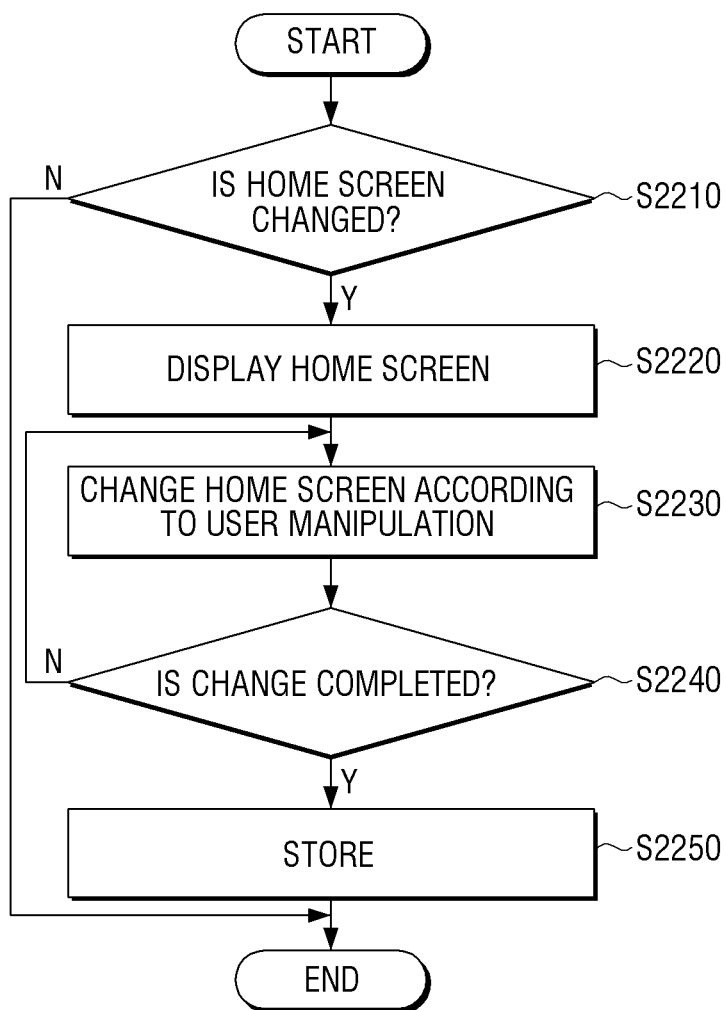

FIG. 22 is a flowchart to explain a method for changing a home screen. According to FIG. 22, a user can select a menu to change the home screen and begin an operation to change the home screen (S2210). When a menu to change the home screen is selected, the controller 130 displays the home screen (S2220), and changes an operation mode of the user terminal device 100 from a use mode to an editing mode. A use mode refers to a mode which performs a control operation matched with an object selected by a user, when a user selects the object of the home screen. An editing mode refers to a mode in which, if an object is selected, a control operation is not performed and instead, a selection for editing the object is recognized.

In the state of an editing mode, when user manipulation is added to an object displayed on the home screen, the controller 130 can change a location, a size, or form of an object according to the user manipulation (S2230).

When a user selects a menu to complete a change mode (S2240), the controller 130 stores home screen data to configure the changed home screen (S2250).

Figure 23:
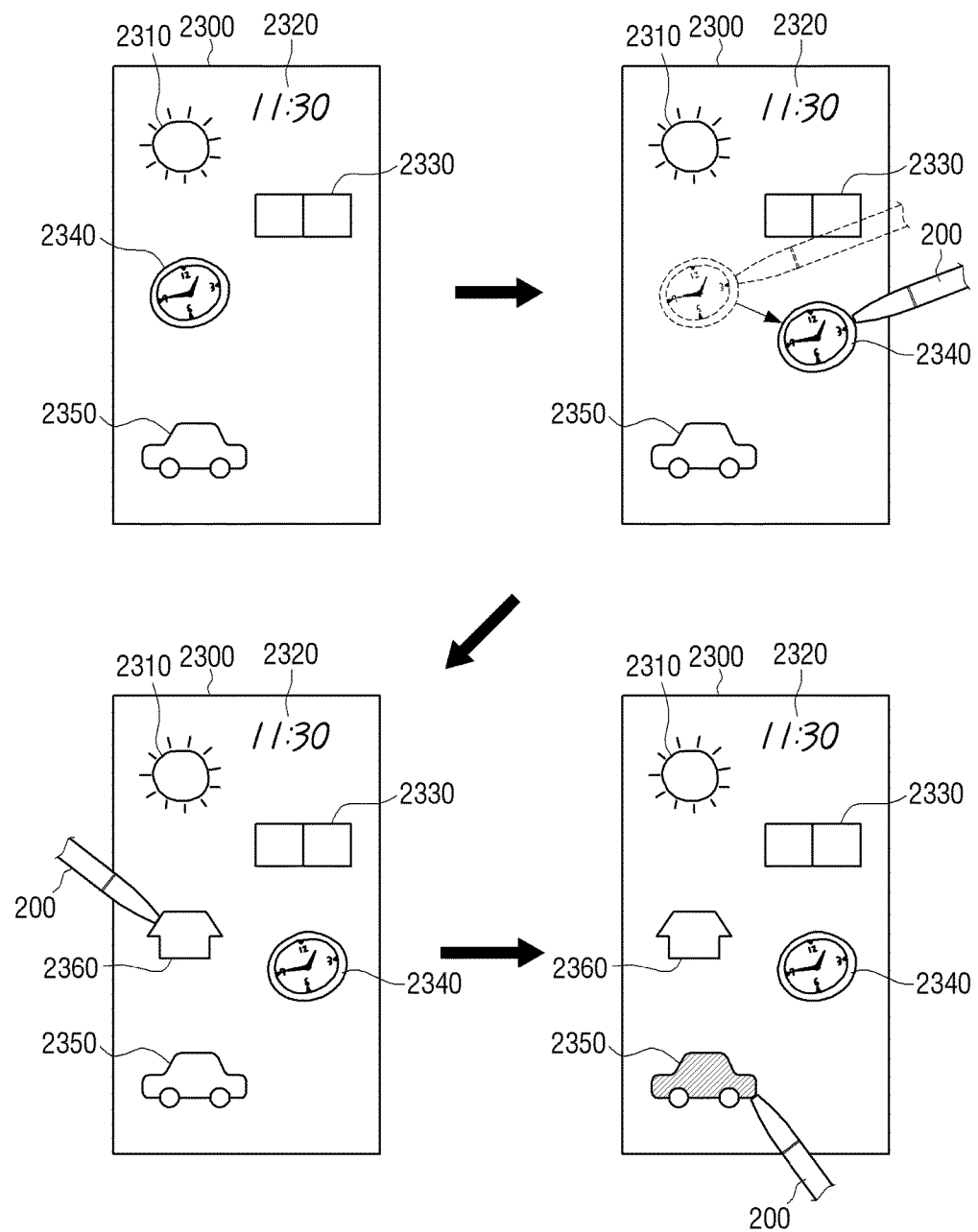

FIG. 23 is a drawing to explain a method for changing a home screen. According to FIG. 23, when changed to an editing mode, the controller 130 displays the home screen 2300. A user can move a position of objects 2310-2350 displayed on the home screen 2300 according to touch and dragging methods. When one object 2340 is touched for more than a certain period of time (i.e., a long touch), the controller 130 determines that a condition for moving a position is satisfied. Accordingly, when dragging is performed, the controller 130 moves the object 2340 according to the dragging and displays the object 2340 in the final position when the touch is released.

In addition, a user can draw a new object 2360 within the home screen 2300. Also, a user can modify an existing object 2350.

When user drawing manipulation is completed, the controller 130 updates the home screen data to configure the finally-drawn home screen.

As described above, a user can draw an object on the home screen.

Even though a user does not select a control operation, the object which a user draws in the user terminal device 100 can be recognized, and an application to be matched with the object can be recommended. Hereinbelow, an exemplary embodiment for recommending the control operation will be explained in further detail.

<Exemplary Embodiment of Recommending a Control Operation to be Matched with an Object>

Figure 24:
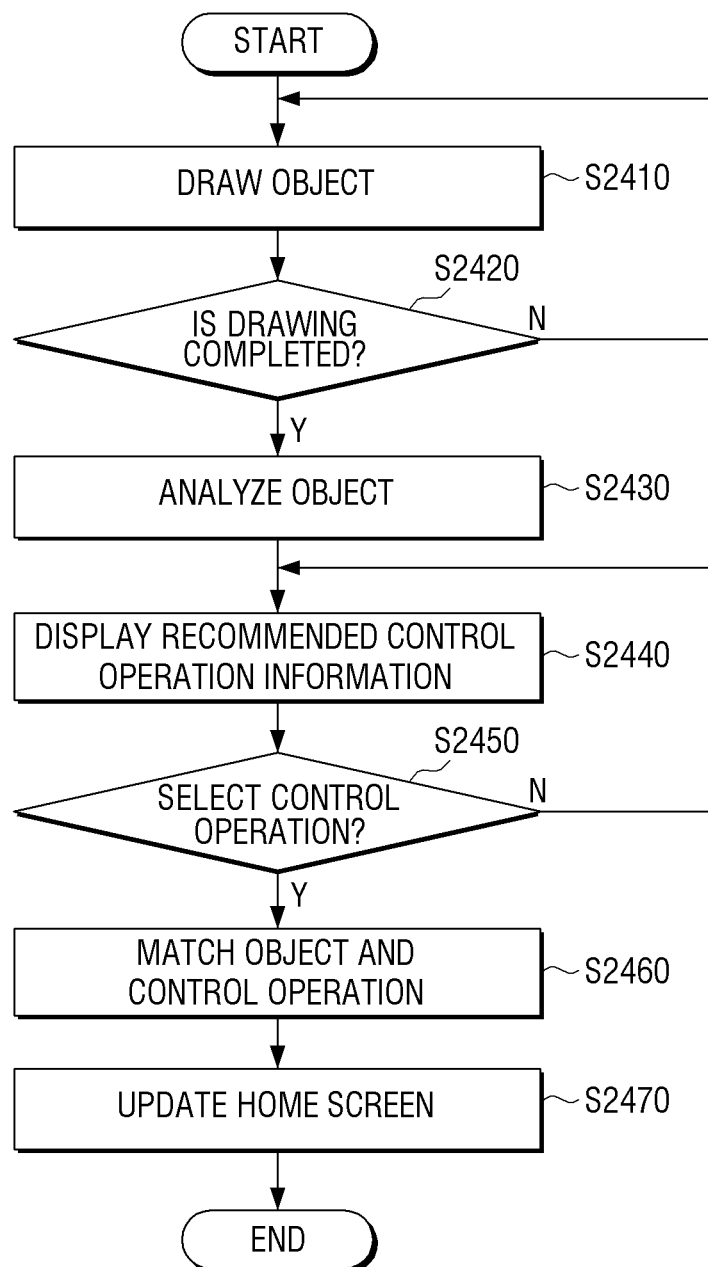

FIG. 24 is a flowchart to explain a method for generating an object according to an exemplary embodiment. According to FIG. 24, when an object is drawn on the home screen (S2410, S2420), the controller 130 analyzes the object (S2430). More specifically, the controller 130 extracts a thickness of each line composing the object, a connection angle among each line, a curve of lines, etc., and analyzes a form of the object. The controller 130 can compare data in a pre-stored database with the analyzed data and determine which object is the object drawn by a user.

For example, when a user draws an object in a form of a clock, the controller 130 can extract the feature that the object has a circular form, and the features that there are two or three straight lines inside the object, and estimate that the object has a clock form.

The controller 130 displays information on the recommended control operation based on the analysis result (S2440). Herein, the recommended control operation can be determined based on a form, a color, or details of the object which a user draws. As the above-described example, if a user draws an object with a clock form, the controller 130 can determine an alarm function or a clock widget as the recommended control operation. In addition, if there is an application having an icon of a clock, this application can be determined as the recommended control operation. The controller 130 displays the determined recommended control operations within the selection area (S2440).

A user can select one of the recommended control operations (S2450) which are displayed within the selection unit (S2440). When a control operation is selected accordingly, the controller 130 matches and stores the object which a user draws with a control operation (S2460), and updates the home screen (S2470).

Figure 25:
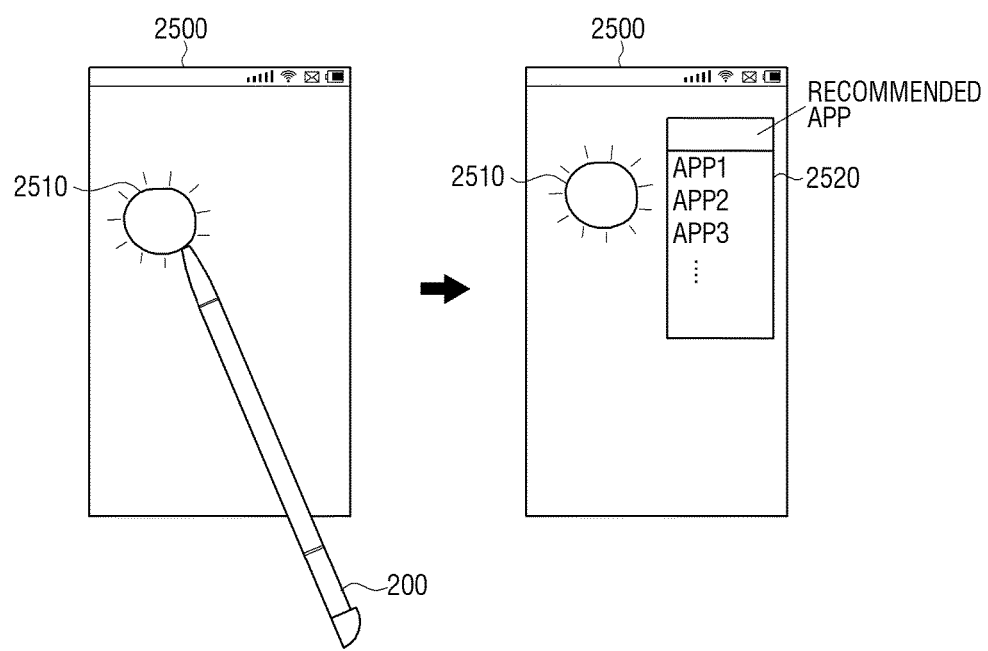

FIG. 25 is a drawing to explain the exemplary embodiment of FIG. 24. According to FIG. 25, when a user draws the object 2510 on the home screen 2500, the controller 130 recognizes the features of the object 2510. The controller 130 may use a handwriting recognizing module to recognize a form of the drawn object 2510.

By comparing an icon corresponding to the pre-installed application or an application name with a recognized form of the drawn object 2510, the controller 130 can search for an application which has a similarity to the drawn object 2510 which is greater than or equal to a certain value. For example, when a user draws a new figure, the controller 130 can search for an application which is represented with a basic icon of the new figure.

Alternatively, the controller 130 can search for an application which provides a service related to the recognized form of the drawn object 2510. For example, as illustrated in FIG. 25, when a user draws a figure of the sun, the controller 130 can search for an application related to weather.

The controller 130 recommends related applications to a user. That is, the controller 130 can display, on one side of the object 2510, the list 2520 having at least one application which is determined to be related to the object 2510. When a user selects one application on the list 2520, the selected application can be matched with the object 2510.

FIG. 25 illustrates a case of drawing an object as an image, but a user can also write a text. For example, FIG. 26 illustrates a case of inputting a text.

Figure 26:
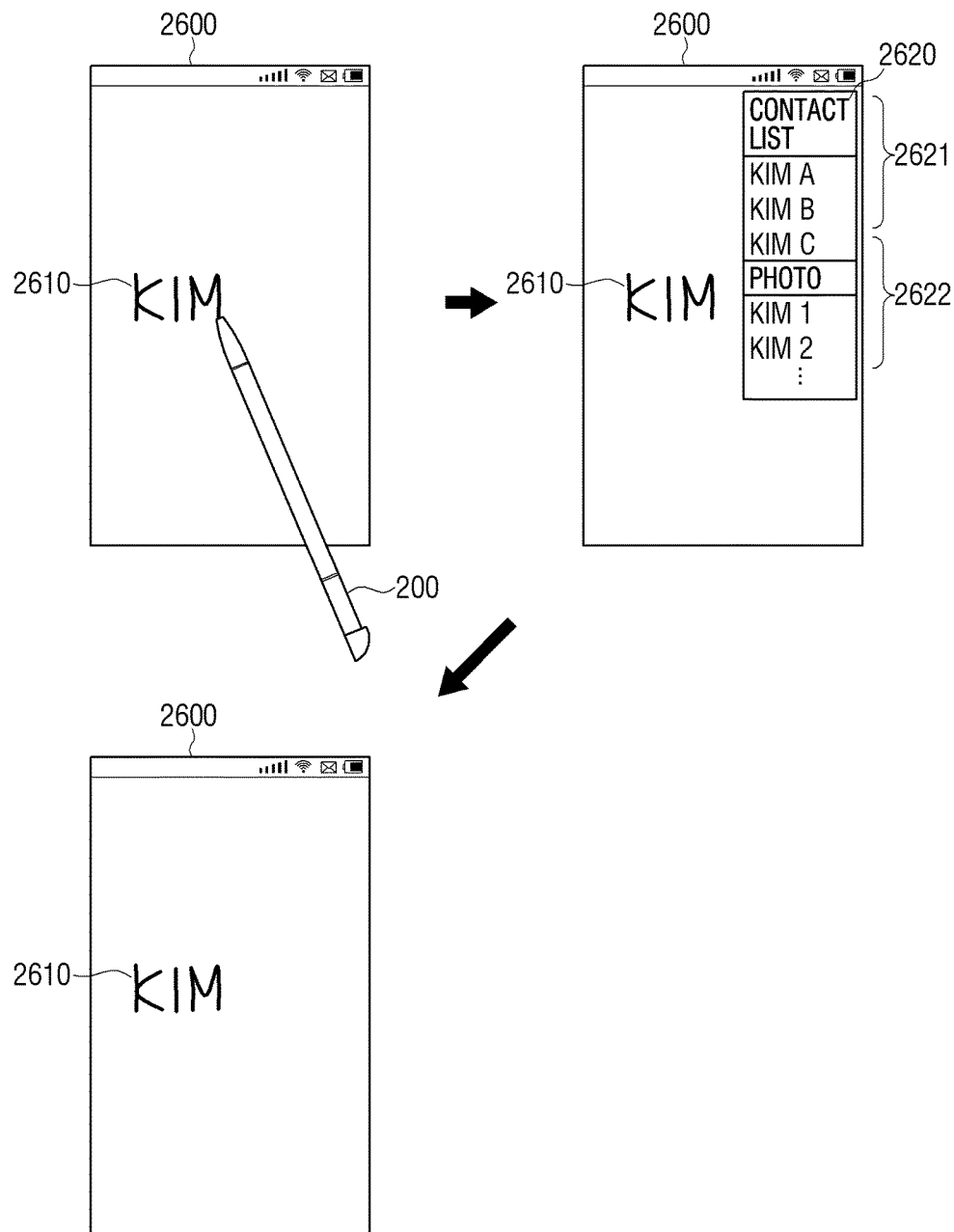

As illustrated in FIG. 26, when a user writes a text, "KIM", on the home screen 2600, the controller 130 searches for a program or data stored in the storage 140 which includes "KIM". The controller 130 displays search results within the selection area 2620. In the selection area 2620, contact list information 2621 including "KIM", photo data 2622 including "KIM", etc. are displayed. When a user selects one of the selection area 2620, the selected item is matched with the text 2610.

Figure 27:
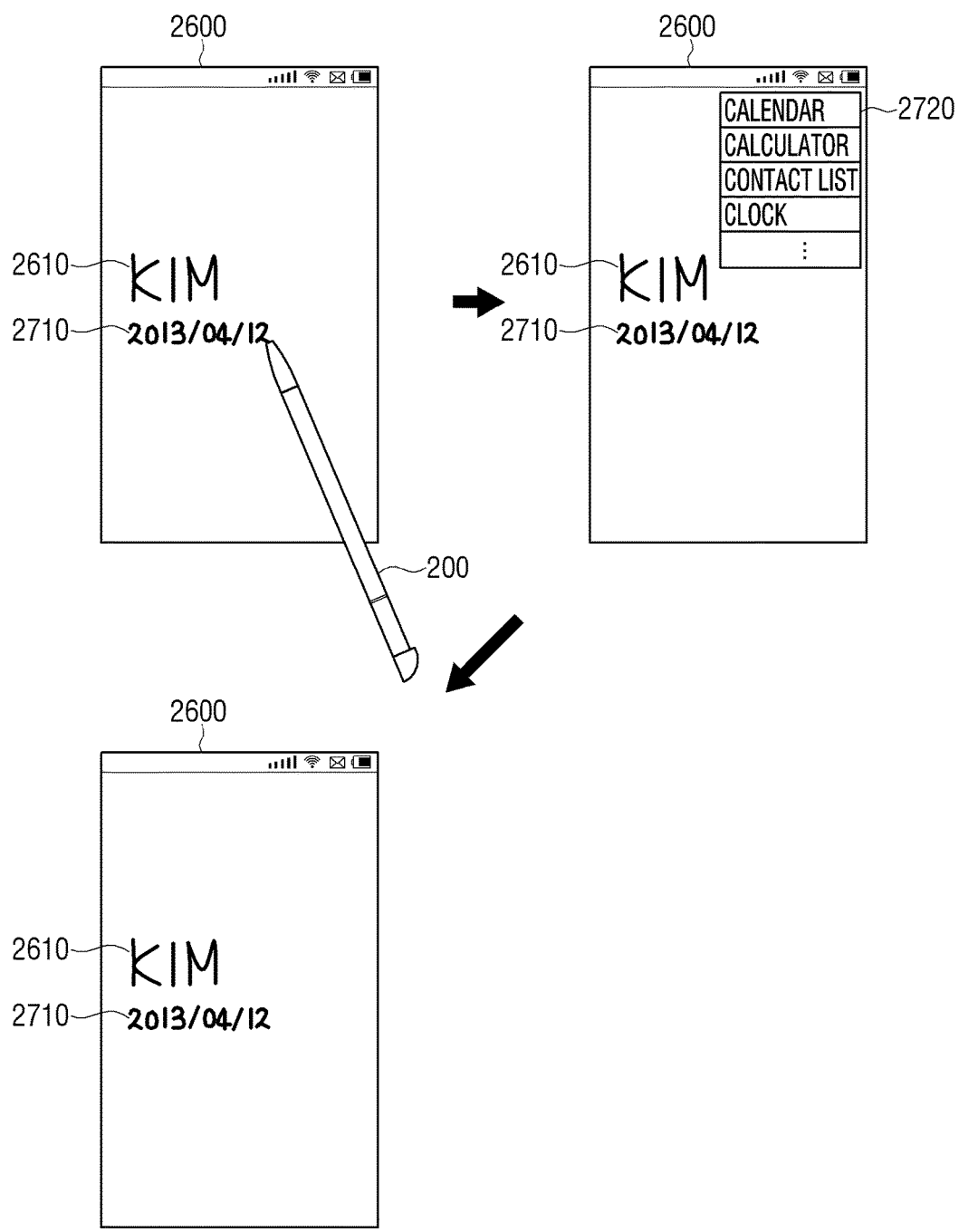

FIG. 27 illustrates a case of drawing numbers and symbols. As illustrated in FIG. 27, when a user inputs the object 2710 of "2013/04/12", the controller 130 recognizes a number and a symbol by using a handwriting recognizing module. When a number is recognized, the controller 130 searches for various number-related applications and functions, and displays the search results within the selection area 2720. FIG. 27 illustrates a state in which a calendar using weather information, a calculator for calculating numbers, an address list for management of telephone numbers, and clock, etc. are displayed on the selection area 2720.

When a user selects at least one item within the selection area 2720, the controller 130 matches a control operation corresponding to the selected item with the object 2710.

According to the various exemplary embodiments discussed above, a user can easily select a control operation which is suitable for an object which the user draws.

A control operation can be matched with a single independent object, but is not limited to the above. For example, by dividing one big object or the home screen into a plurality of chunks, the control operations which differ by each chunk can be matched. Hereinbelow, an exemplary embodiment in which the home screen is divided into and recognized as a plurality of chunks will be explained in greater detail.

<Exemplary Embodiment of Dividing and Recognizing an Object in a Plurality of Chunks>

Figure 28:
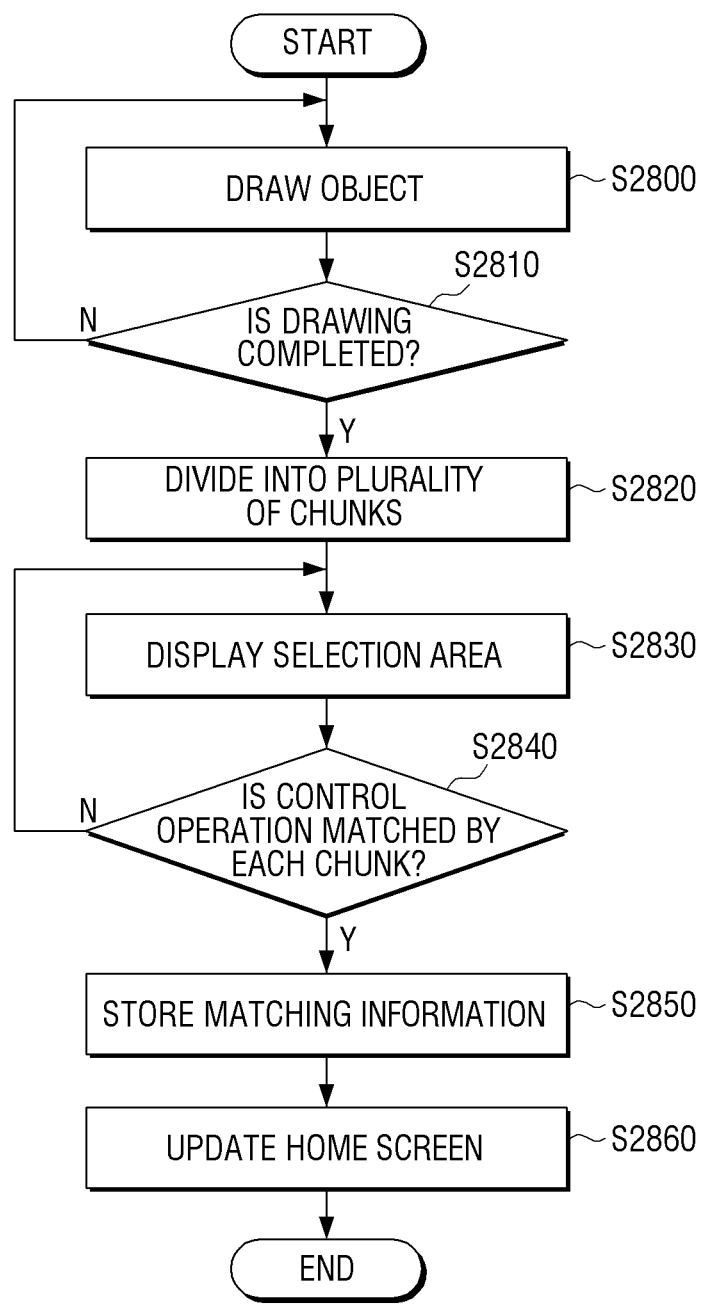

FIG. 28 is a flowchart to explain a method for generating an object according to an exemplary embodiment. According to FIG. 28, when a user draws the home screen (S2800, S2810), the controller 130 divides the home screen itself or an object included in the home screen into a plurality of chunks (S2820). Dividing the home screen or an object into chunks can be done manually according to user manipulation, or automatically according to a preset standard.

Accordingly to an exemplary embodiment, in the case of manually dividing the home screen or an object into chunks, when a user completes drawing on one object and then manipulates the object as if the object is cut into parts, the controller 130 can divide the object into a plurality of objects according to the manipulation. In case of automatically dividing the home screen or an object into chunks, the controller 130 can divide the object based on various standards such as a closed curve unit, a stroke unit, a number of strokes count, a drawing sequence unit, etc.

The closed curve unit refers to recognizing the closed curve units within one object as chunks which are independent of each other, a stroke unit refers to recognizing a drawn area from the touching of the home screen by the pen 200 to the detaching the pen from the screen as one chunk. The stroke count unit refers to recognizing each drawn area from the beginning of the strokes to the ending of the strokes, based on a preset stroke count, as chunks which are independent of each other. The drawing sequence unit refers to dividing an area which is drawn first, based on a preset time unit, from an area which is drawn later, and recognizing each area as independent chunks. In addition, the controller 130 can divide an object based on various standards.

When the chunks are determined, the controller 130 displays a selection area (S2830). A user can match the items displayed in the selection area to each chunk (S2140). When the matching operation is completed, the controller 130 stores matching information in the storage 140, and updates the home screen (S2860). Accordingly, a user can draw one big drawing on the home screen, divide the drawing into chunks, and match various control operations to the respective chunks.

Figure 29:
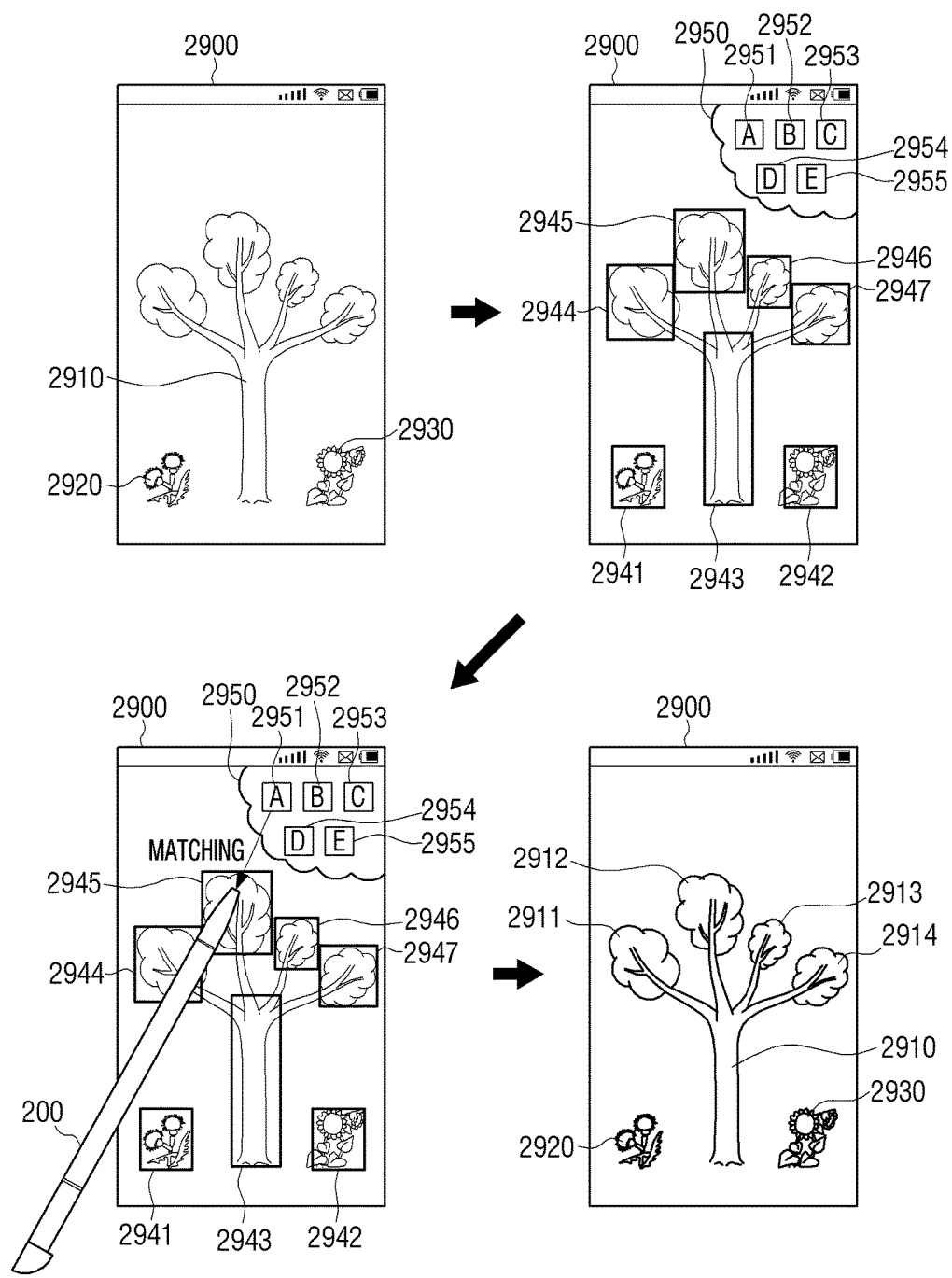

FIG. 29 is a drawing to explain an example of a method for matching a control operation by dividing an object into a plurality of chunks.

According to FIG. 29, when a user draws objects 2910, 2920, 2930 in various sizes on the home screen 2900, the controller 130 divides and recognizes objects 2920, 2930, which have the size less than threshold value, as independent chunks, respectively, and divides and recognizes an object 2910, which has the size of threshold value or higher, as a plurality of chunks.

The controller 130 displays each chunk as graphic line boxes 2941-2947. In FIG. 29, the graphic line boxes 2941~2947 are illustrated as rectangular boxes, but this is merely exemplary, and a graphic line which has the same form as a border of the object 2910 can be displayed.

In addition, the controller 130 displays the selection area 2950 within one area of the home screen 2900 from which a control operation can be selected. In the selection area 2950, icons 2951-2955 corresponding to each control operation can be displayed. A user can input user manipulation to interconnect the icons displayed within the selection area 2950 with each chunk 2941~2947, and match the icons with each chunk.

In FIG. 29, it is described that a user can match an icon with a chunk by drawing a line which directly connects them, but as described above, drawing a closed curve which ties an icon with a chunk, or performing touching both an icon and a chuck (e.g., multi-touch) can also be used for matching.

When matching is completed, the controller 130 removes the graphic line boxes 2941-2247, displayed to divide the objects into chunks, from the home screen 2900. Finally, the controller 130 can display the home screen 2900 which includes objects 2910, 2920, 2930 drawn by a user. Thereafter, when each chunk 2911~2914 is selected from the object 2910, the controller 130 can perform a control operation matched with the selected chunk.

Figure 30:
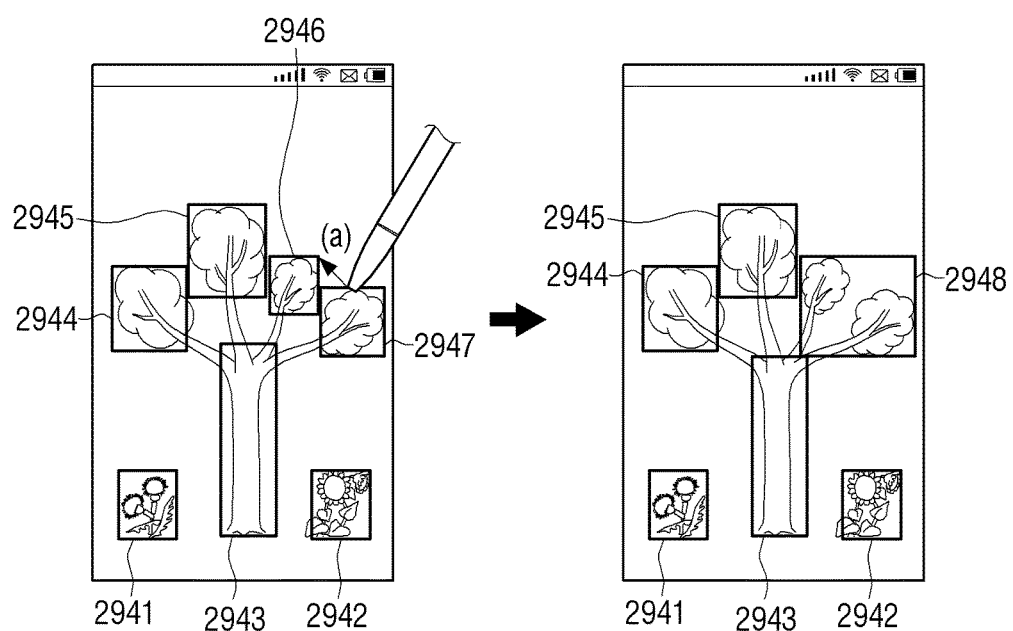

A user can change each graphic line box which indicates each chunk by using input means such as the pen 200, and adjust chunk size and shape, etc., as illustrated in FIG. 30.

FIG. 30 is a drawing illustrating an example of a method for adjusting a chunk by a user. According to FIG. 30, while a plurality of graphic line boxes 2941~2947 are displayed, a user can touch one graphic line box 2947 and then drag the box in a direction of another graphic line box 2946. In this case, the controller 130, while enlarging the graphic line box 2947 which was touched first, incorporates the graphic line box with another graphic line box 2946, and displays it as a new graphic line box 2948.

Figure 31:
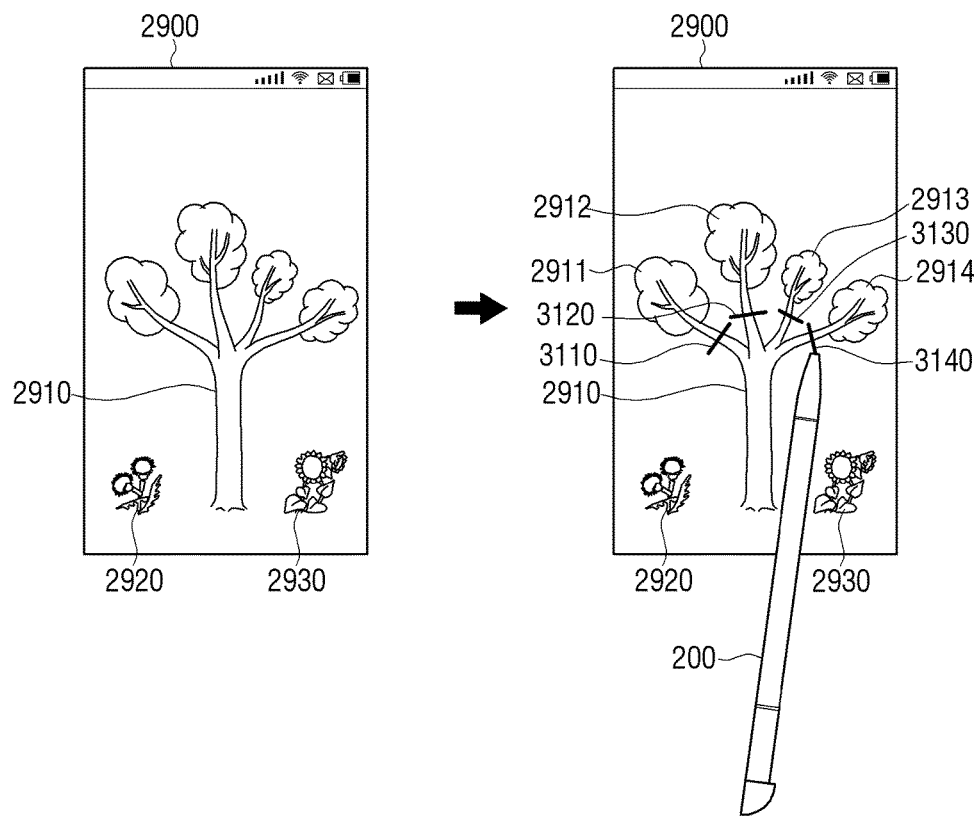

FIG. 31 is a drawing to explain a method for dividing an object into a plurality of chunks manually by a user. According to FIG. 31, a user can draw a plurality of objects 2910, 2920, 2930 in various sizes. After completing drawing, a user can perform user manipulation of cutting an object by using the pen 200.

FIG. 31 illustrates that the second object 2910 is divided into five chunks. In this case, in the part where a user cuts, cutting lines 3110-3140 are displayed, and the object 2920 is divided based on the cutting lines 3110-3140. The controller 130 can recognize each divided area of the object 2910 as a chunk and match a control operation to each of the chunks.

<Exemplary Embodiment of Using a Home Screen Composed of a Single Page>

As described above, a user can compose the home screen, that is, a user creative screen, by using various methods. As a user draws objects by him/herself and composes a user creative screen, the user can remember which objects exists in which areas within a screen. That is, even though several objects may be displayed in small size on one page, a user can intuitively know the position of each object. Therefore, a user can compose a home screen as a single page instead of composing the home screen as a plurality of pages, by displaying many objects in the small size on a single page.

In this case, a user can enlarge the small objects within the page by performing zoom-in or zoom-out manipulation.

Figure 32:
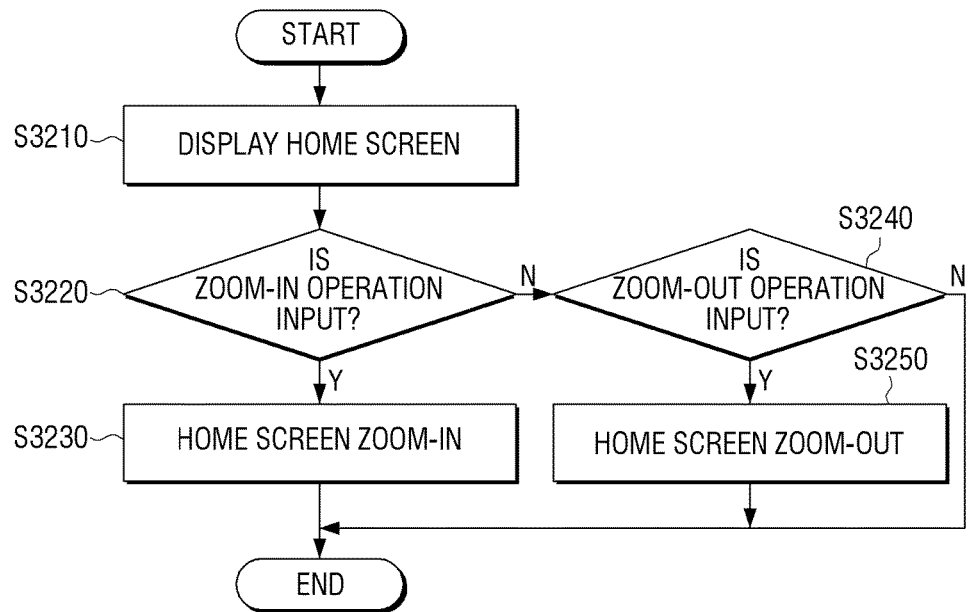
FIGS. 32 and 33 are drawings to explain onscreen zoom-in or zoom-out according to an exemplary embodiment.

FIG. 32 is a drawing to explain an example of a method for using a home screen composing a single page. According to FIG. 32, while the home screen is displayed (S3210) and a user performs a zoom-in manipulation (S3220), the controller 130 performs a zoom-in operation to enlarge the size of the home screen (S3230). By enlarging the home screen, a user can check an object displayed on the home screen, or perform editing such as adding, changing, or moving an object on the enlarged home screen.

When a user performs zoom-out manipulation (S3240), the controller 130 performs a zoom-out operation to reduce size of the home screen (S3250). That is, after enlarging the home screen and drawing an object, a user can reduce the home screen through a zoom-out manipulation.

Figure 33:
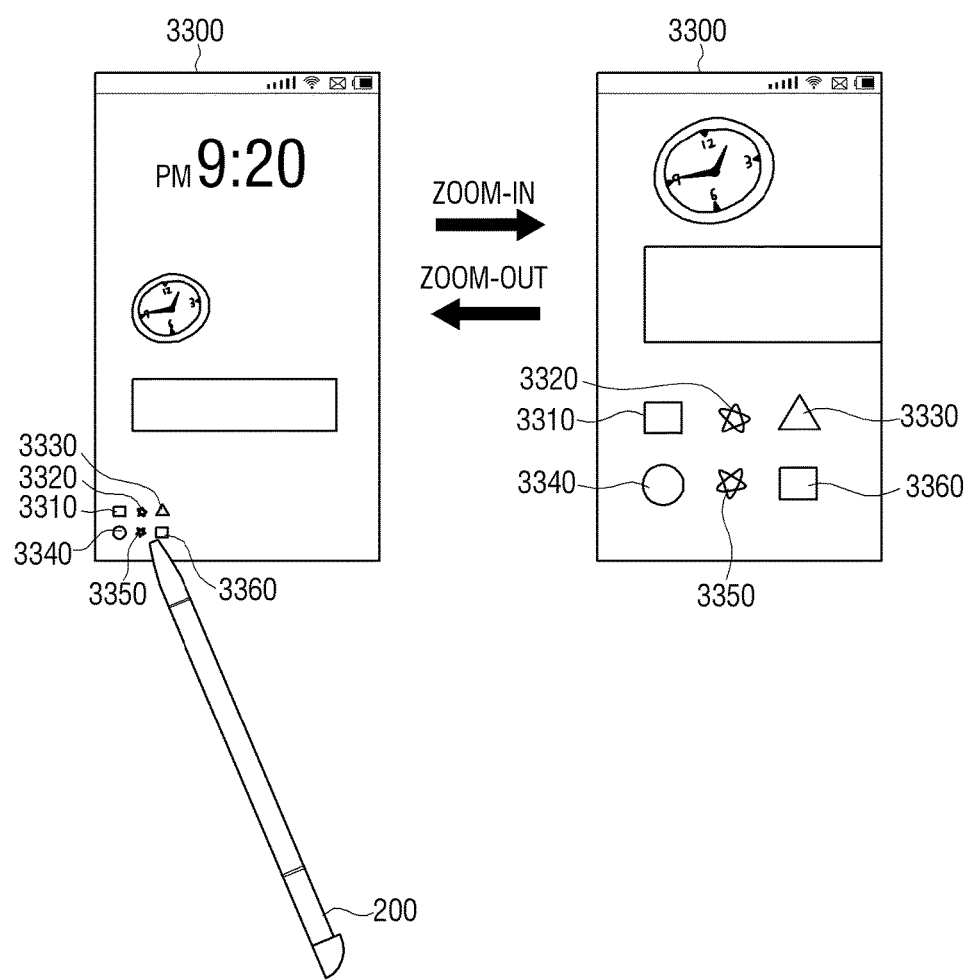

FIG. 33 is a drawing to explain a method for performing zoom-in or zoom-out on a home screen composed by a user. According to FIG. 33, various objects are displayed within the home screen 3300. Among the objects, some objects 3310~3360 can be displayed in a reduced size such that they cannot be identified by a user. In this state, a user can perform zoom-in manipulation by tapping the part of the home screen 3300 where the reduced objects 3310~3360 are displayed, or by touching the part of the home screen 3300 with a plurality of the fingers and enlarging the touch interval. In this case, the part of the home 3300 is enlarged, and the objects 3310-3360 which have been reduced are enlarged. Thus, a user can select one of the enlarged objects, and perform the matched control operation.

When a user performs tapping of a blank area where an object is not displayed, or manipulation to touch a screen with a plurality of the fingers and narrow the touch interval, the controller 130 performs a zoom-out operation. Accordingly, a screen returns to its original size, and each reduced object is displayed as a reduced size.

By enlarging the home screen and drawing an object, and then reducing the home screen, a user can include many objects within a screen without enlarging a page separately.

Alternatively, the user terminal device 100 can display the home screen as a roll screen. That is, while the home screen is displayed and a user touches a screen and drags the screen in one direction, the user terminal device 100 can scroll the home screen gradually according to the drag direction. A scroll can be made in a pixel line unit.

Figure 34:
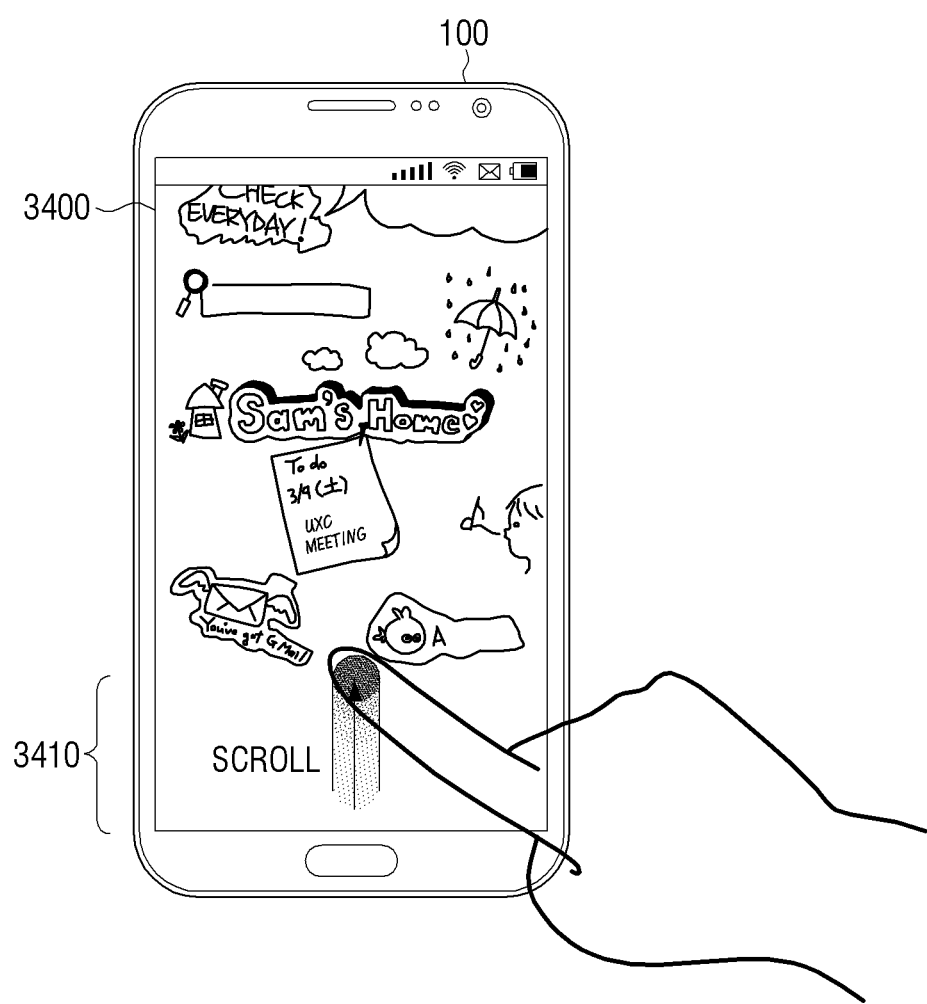
FIG. 34 is a drawing to explain scrolling a home screen according to an exemplary embodiment.

FIG. 34 is a drawing to explain an exemplary embodiment of changing a home screen by a scroll method. According to FIG. 34, the controller 130 displays the home screen 3400 including various objects. In this state, when a user touches a screen by using the finger or a pen, and scrolls the screen with arrows, a screen moves and an area 3410, which was not previously visible, appears.

A user can select an object displayed in the newly-displayed area 3410 and execute a control operation matched with the object. Alternatively, a user can draw a new object in the newly-displayed area 3410 and match a control operation with the new object.

FIG. 34 illustrates that the home screen is scrolled in up and down directions consecutively. However, a scroll direction is not limited to up and down directions and can be embodied as various other directions such as left and right directions.

In addition, when a scroll is performed, the controller 130 can provide a graphic effect as if the home screen is rolling, or additional feedbacks such as sound, vibration, light, etc. can be provided together.

<A System Sharing the Home Screen>

As described above, a user can generate various home screens suitable to the user's characteristics. Furthermore, a user can share such home screens with others. Hereinbelow, various exemplary embodiments to share the home screen with others will be explained in detail.

Figure 35:
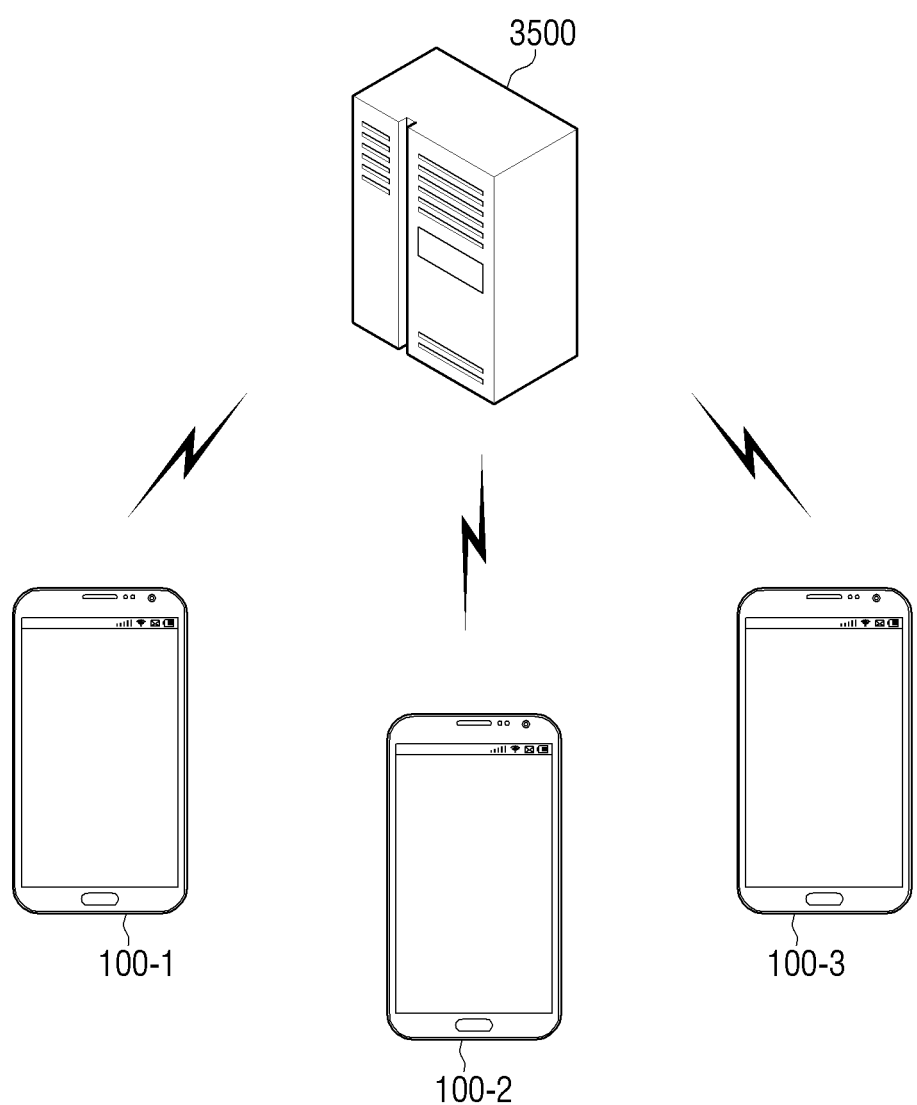
FIG. 35 is a drawing illustrating an example of a system which can share a home screen.

FIG. 35 is a drawing illustrating an example of a network system according to an exemplary embodiment. According to FIG. 35, the network system includes a plurality of user terminal devices 100-1~100-3 and a server device 3500. In FIG. 35, only 3 user terminal devices 100-1~100-3 are illustrated. However, this is purely exemplary and the number of the user terminal devices 100 can change in a various manner.

The server device 3500 provides a home screen sharing service so that each user terminal device 100-1~100-3 can share home screens. The server device 3500 can be embodied as various servers including a web server and a cloud server.

In the network system of FIG. 35, each user terminal device 100-1~100-3 can have the configuration as described in FIG. 1. When a user generates a home screen in one of the user terminal devices 100-1~100-3, a user can upload the home screen data to the server device 3500. A user of another user terminal device 100 can access a site provided by the server device 3500 and download the home screen data.

Figure 36:
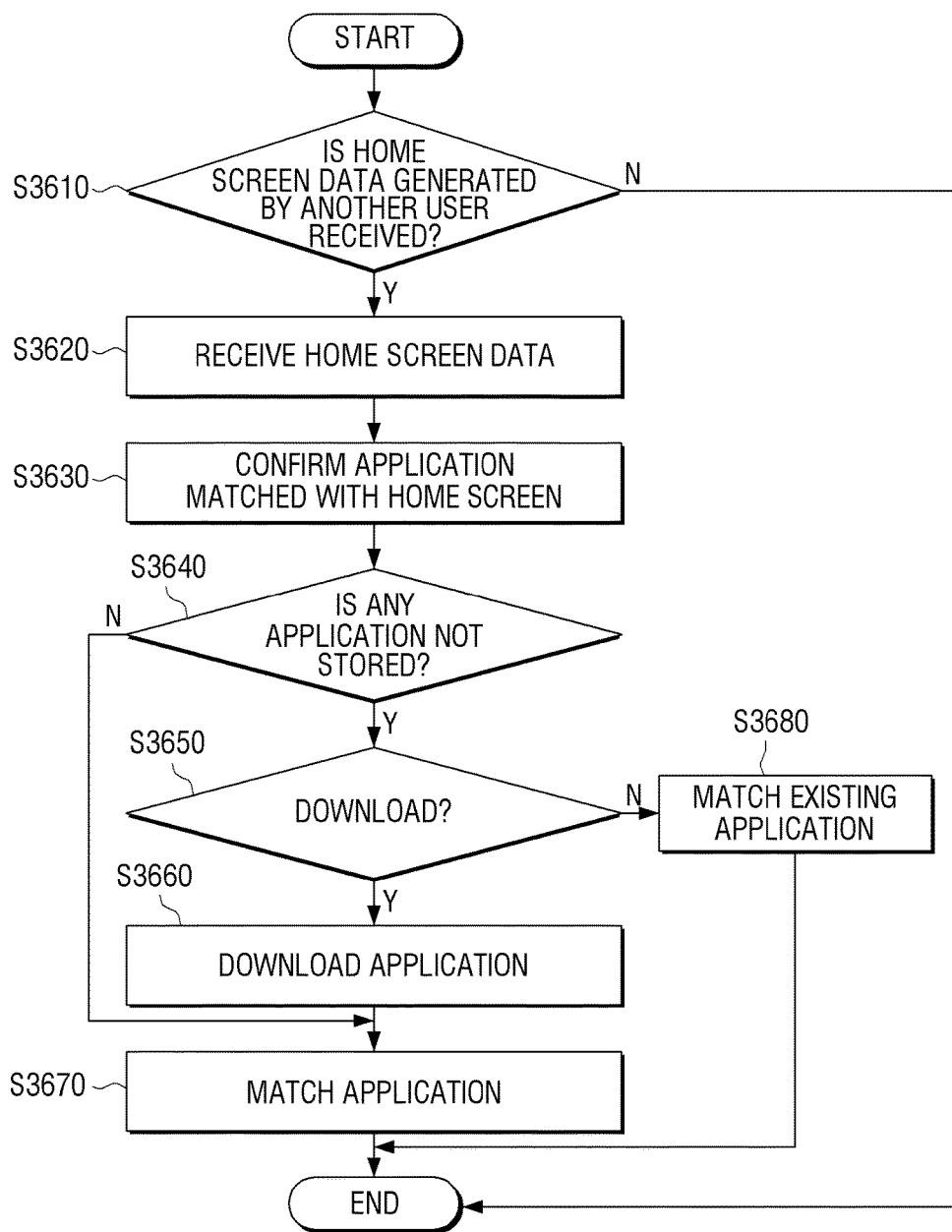
FIG. 36 is a flowchart to explain a method of sharing a home screen.

FIG. 36 is a flowchart to explain a method for sharing a home screen generated by another user. According to FIG. 36, when a user inputs a command to receive the home screen data generated by others (S3610), the controller 130 receives the home screen data from the server device 3500 (S3620).

The server device 3500 can provide not only rendering data on a background image composing the home screen and an object, but also various application information matched within the home screen.

By checking application information matched with the home screen (S3630), the controller 130 determines whether an application already stored in the user terminal device 100 exists (S3640) among applications matched with the home screen. As a result, when an application which is not stored exists, the controller 130 checks whether or not to download the corresponding application (S3650). More specifically, the controller 130 can display a UI to ask whether or not to download the application. When a user inputs a command to download to a UI, the controller 130 downloads the corresponding application from the server device 100 (S3660). The controller 130 matches and stores the downloaded application by each object within the home screen or each area within the home screen (S3670).

When a user elects not to download the application, the controller 130 can match and store an existing application with each object or by each area within the home screen (S3680).

According to the above-described exemplary embodiment, a user can share not only the home screen but also an application.

Figure 37:
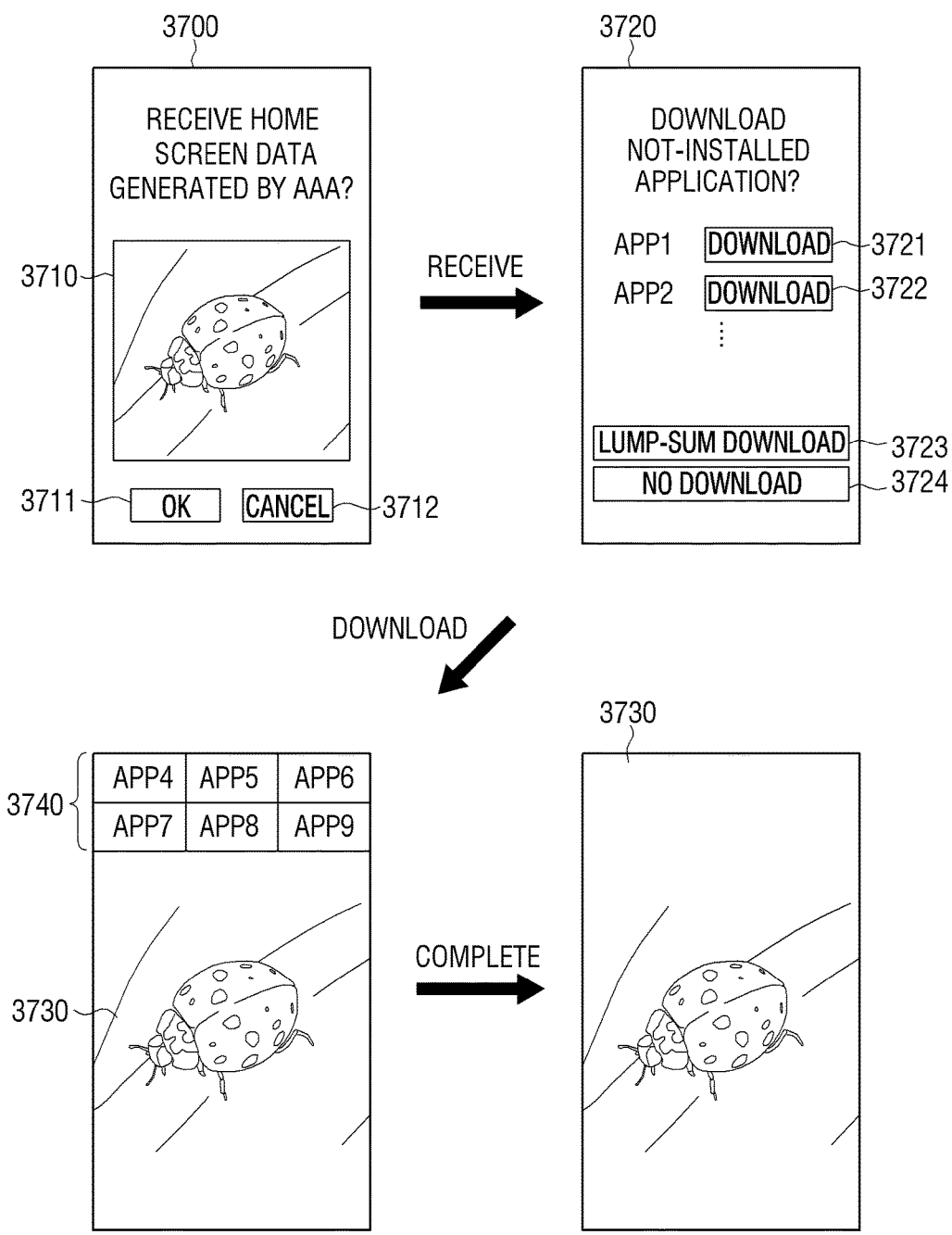
FIG. 37 is a drawing to explain a method for sharing a home screen.

FIG. 37 is a drawing to explain operations of the user terminal device 100 according to the exemplary embodiment of FIG. 36. According to FIG. 37, the controller 130 displays a UI screen 3700 for asking whether or not to receive home screen data generated by another user (e.g., "AAA"). In the UI screen 3700, a preview image 3710 on the home screen generated by AAA and menus 3711, 3712 selectable by a user are included.

When a user selects an OK menu 3711, the controller 130 receives the home screen data from the server device 3500. The controller 130 receives application information from the server device 3500, and compares the application information with a pre-installed applications. As a result of comparison, when there is an application which is not installed, the controller 130 displays a UI screen 3720 for asking whether or not to download the not-installed application.

In the UI screen 3720, download menus 3721, 3722 corresponding to information on each of the not-installed applications, a lump-sum download menu 3723 to download all of the not-installed applications at the same time, and a menu 3724 to refuse download, etc. are provided. When a user selects the lump-sum download menu 3723, the controller 130 downloads all the not-installed application from the server device 3500 at the same time.

When an application is downloaded, the controller 130 matches an application with each area within the home screen or each object. The controller 130 can match an application in the same state as is matched by other user who generated the home screen.

When the downloaded application does not exist, or when a user decides a new matching relation, the controller 130 displays a new home screen 3730 and an application information area 3740 based on the home screen data received from the server device 3500. When the downloaded application does not exist, the controller 130 can display information of pre-stored applications in the storage 140 in the application information area 3740. A user can select an application displayed in the application information area 3740 and match the application with each object within the home screen 3730. When matching is completed, the controller 130 displays a new home screen 3730.

Figure 38:
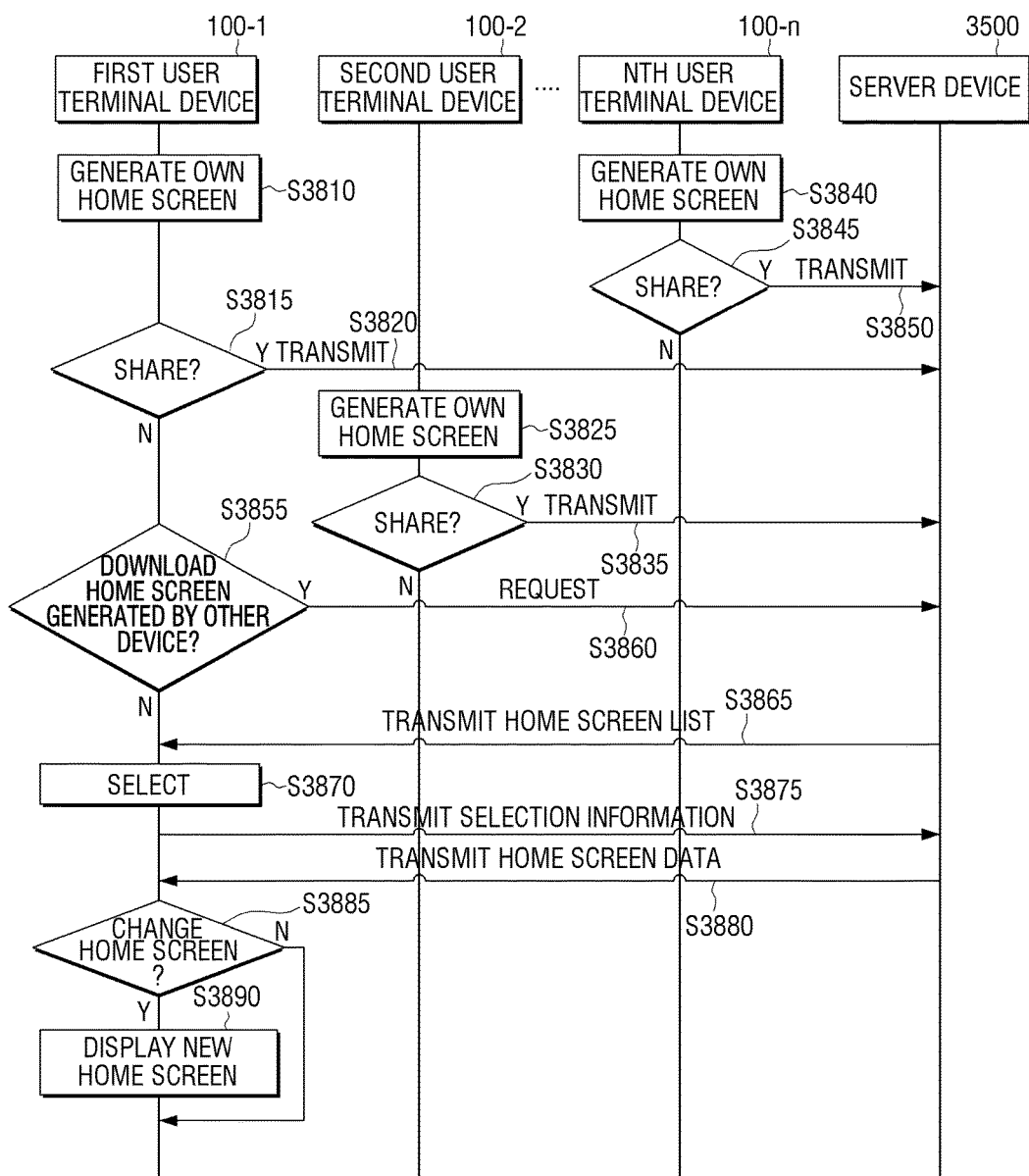
FIG. 38 is a timing chart to explain a method for sharing a home screen.

FIG. 38 is a timing chart to explain a method for sharing a home screen in a network system in greater detail. In FIG. 38, a state where n number of user terminal devices (100-1~100-n) are registered in the server device 3500 is described.

In this state, when the home screen is generated (S3810) by itself within the first user terminal device 100-1, a user can select whether or not to share the home screen the user made with others. When a sharing menu displayed on the home screen is selected, or a certain button provided on the first user terminal 100-1 is selected, the controller 130 determines that a sharing command on the corresponding home screen is input (S3815). When it is determined that a command for sharing is received, the controller 130 transmits home screen data to express the home screen generated by a user to the server device 3500 (S3820).

Furthermore, in user terminal device 100-2~100-n other than the first user terminal device 100-1, the home screen generated by itself can be uploaded to the server device according to a user selection (S3825, S3830, S3835, S3840, S3845, S3850).

The server device 3500 can divide and store the home screen data uploaded from each user terminal device 100-1~100-n according to various standards such as by users, regions, languages, data size, home screen types, etc.

In addition, each user terminal device 100-1~100-n, if necessary, can download from the server device 3500 the home screen data which another user created.

FIG. 38 illustrates the process of downloading, from the first user terminal device 100-1, the home screen data, and using the data. According to FIG. 38, when a command to download the home screen, which is generated by another device, is input (S3855), the controller 130 transmits, to the server device 3500, a request to provide information on the stored home screen (S3860).

The server device 3500 transmits a home screen list (S3865) in response to the request. In this case, the server device 3500 can provide home screens, restrictively, in consideration of relations among users. For example, when a user A sets sharing of information with a user B and a user C only, and a request is received through an account of the user C, information on the home screen generated by the user A is included in the list and transmitted to the user terminal device 100 of the user C. On the other hand, when a request is received through an account of a user D, information on the home screen generated by the user A is not included in the list.

When the home screen list is received, the first user terminal device 100-1 displays the list. A user can select, from the home screen list, the home screen information which the user wants (S3870). In the home screen information, various information such as a name of a user who generates the home screen, time of generating the home screen, a preview screen of the home screen, and data size, etc. can be included.

When a user selects the home screen information, the controller 130 of the first user terminal device 100-1 transmits the selected information to the server device 3500 (S3875). The server device 3500 transmits the home screen data corresponding to the selected information to the first user terminal device 100-1 (S3880).

When the home screen data is downloaded, a user of the first user terminal device 100-1 can select whether or not to change the home screen by using the home screen data (S3885). When a user selects a menu for changing the home screen, in the first user terminal device 100-1, a new home screen is displayed based on a newly-received home screen (S3890).

Accordingly, a user can use a user creative screen generated by another user, without having to draw each object in the home screen.

The server device 3500 can create a profit model by charging a fee for buying or selling the home screen data, or by providing a space for uploading or downloading the home screen free of charge and receiving advertisement income therefrom.

When receiving the home screen data created by users, a user terminal device 100 can also receive and use the application or other data matched with each object within the home screen. In this case, the home screen data, the application, or the content, etc. can be uploaded or downloaded in one total package. If an application, which is the same as an application or data which is pre-stored in the user terminal device 100, is included in the new home screen data, other data excluding the application or the data can be selectively downloaded. More specifically, the user terminal device 100 can receive information on various programs and data which are matched with the home screen data generated by another user in advance, compare the information with stored program and data information, and then transmit a download request for only some of the programs or data according to the comparison results.

Alternatively, the user terminal device 100 can receive object information only. In this case, a control operation matched with each object can be selected and matched by a user.

Figure 39:
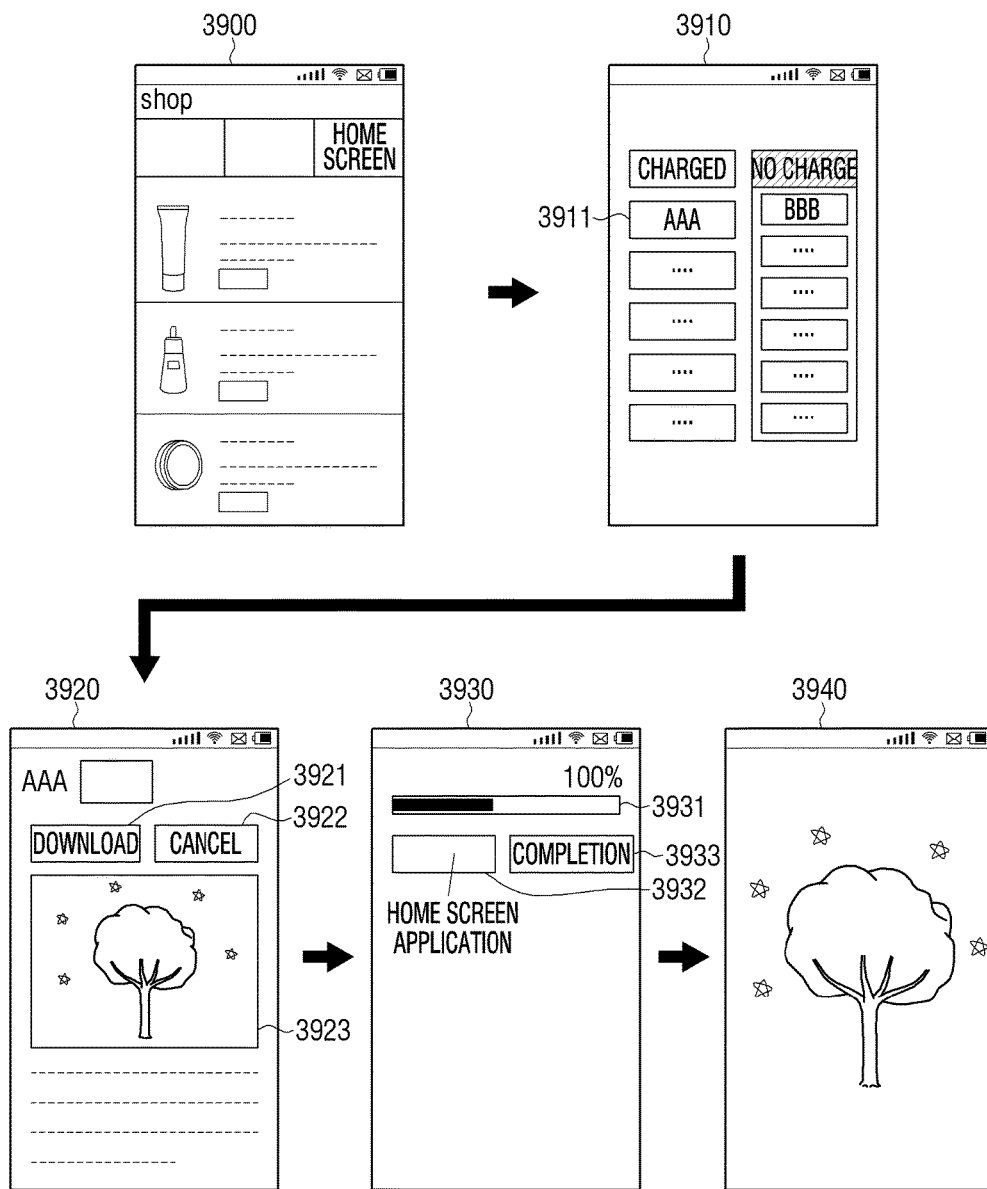
FIG. 39 is a drawing to explain an example of a method for downloading home screen data.

FIG. 39 is a drawing to explain a method of downloading home screen data through a site provided by a server device. According to FIG. 39, When an application store to download an application or other contents is executed, the user terminal device 100 displays the main screen 3900. A user can appropriately navigate the main screen 3900 and display a page 3910 which can download the home screen data. When a user selects one item 3911 from the page 3910 displayed in FIG. 39, the controller 130 displays an introduction page 3920 corresponding to the item 3911. In the introduction page 3920, a download menu to execute the download, a cancellation menu 3922, and a preview image 3923 of the home screen, etc. can be displayed.

When a user selects the download menu 3921 on the introduction page 3920, the controller 130 displays a download screen 3930. In the download screen 3930, an image 3931 which indicates degree of download, a home screen application menu 3932 for applying the downloaded home screen data and selecting change of the home screen, and a menu 3933 to close the download screen 3930, etc. can be displayed. When a user selects the home screen application menu 3932, the controller 130 renders new home screen 3940 based on the new home screen data.

FIG. 39 illustrates an exemplary embodiment of receiving the home screen data through the server device 3500. However, the user terminal devices 100-1~100-n can also transceive the home screen data through direct communication with each other.

Figure 40:
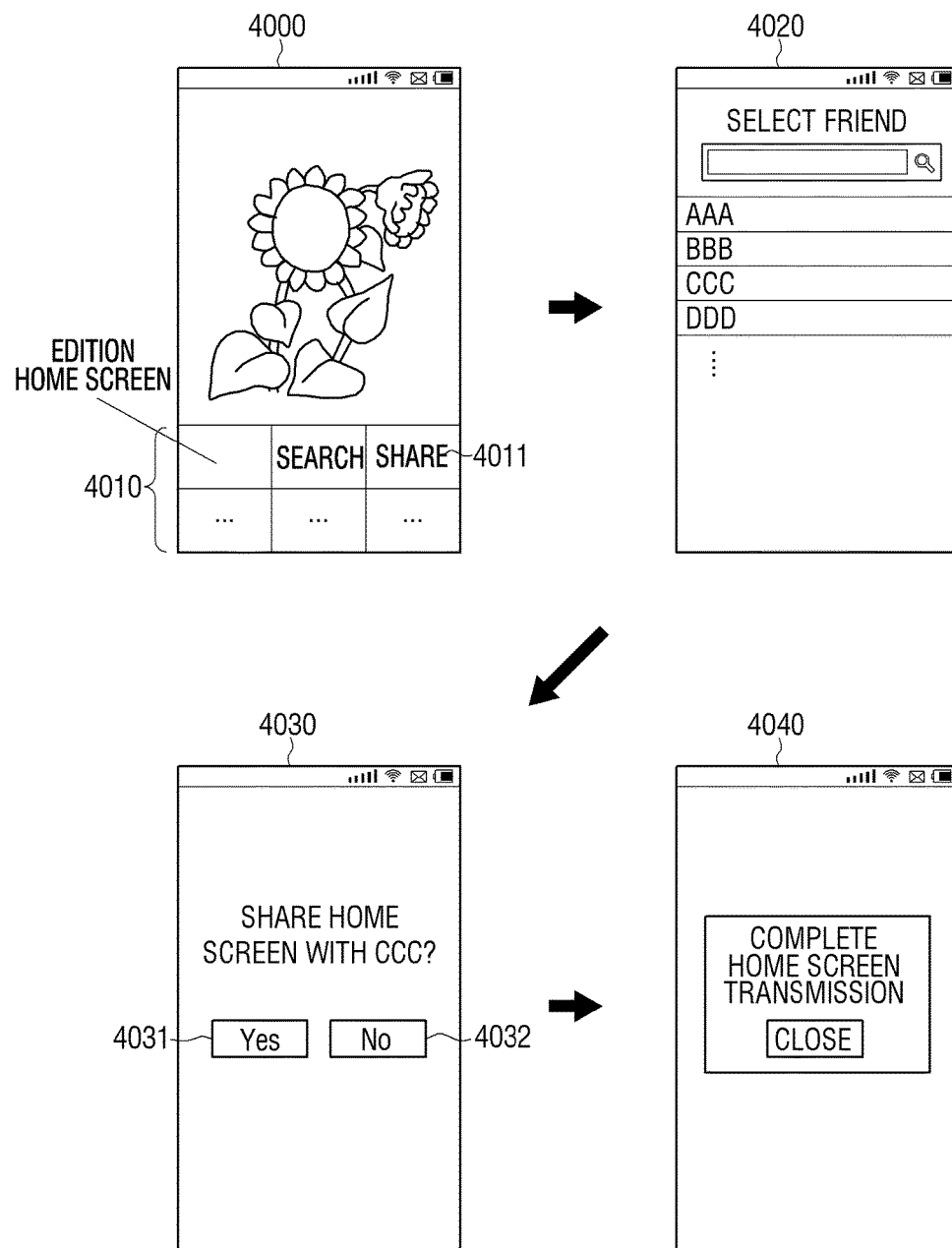
FIG. 40 is a drawing to explain an example of a method for sharing a home screen with another user.

FIG. 40 is a drawing to explain operations of a user terminal device which shares a home screen data with another user. According to FIG. 40, the user terminal device 100, while displaying the home screen 4000, when a menu for sharing 4011 is selected from among a menu where the menu area 4010 is displayed, displays a selection screen 4020 to select another user to share the home screen with.

Within the selection screen 4020, pre-stored information on acquaintances, contact number search area, etc. can be displayed. When at least one acquaintance is selected through the selection screen 4020, the controller 130 displays a screen 4030 to check whether or not to share the home screen with the selected acquaintance. A user can select one of the menus 4031, 4032 displayed in the screen 4030, to decide whether to share the home screen. When the menu 4031 to share the home screen is selected, the controller 130 can, by using the contact list corresponding to the selected people, transmit the home screen data, and if the data is successfully transmitted, display a message screen 4040 to notify such successful transmission. As such, the user terminal device 100 can conveniently share the home screen which the user generates, with acquaintances.

Figure 41:
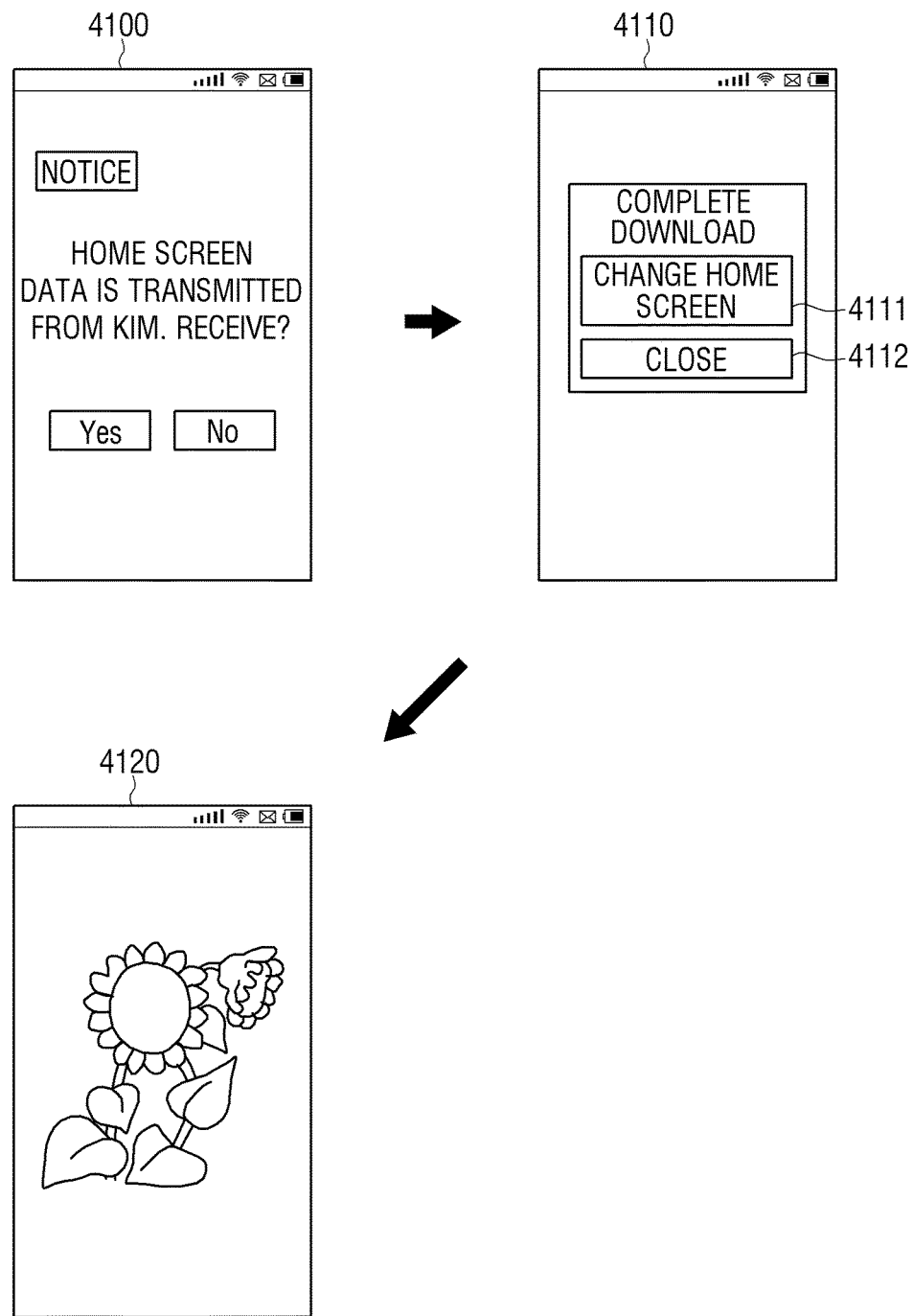
FIG. 41 is a drawing to explain an example of a method for using a home screen provided by another user.

FIG. 41 is a view to explain a process of receiving a home screen data from another user. According to FIG. 41, when the home screen data is dispatched from the user terminal device 100 of another user, the controller 130 displays a screen 4100 for asking whether to receive the data. If it is determined to receive the data, the controller 130 receives the home screen data transmitted by another user and displays the screen 4110 for notifying that the data is downloaded. In the screen 4110, a menu 4111 to apply the received home screen data and change the home screen, a menu 4112 to close the screen 4110 can be displayed. When a user selects the menu 4111, the controller 130 displays the home screen 4120 by using the received home screen data.

The user terminal device 100 can share not only the home screen but also the objects drawn on various screens with another user.

Figure 42:
FIGS. 42 and 43 are drawings to explain various methods for sharing another user terminal device and an object and using the same.

FIG. 42 is a drawing to explain operations of the user terminal device 100 according to an exemplary embodiment.

According to FIG. 42, the user terminal device 100 can share an object on a real-time basis with a plurality of other user terminal devices 100.

In other words, the controller 130 receives information of an object drawn in at least one of the other user terminal devices 100. Also, the controller 130 transmits information of an object drawn on a screen of the display 110 to the other user terminal devices 100.

The controller 130 displays a screen 4200 which combines user photos 4211, 4221, 4231, and 4241 of each user terminal device 100 with the objects 4210, 4220, 4230, and 4240 drawn in each user terminal device 100. Accordingly, a user can share an object with friends on a real-time basis, compare drawing talent or drawing status, etc.

When a user selects at least one of the objects 4210, 4220, 4230, and 4240, the controller 130 can add the selected object into the home screen as a new object.

Aside from the home screen, the controller 130 can store an object drawn by a user or an object drawn by a friend in the storage 140, and utilize them for the various purposes. For example, a user can use the object for using a messenger program or a mail program.

Figure 43:

FIG. 43 is a drawing to explain a method for utilizing an object for a messenger program. According to FIG. 43, the controller 130 can use an object 4310 as an emoticon on a messenger screen 4300. After selecting a menu for attaching the emoticon within the messenger screen 4300, a user can select one of the objects stored in the storage 140 and attach the object as the emoticon. In the stored objects, not only an object which a user draws, but also objects drawn and shared by another user can be included. Moreover, objects provided by a manufacturing company or the third parties can also be included.

Consequently, a user can generate the home screen which is suitable to the user's characteristics and share the home screen with others.

Figure 44:
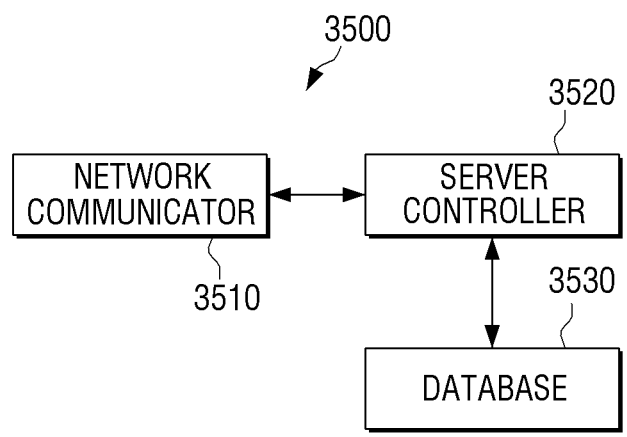
FIG. 44 is a block diagram illustrating the configuration of a server device according to an exemplary embodiment.

FIG. 44 is a block diagram illustrating an example of the configuration of a server device used for a network system. According to FIG. 44, the server device 3500 includes a network communicator 3510, a server controller 3520, and a database 3530.

The network communicator 3510 is an element to communicate with the user terminal devices 100-1, 100-2, 100-3 according to various communication methods.

The database 3530 is an element to store various data uploaded by users.

When the home screen data is uploaded through the network communicator 3510, the server controller 3520 records the home screen data in the database 3530. When the user terminal device 100 is accessed through the network communicator 3510, the server controller 3520 can provide information on the home screen recorded in the database 3530 to the user terminal device 100. The user terminal device 100 can display the information on a screen. Accordingly, when a user of the user terminal device 100 selects one home screen data, the user terminal device 100 transmits a request for downloading the selected home screen data. Upon receiving the request for downloading, the server controller 3520 transmits the selected home screen data.

Figure 45:
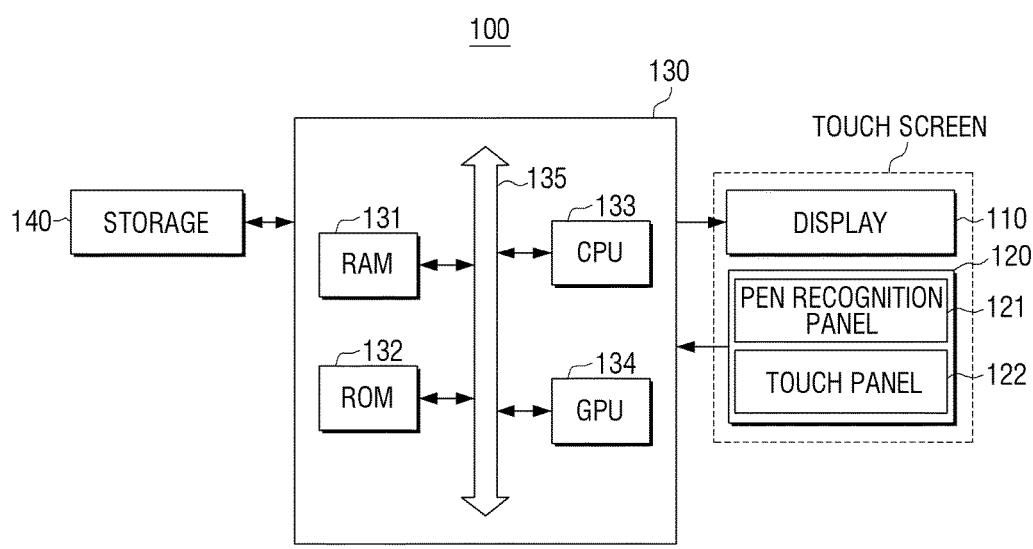
FIG. 45 is a drawing illustrating an example of the detailed configurations of a user terminal device using a pen.

As described above, the server device 3500 can provide the home screen data for each of the user terminal devices 100-1, 100-2, 100-3. FIG. 45 illustrates an example of the detailed configuration of the user terminal device 100 usable for a network system. According to FIG. 45, the user terminal device 100 can divide and recognize the finger 50 of a user and a pen 200.

In FIG. 45, the display 110 displays various screens as described above. The display 110 can be embodied as displays in various shapes such as LCD (Liquid Crystal Display), OLED (Organic Light Emitting Diodes) display, PDP (Plasma Display Panel), and the like. Within the display 110, a driving circuit which can be embodied as a-Si TFT (thin-film transistor), LTPS (low temperature poly silicon) TFT, OTFT (organic TFT), etc. and a backlight, etc. can be included.

The display 110 and the detector 120 can be embodied as one touch screen. The detector 120 can include a pen recognition panel 121 and a touch panel 122.

The pen recognition panel 121 senses a proximity input or a touch input of the pen 200, and outputs an event signal according to the detected result. Such pen recognition panel 121 can be embodied with an Electron Magnetic Resonance (EMR) method, and the touch or proximity input can be detected in accordance with change in strength of electromagnetic field by the proximity or touch of the pen. More specifically, the pen recognition panel 121 can include an electromagnetic induction coil sensor (not illustrated) and an electronic signal processing circuit (not illustrated). The electromagnetic induction coil sensor is composed of grid structure where a plurality of loop coils are disposed to cross reciprocally. The electronic signal processing circuit sequentially provides each loop coil of the electromagnetic induction coil sensor with an AC signal, and transmits the signal output from each loop coil to the controller 130.

When there is the pen 200 having a resonance circuit near a loop coil of the pen recognition panel 121, magnetic field transmitted from the corresponding loop coil generates current in the resonance circuit of the pen 200 based on mutual electro induction. Based on this current, an induction field occurs from a coil composing resonance circuit of the pen 200, and the pen recognition panel 121 extracts the induction field from the loop coil which receives a signal, and therefore proximity location or touch location of the pen 200 is detected. Hereinabove, the pen 200 is described, but any object that can generate current based on electronic induction can be used as an input means. The pen recognition panel 121 is disposed at a lower part of the display 110 and can be activated according to occurrence of a certain event or as a default.

The touch panel 122 is an element to sense physical touch input through the body of a user or other objects. The touch panel 122, for example, can have a type such as a touch film, a touch sheet, and a touch pad, and the like. When touch is detected, the touch panel 122 outputs a touch event value which corresponds to a detected touch point. As described above, the touch panel 122 can include various types of touch sensors such as a capacitive-type sensor and a resistive-type sensor. For example, when the touch panel 122 is embodied as the capacitive-type sensor, the touch panel 122 is coated with thin conductive metal substance such as ITO (Indium Tin Oxide) at both sides of glass so that current can flow at surface of glass, and is coated with dielectric substance which can store electric charge. When surface of the touch panel 122 is touched, a certain amount of electric charge moves to the touched location by static electricity, the touch panel 122 senses touched location by recognizing changes in current according to movement of electric charge, and traces a touch event. Herein, the touch event which occurs in the touch panel 12 can be mainly generated by the finger of a human, but also can be generated by any other object that can cause capacitive change, for example, a conductive substance that can bring capacitive changes.

FIG. 45 illustrates that the pen recognition panel 121 and the touch panel 122 are separate panels, but two panels can be embodied as one panel.

As illustrated in FIG. 45, when there are the pen recognition panel 121 and the touch panel 122, the detector 120 can divide and sense general manipulation of touch or approach of a screen by the finger of a user, and pen manipulation of touch or approach of a screen by using the pen 200. The controller 130 can perform different operations according to type of user manipulation. For example, when pen hovering manipulation, which makes the pen 200 approach one object, is detected, the controller 130 can display information on a control operation matched with the corresponding object at one side of the object. Information on the control operation can include various information such as a name of an application, a type of an application, a manufacturer of an application, a date of installation of an application, and the like. While pen hovering manipulation is performed, the controller 130 can provide the animation effect for the corresponding object.

Though not illustrated in FIG. 45, in the user terminal device 100, a driver unit (not illustrated) which can operate the display, a frame buffer (not illustrated), and the like can be further included. The frame buffer is for buffering an image frame which is to be displayed on a panel of the display 110, and the driver is for converting an image frame stored in the frame buffer into an image source signal and for providing the display 110 with the image frame, so that the display 110 can display an image frame.

The controller 130 controls overall operations of the user terminal device 100 by using various programs and data stored in the storage 140. The controller 130 includes RAM 131, ROM 132, CPU 133, GPU (Graphic Processing Unit) 134, and bus 135. RAM 131, ROM 132, CPU 133, GPU 134, and the like can be interconnected through the bus 135.

The CPU 133, through an access to the storage 140, performs booting by using the operating system (OS) stored in the storage 140, and performs various operations by using various programs, contents, and data stored in the storage 140.

In the ROM 132, a command set for system booting is stored. When power is supplied after turn-on command is input, the CPU 133 copies the OS stored in the storage 140 to the RAM 131 according to a command stored in the ROM 132, and executes OS to boot the system. When booting is completed, the CPU 133 copies various programs stored in the storage 140 to the RAM 131, executes a program copied to the RAM 131, and performs various operations.

When booting of the user terminal device 100 is completed, the GPU 134 displays the home screen. More specifically, the GPU 134, by using a calculation unit (not illustrated) and a rendering unit (not illustrated), can generate the home screen including various objects such as an icon, an image, a text, and the like. The calculation unit calculates an attribute value such as a coordinate value, shape, size, and color of each object according to the layout of a screen. Based on the attribute value calculated by the calculation unit, the rendering unit generates a screen with various layouts including an object. A screen generated by the rendering unit is provided to the display 110 and displayed within a display area.

By using the home screen data stored in the storage 140, the GPU 134 can render the home screen. In addition, when a user performs touch or proximity manipulation by the finger 50 or the pen 200, the GPU 134 renders an object according to manipulation details. For example, when a user draws a circle by using the pen 200, the circle is displayed on the home screen according to the drawing trace. The GPU 134 can display the background screen and an object on different display layers. That is, on a upper part of the background screen layer, an object layer is overlaid and displayed. The controller 130 can extract a boundary line of an object rendered on an object layer and recognize the object according to the boundary line. The controller 130 can store a pixel coordinate value to specify the recognized object point and a pixel value thereof in the storage 140 as object information.

The operations of the user terminal device 100 can be performed in accordance with execution of various software.

Figure 46:
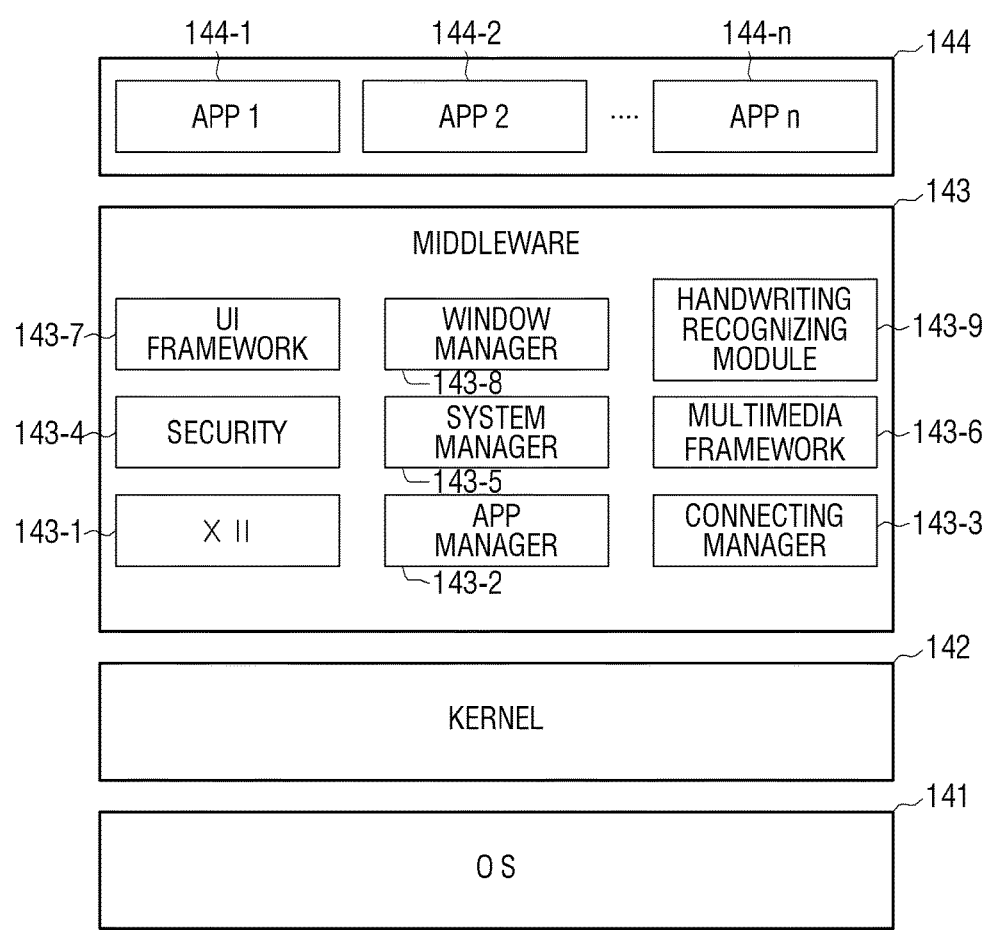
FIG. 46 is a drawing illustrating software structure used by the user terminal device according to an exemplary embodiment.

FIG. 46 is a drawing illustrating an example of software structure used by the user terminal device 100. Software in FIG. 46 can be stored in the storage 140, but is not limited thereto, and can be stored in storage means of various types in the user terminal device 100. According to FIG. 46, in the user terminal device 100, software including an OS 141, a kernel 142, middleware 143, and an application 144 can be stored.

The OS 141 performs a function to control and manage overall operations of hardware. That is, the OS 141 is a layer in charge of basic functions such as hardware management, memory, security, and the like.

The kernel 142 functions as a path to deliver various signals detected by the detector 120, etc. to the middleware 143.

The middleware 143 includes various software modules which control the operations of the user terminal device 100. According to FIG. 46, the middleware 143 includes an X11 module 143-1, an APP manager 143-2, a connecting manager 143-3, a security module 143-4, a system manager 143-5, a multimedia framework 143-6, a UI framework 143-7, a window manager 143-8, and a handwriting recognizing module 143-9.

The X11 module 143-1 is a module which receives various event signals from various hardware in the user terminal device 100. Herein, an event can be set in a diverse manner such as an event where a user manipulation is detected, an event where a system alarm happens, an event where a certain program executes or closes, and the like.

The APP manager 143-2 is a module which manages an execution state of various applications installed in the storage 140. When an event where an application execution command is input is detected from the X11 module 143-1, the APP manager 143-2 calls and executes an application corresponding to the event. That is, when an event where at least one object is selected is detected on the home screen, the APP manager 143-2 calls and executes an application corresponding to the object.

The connecting manager 143-3 is a module to support a wire or wireless network connection. The connecting manager 143-3 can include various detailed modules such as a DNET module and a UPnP module, and the like.

The security module 143-4 is a module which supports certification, permission, secure storage, and the like relating to hardware.

The system manager 143-5 monitors state of each element in the user terminal device 100, and provides the monitoring result to other modules. For example, if remaining battery is not low, an error occurs, communication is disconnected, the system manager 143-5 can provide the UI framework 143-7 with the monitoring results, and output an alarm message or an alarm sound.

The multimedia framework 143-6 is a module to reproduce a multimedia content which is stored in the user terminal device 100 or which is provided from an external source. The multimedia framework 143-6 can include a player module, camcorder module, a sound processing module, and the like. Accordingly, the multimedia framework can reproduce various multimedia contents, generate a screen and sound, and reproduce the contents.

The UI framework 143-7 is a module to provide various UIs. The UI framework 143-7 can include an image compositor module composing various objects, a coordinate compositor module which calculates a coordinate where an object is displayed, a rendering module which renders the composed object on a calculated coordinate, and a two-dimensional/three-dimensional (2D/3D) UI toolkit which provides a tool to composed a UI in 2D or 3D.

The window manager 143-8 can sense a touch event by using the body of a user or a pen, or other input events. When such an event is detected, the window manager 143-8 delivers an event signal to the UI framework 142-7, and makes the UI framework perform the operation corresponding to the event.

The handwriting recognizing module 143-9 is a module to parse a drawn trace on a surface of the display 110 by a user and recognize a content therein. The handwriting recognizing module 143-9 receives coordinate values of points touched from the pen recognition panel 121 and stores a coordinate value of the touched points as a stroke. By using the stroke, a stroke array can be generated. By comparing a pre-stored handwriting library with the generated stroke array, the handwriting recognizing module 143-9 can recognize a content of handwriting. The recognized handwriting content is provided to the application manager 143-2, and the application manager 143-2 provides the content to an application corresponding to a point where a user's handwriting is performed. Accordingly, as described above, a control operation based on the recognized handwriting content can be performed.

Meanwhile, when a user touches or draws on a surface of the display 110 by using various input means such as the hand 50 of a user or a pen 200, the UI framework 143-7 can draw various graphic lines according to user manipulation. More specifically, when a user draws on a screen by using the pen 200, the controller 130 draws a graphic line on every point where the pen 200 passes according to executed UI framework 143-7. The thickness of a line can be vary in proportion to pressure of the pen 200 on a screen or the size of a space where a screen contacts, and color or shape of line can be changed in a diverse manner according to a user's setting.

The application module 144 includes applications 144-1~144-n to support various functions. For example, a program module to provide various services such as a navigation program module, a game module, an e-Book module, a calendar module, and an alarm managing module can be included. Such applications can be installed as a default or can be arbitrarily installed by a user in the midst of using the applications.

The software structure illustrated in FIG. 46 is merely exemplary, and is not limited thereto. Therefore, modification, omission, or addition is available, if necessary. For example, in the storage 140, various programs such as a sensing module for analyzing detected signals in various sensors, a messaging module such as a messenger program, an SMS (Short Message Service) & MMS (Multimedia Message Service) program, a call info aggregator program module, a VoIP module, and a web browser module can be further included.

As described above, the controller 130 can perform various control operations based on various programs and data installed in the user terminal device 100. When a user does not use the user terminal device 100 for a certain period of time, the controller 130 can turn-off the display 110, and enter into a lock state. Under the lock state, if a preset unlock manipulation is input, the controller 130 can release the lock state, and display a previous screen which was displayed before. Unlock manipulation to release the lock state also can be set in consideration of the characteristics of the pen 200.

As described above, the user terminal device 100 can be embodied as various types of devices such as a cell phone, a tablet PC, a laptop PC, a PDA, an MP3 player, an e-frame device, a TV, a PC, a kiosk, and the like. Herein, when a device equipped with various functions, including a communication function and a content reproducing function such as a cell phone and a tablet PC, is embodied, elements which can perform these functions can be further included in the user terminal device 100.

Figure 47:
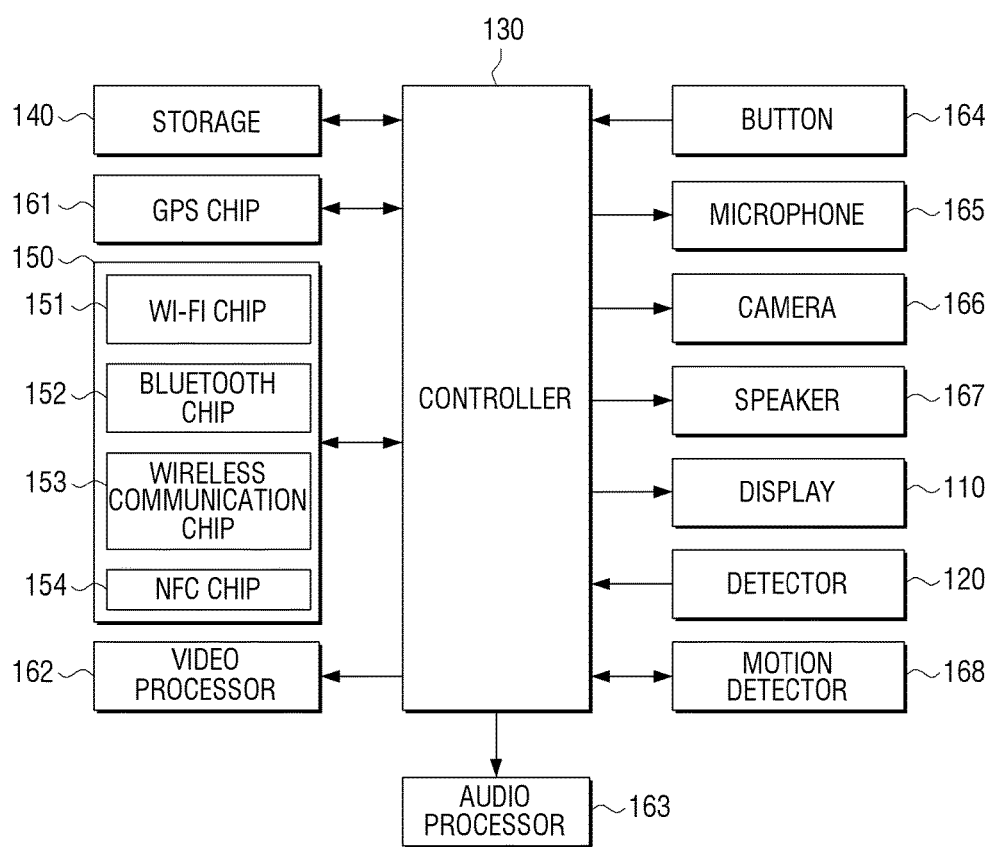
FIG. 47 is a block diagram to explain the comprehensive configurations of the user terminal device according to various exemplary embodiments.

FIG. 47 is a block diagram illustrating a more detailed example of the user terminal device 100 including various elements.

According to FIG. 47, the user terminal device 100 can include the display 110, the detector 120, the controller 130, the storage 140, the communicator 150, the GPS chip 161, the video processor 162, the audio processor 163, the button 164, the microphone 165, the camera 166, the speaker 167, and the movement detector 168.

The display 110 and the detector 120, as explained above, can be embodied as a touch screen, and can display various screens and sense user manipulation relating to the screens. By using various programs and data stored in the storage 140, the controller 130 controls the overall operations of the user terminal device 100. The display 110, the detector 120, and the controller 130 have been already explained, and thus will not be further explained.

The communicator 150 is the configuration to perform communication with various types of external device according to various types of communication methods. The communicator 150 includes a Wi-Fi chip 151, a Bluetooth chip 152, a wireless communication chip 153, and a Near Field Communication (NFC) chip 154.

The Wi-Fi chip 151 and the Bluetooth chip 152 respectively perform communication with Wi-Fi method and Bluetooth method. In case of using the Wi-Fi chip 151 or the Bluetooth chip 152, various connection information such as SSID and a session key is transceived first, and communication connection is performed by using the information, and then various information can be transceived. The wireless communication chip 153 refers to a chip performing communication according to various communication standards such as IEEE, ZigBee, 3G (3rd Generation), 3GPP (3rd Generation Partnership Project), LTE (Long Term Evolution), and the like. The NFC chip 154 refers to a chip which operates with the NFC(Near Field Communication) method using 13.56 MHz band among various RF-ID frequency bands such as 135 kHz, 13.56 MHz, 433 MHz, 860~960 MHz, and 2.45 GHz.

The controller 130 performs communication with various external devices by using the communicator 150. For example, an application can be downloaded and installed in the storage 140, and an object corresponding to the application can be displayed. In this case, the application can be matched with the object which was formerly used.

The communicator 150 can perform communication with an external server device. The server device can be a server device which provides sharing service that shares the home screen including an object drawn by another user. In this case, when a command for sharing concerning the home screen is input on the user terminal device 100, the controller 130 can upload the home screen data composing the home screen created by a user to a server device, by using the communicator 150. Also, new home screen data generated by another user can be transmitted from the server device. When new home screen data is downloaded and a user selects the new home screen data and inputs a command for changing the home screen, the controller 130 can display new home screen based on the new home screen data. In addition, the communicator 150 can directly perform communication with another user terminal device 100 (i.e., not through the server 3500), and share the home screen data.

The GPS chip 161 is an element to receive GPS (Global Positioning System) signal from satellite and calculate current location of the user terminal device 100. When using the navigation program or when the current location of a user is required, the controller 130 can calculate location of a user by using the GPS chip 161.

The video processor 162 is an element to process video data included in a content received through the communicator 150 or a video data included in a content stored in the storage 140. In the video processor 162, various image processing such as decoding, scaling, noise filtering, frame rate conversion, resolution conversion, and the like relating to video data can be performed.

The audio processor 163 is an element to process a content received through the communicator 150 or an audio data included in a content stored in the storage 140. In the audio processor 163, various processing such as decoding, amplifying, noise filtering, and the like relating to audio data can be performed.

When a reproducing program relating to a multimedia content is executed, the controller 130 can operate the video processor 162 and the audio processor 163, and reproduce the corresponding content. The display 110 can display an image frame generated in the video processor 162.

Also, the speaker 167 outputs audio data generated in the audio processor 163.

The button 164 can be a button of various types such as a mechanical button, a touch pad, a wheel, etc. formed on random areas such as a front area, a side area, a back area, and the like of outside of the main body of the user terminal device 100.

The microphone 165 is an element to receive voice of a user or other sound and to convert them into audio data. The controller 130 can use the user's voice input through the microphone 165 during calling, or convert to audio data and store the data in the storage 140.

The camera 166 is an element to film a still image or a visual image according to a user's control. The camera 166 can be embodied as a plurality of cameras such as a front camera and a back camera.

When the camera 166 and the microphone 165 are prepared, the controller 130 can perform control operation according to a user's voice input through the microphone 165 or a user motion recognized by the camera 166. That is, the user terminal device 100 can be operated with a motion control mode or a voice control mode. When the user terminal device 100 is operated with the motion control mode, the controller 130 activates the camera 166 and photographs a user, and performs the corresponding control operation by tracing changes in motion of a user. When the user terminal device 100 is operated with a voice control mode, the controller 130 can analyze a user's voice input through the microphone 165, and operate with the voice recognition mode which performs the control operation according to the analyzed user's voice.

In the user terminal device 100, where the motion control mode or the voice control motion is supported, the voice recognition technology or the motion recognition technology can be used in various exemplary embodiments. For example, when a user makes a motion as if the user selects an object displayed on the home screen, or utters a voice command corresponding to the object, it can be determined that the object is selected, and then the control operation matched with the object can be performed.

The movement detector 168 is an element to sense movements of the main body of the user terminal device 100. That is, the user terminal device 100 can be rotated or tilted in various directions. The movement detector 168, by using at least one of the various sensors such as a terrestrial magnetism sensor, a Gyro sensor, and an acceleration sensor, can sense the characteristics of movements such as direction, angle, tilt of rotation.

In addition, though not illustrated in FIG. 47, in some exemplary embodiments, various external input ports to connect with various external terminals such as a USB port where a USB connect is connected inside the user terminal device 100, a headset, a mouse, a LAN, and a DMB chip which receives and processes a DMB (Digital Multimedia Broadcasting) signal can be further included.

As described above, in the various exemplary embodiments discussed above can be embodied as the user terminal device 100 in various forms. As stated above, according to various exemplary embodiments, a user can draw various objects and compose a screen of the user terminal device 100. Particularly, a user can decorate the home screen of the user terminal device 100 to suit the user's characteristics. Accordingly, satisfaction and willingness to access the home screen can be improved.

In the various exemplary embodiments discussed above, the cases where an object is drawn on the home screen has been explained, but an object is not necessarily drawn on the home screen. That is, a separate application for drawing an object can be prepared. The controller 130 executes the corresponding application according to a user's selection, and displays the execution screen. When a user draws an object on the execution screen and then inputs a command for closing, the controller 130 can add the drawn object to the home screen or a screen designated by another user.

A method for generating an object, a method for composing the home screen, a method for displaying of the user terminal device 100 according to the afore-mentioned various exemplary embodiments can be coded with software and may be stored in a non-transitory readable medium. The non-transitory readable medium may be mounted and used in various apparatuses.

For example, a program code to perform displaying the home screen including at least one object drawn by a user, sensing a user manipulation when an object is selected on the home screen by the user manipulation, performing a control operation matched with the selected object when a new object is drawn on the home screen, and updating the home screen to additionally display the new object can be stored and provided in a non-transitory readable medium.

The non-transitory recordable medium refers to a medium which may store data semi-permanently and which may be readable by an apparatus. Specifically, the above-mentioned various applications or programs may be stored in a non-transitory recordable medium such as a CD, a DVD, a hard disk, a Blu-ray disk, a USB, a memory card, and a ROM and provided therein.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the inventive concept, as defined by the appended claims, and many alternatives, modifications, and variations will be apparent to those skilled in the art.

What is claimed is:

1. A user terminal device, comprising:
   a display;
   a detector configured to detect a user input on the display;
   a storage configured to store an image drawn by the user input and information on a plurality of control operations matched with the image, each of the plurality of control operations being matched with a different part of the image, respectively; and
   a controller configured to control the display to display the image, wherein the controller is further configured to, in response to one part of the image being selected, perform a control operation, matched with the selected part, among the plurality of control operations, and
   wherein the controller is further configured to divide the image drawn by the user input into the different parts by classifying each area of the image into one of the different parts based on the user input.

2. The user terminal device as claimed in claim 1, wherein the controller is further configured to control the display to display a home screen comprising a plurality of display layers sequentially overlaid,
   wherein the image is displayed on a display layer among the plurality of display layers, and
   wherein the controller is further configured to, in response to the image being a background image, divide the background image into a plurality of parts based on the user input, match each of the plurality of control operations with different parts of the background image respectively.

3. The user terminal device of claim 2, wherein the controller determines a location on the home screen where the user input occurred and replaces an object in the determined location with the user input and wherein the object is at least one of an icon for executing an application, playing back multimedia contents, and a widget.

4. The user terminal device as claimed in claim 2, wherein the controller is further configured to display the background image on a bottom display layer from among the plurality of display layers.

5. The user terminal device as claimed in claim 2, wherein the controller is further configured to, in response to the image being a widget, display the widget on an area of a top display layer from among the plurality of display layers.

6. The user terminal device as claimed in claim 2, wherein the controller is further configured to, in response to the image being an icon, display the icon on at least one display layer from among the plurality of display layers which overlays a display layer from among the plurality of display layers where a background image is displayed, and provide the home screen where the background image is combined with the icon.

7. The user terminal device as claimed in claim 2, wherein the home screen is composed of one page unit screen,
   wherein the controller is further configured to enlarge or reduce a size of the image according to a corresponding one of a zoom-in manipulation and a zoom-out manipulation.

8. The user terminal device as claimed in claim 2, wherein the controller is further configured to, in response to a scroll manipulation to scroll the home screen being detected, display the home screen by scrolling the home screen.

9. The user terminal device as claimed in claim 2, wherein the image, in response to the home screen being displayed on the display, is capable of being directly drawn on a surface of the display by the user input.

10. The user terminal device as claimed in claim 1, wherein the controller is further configured to, during the dividing of the drawn image into the different parts, display a recommended control operation information corresponding to a feature in an area of the image from among said each area of the image, and
    in response to one control operation being selected from among the recommended control information, match the selected control operation said one part of the image.

11. The user terminal device as claimed in claim 1, wherein the controller is further configured to, in response to a control operation to be matched with the image being selected before the image is drawn by the user input, display a reference image corresponding to the selected control operation, and in response to a user manipulation being performed to modify the reference image, match the modified reference image and the selected control operation and store corresponding matching information in the storage.

12. The user terminal device as claimed in claim 1, wherein the controller is further configured to, in response to a control operation to be matched with the image being selected before the image is drawn by the user input, display a reference object corresponding to the selected control operation as a watermark.

13. The user terminal device as claimed in claim 1, wherein the controller is further configured to, in response to a screen editing menu being selected, display a screen including a first area in which the image can be drawn by the user input and a second area in which a control operation to be matched with the image can be selected.

14. The user terminal device as claimed in claim 1, further comprising a communicator configured to communicate with an external server,
    wherein the controller is further configured to, in response to a sharing command being input, upload, to the external server, home screen data including the image.

15. The user terminal device as claimed in claim 14, wherein the controller is further configured to, in response to a new home screen data drawn by another user being downloaded from the external server, convert the home screen based on the new home screen data.

16. The user terminal device of claim 1, wherein the control operation comprises at least one of displaying an execution screen with respect to at least one application represented by the user input and playing back multimedia contents represented by the user input.

17. The user terminal device as claimed in claim 1, wherein the plurality of control operations are independently executable from other ones of the plurality of control operations.

18. The user terminal device as claimed in claim 17, wherein the controller is further configured to automatically detect the different parts of the image based on analyzing the image, generate a plurality of transparent objects corresponding to the automatically detected different parts, control the storage to store pixel coordinate values for each of the plurality of transparent objects, and match one of the plurality of control operations to each of the plurality of transparent objects.

19. The user terminal device as claimed in claim 17, wherein the controller is further configured to control the display to display a graphic divider on the image within the user input of the displayed image.

20. A device, comprising:
a detector configured to detect a pen input;
a storage; and
a controller configured to store, in response to an image being drawn by the pen input, information on the image drawn by the pen input and information on a plurality of control operations matched with the image, each of the plurality of control operations being matched with a different part of the image respectively,
wherein the controller is further configured to provide the image to at least one page of a home screen, and in response to one part of the image being selected, perform a control operation, from among the plurality of control operations, matched with the selected part, and
wherein the controller is further configured to divide the image drawn by the pen input into the different parts by classifying each area of the image into one of the different parts based on the pen input.

21. A method for displaying a home screen on a user terminal device, comprising:
generating an image drawn by a user input;
dividing the image drawn by the user input into different parts by classifying each area of the image into one of the different parts, respectively, based on the user input;
setting a plurality of control operations to be matched to the image, each of the plurality of control operations being matched with a different part of the image, respectively;
displaying the image; and
performing, in response to one part of the image being selected, a control operation, from among the plurality of control operations, matched with the selected part.

22. The method as claimed in claim 21 further comprising:
displaying a home screen comprising a plurality of display layers sequentially overlaid,
wherein the image is displayed on at least one display layer from among the plurality of layers, and
wherein the displaying a home screen comprises, in response to the image being a background image, displaying the background image on a bottom display layer from among the plurality of sequentially overlaid display layers.

23. The method as claimed in claim 22, wherein the displaying the home screen comprises, in response to the image being a widget, displaying the widget on an area of a top layer from among the plurality of sequentially overlaid display layers.

24. The method as claimed in claim 22, wherein the displaying the home screen comprises, in response to the image being an icon, displaying the icon in at least one display layer above a display layer, from among the plurality of sequentially overlaid display layers, where a background image is displayed, and providing the home screen where the background image is combined with the icon.

25. The method as claimed in claim 22, wherein the home screen is composed of one page unit screen, and
wherein the displaying further comprises enlarging or reducing a size of the image according to a corresponding one of a zoom-in manipulation and a zoom-out manipulation.

26. The method as claimed in claim 22, further comprising:
in response to a scroll manipulation to scroll the home screen being detected, displaying the home screen by scrolling the home screen.

27. The method as claimed in claim 22, wherein the image, in response to the home screen being displayed on a display, is capable of being directly drawn on a surface of the display by the user input.

28. The method as claimed in claim 21, wherein the setting the control operation comprises:
in response to the image being drawn by the user input, displaying recommended control operation information corresponding to a feature of the image; and
in response to a control operation being selected from among the recommended control operation information, matching the selected control operation with a respective part of the image.

29. The method as claimed in claim 21, wherein the generating the image comprises:
in response to a control operation to be matched with the image being selected before the image is drawn by the user input, displaying a reference image corresponding to the selected control operation; and
in response to a user manipulation being performed to modify the reference image, generating the modified reference image as the image.

30. The method as claimed in claim 21, further comprising:
in response to a control operation to be matched with the image being selected before the image is drawn by the user input, displaying a reference object corresponding to the selected control operation as a watermark.

31. The method as claimed in claim 21, further comprising:
in response to a screen editing menu being selected, displaying a screen including a first area in which the image can be drawn by the user input and a second area in which a control operation to be matched with the image can be selected.

32. The method as claimed in claim 21, further comprising:
in response to a sharing command being input, uploading, to the external server, home screen data including the image.

33. The method as claimed in claim 21, further comprising:
in response to new home screen data, corresponding to a new home screen drawn by another user, being downloaded from an external server, changing the home screen based on the new home screen data.

34. A method for displaying a home screen on a user terminal device, comprising:
generating an image drawn by a pen input;
dividing the image drawn by the pen input into different parts by classifying each area of the image into one of different parts, respectively, based on the pen input;
matching a plurality of control operations with the image, each of the plurality of control operations being matched with a different part of the image, respectively;
providing the image on at least one page of the home screen; and
performing, in response to a part, from among the different parts of the image being selected, a control operation, from among the plurality of control operations, matched with the selected part.

35. A user terminal device, comprising:
a controller configured to generate, in response to receiving a first user input, an image corresponding to the first user input, match, in response to receiving a second user input, a control operation with the image, and perform, in response to receiving a third user input, the control operation,
wherein the first user input corresponds to an image drawn by the first user input on a surface of a display, and
wherein the third user input corresponds to a user selection which is input on the surface of the display to select the image,
wherein the controller is further configured to divide, in response to receiving a fourth user input, the image into a first image part and a second image part, match, in response to receiving a fifth user input, a first control operation with the first image part and a second control operation with the second image part different from the first image part, and perform, in response to receiving a user selection which is input on the surface of the display to select one of the first image part and the second image part, one of the first control operation and the second control operation which corresponds to the selected image part.

36. The user terminal device of claim 35, further comprising the display,
wherein the display is configured to display the image, and
wherein the display is a touch screen.

* * * * *